(12) United States Patent
Date et al.

(10) Patent No.: US 6,499,076 B2
(45) Date of Patent: Dec. 24, 2002

(54) MEMORY MANAGEMENT FOR USE WITH BURST MODE

(75) Inventors: Atsushi Date, Tokyo (JP); Katsunori Kato, Kawasaki (JP); Noboru Yokoyama, Tokyo (JP); Tadaaki Maeda, Kawasaki (JP); Takafumi Fujiwara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/917,715

(22) Filed: Jul. 31, 2001

(65) Prior Publication Data

US 2002/0007431 A1 Jan. 17, 2002

Related U.S. Application Data

(62) Division of application No. 09/122,012, filed on Jul. 24, 1998.

(30) Foreign Application Priority Data

Jul. 25, 1997 (JP) .............................................. 9-200570

(51) Int. Cl.⁷ ................................................. G06F 1/00
(52) U.S. Cl. ........................ 710/113; 710/110; 711/113; 711/119; 711/147
(58) Field of Search ................................ 710/110, 113, 710/127, 305, 311; 711/113, 118, 170, 138, 119, 147, 163

(56) References Cited

U.S. PATENT DOCUMENTS

| | | | |
|---|---|---|---|
| 4,172,283 A | 10/1979 | Kober | 710/131 |
| 5,034,883 A | 7/1991 | Donaldson et al. | 710/112 |
| 5,142,682 A | 8/1992 | Lemay et al. | 710/243 |
| 5,604,748 A | 2/1997 | Date et al. | 370/449 |
| 5,619,661 A | 4/1997 | Crews et al. | 710/119 |
| 5,699,533 A | 12/1997 | Sakai | 710/131 |
| 5,778,200 A | 7/1998 | Gulick | 710/113 |
| 5,802,560 A * | 9/1998 | Joseph et al. | 711/119 |
| 5,805,835 A | 9/1998 | Jeddeloh et al. | 710/107 |
| 5,805,838 A | 9/1998 | Sutherland et al. | 710/112 |
| 5,875,314 A | 2/1999 | Edholm | 710/132 |
| 5,915,099 A * | 6/1999 | Takata et al. | 710/100 |
| 5,918,006 A | 6/1999 | Saito et al. | 395/185.07 |
| 5,923,339 A | 7/1999 | Date et al. | 345/505 |
| 5,949,982 A | 9/1999 | Frankeny et al. | 710/132 |
| 5,956,493 A | 9/1999 | Hewitt et al. | 710/113 |
| 5,996,051 A * | 11/1999 | Mergard | 711/147 |
| 6,078,337 A | 6/2000 | Fukui et al. | 345/521 |
| 6,128,728 A | 10/2000 | Dowling | 712/228 |
| 6,185,520 B1 | 2/2001 | Brown et al. | 703/25 |
| 6,202,120 B1 * | 3/2001 | Lang et al. | 711/5 |

* cited by examiner

*Primary Examiner*—Peter Wong
*Assistant Examiner*—Raymond N Phan
(74) *Attorney, Agent, or Firm*—Fitzpatrick, Cella, Harper & Scinto

(57) ABSTRACT

A P bus from a CPU, an MC bus from a system memory, an IO bus to which an input/output device has been connected, and a G bus for transferring image data of a scanner/printer controller are connected to a system bus bridge (SBB). The SBB connects any of the P bus, G bus and IO bus as a master and any of the MC bus and IO bus as a slave in dependence upon a request from a master. At this time the P bus and IO bus can be connected in parallel with the G bus and MC bus. As a result, access to the memory by the scanner/printer controller can be carried out in parallel with use of the input/output device by the CPU. This makes it possible to process a large quantity of data, such as image data, efficiently.

7 Claims, 60 Drawing Sheets

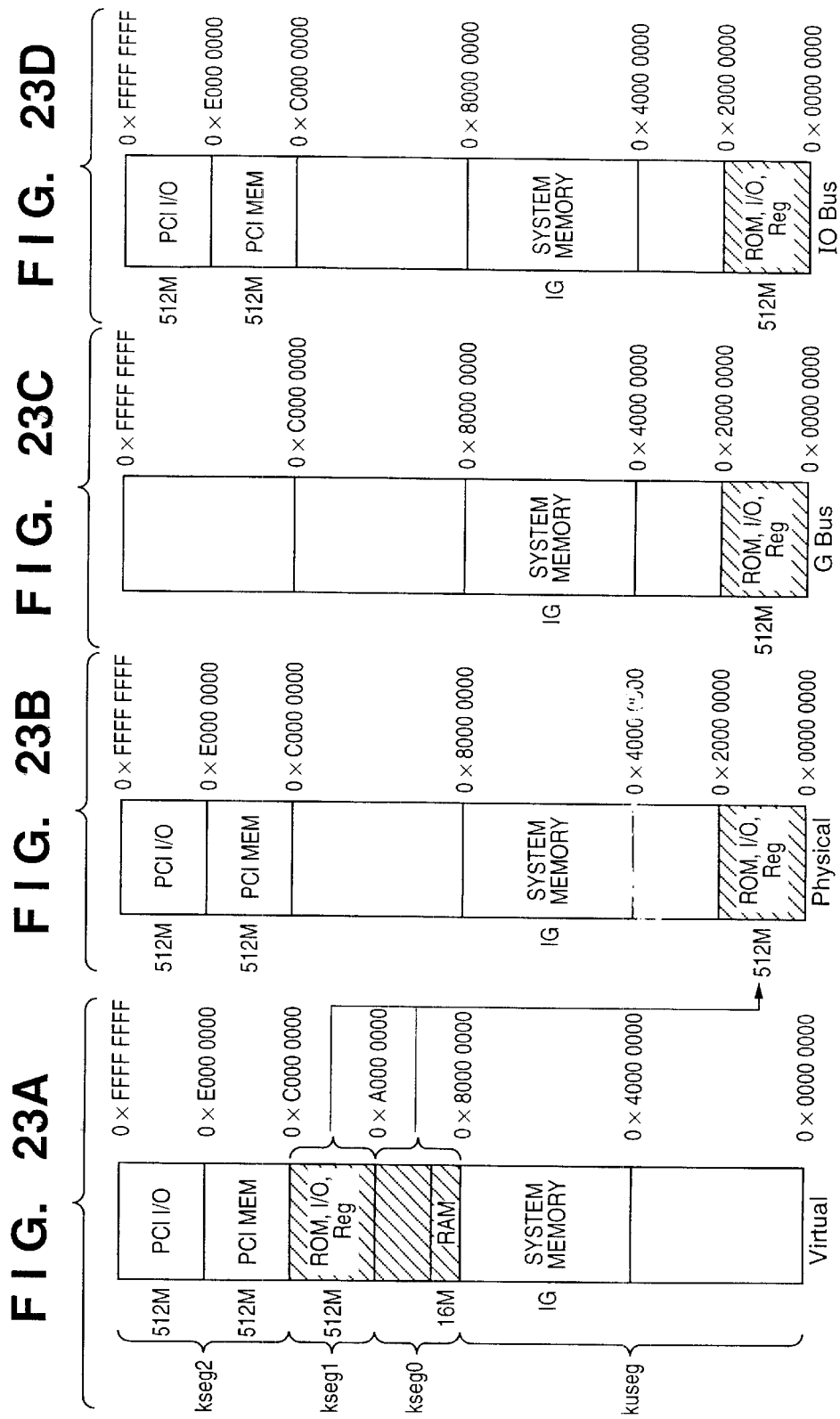

FIG. 24A

| | | Address | Size |
|---|---|---|---|
| BOOT ROM | | 0 × C000 0000 | 16M |
| RESERVED | | 0 × BF00 0000 | |
| INTERNAL REG(SBB,MC) | | 0 × BE00 0000 | 16M |
| IO BUS I/01 | | 0 × BD00 0000 | 16M |
| IO BUS I/02 | | 0 × BC00 0000 | 16M |
| IO BUS MEM | | 0 × BB00 0000 | 16M |
| G BUS MEM | | 0 × BA00 0000 | 32M |
| RESERVED | | 0 × B800 0000 | |
| FONT | | 0 × B000 0000 | 240M |
| FONT OR RAM | | 0 × A100 0000 | 16M |
| | | 0 × A000 0000 | |

VIRTUAL

FIG. 24B

| | | Address | Size |
|---|---|---|---|
| BOOT ROM | | 0 × 2000 0000 | 16M |
| RESERVED | | 0 × 1F00 0000 | |
| INTERNAL REG(SBB,MC) | | 0 × 1E00 0000 | 16M |
| IO BUS I/01 | | 0 × 1D00 0000 | 16M |
| IO BUS I/02 | | 0 × 1C00 0000 | 16M |
| IO BUS MEM | | 0 × 1B00 0000 | 16M |
| G BUS MEM | | 0 × 1A00 0000 | 32M |
| RESERVED | | 0 × 1800 0000 | |
| FONT | | 0 × 1000 0000 | 240M |
| FONT OR RAM | | 0 × 0100 0000 | 16M |
| | | 0 × 0000 0000 | |

PHYSICAL

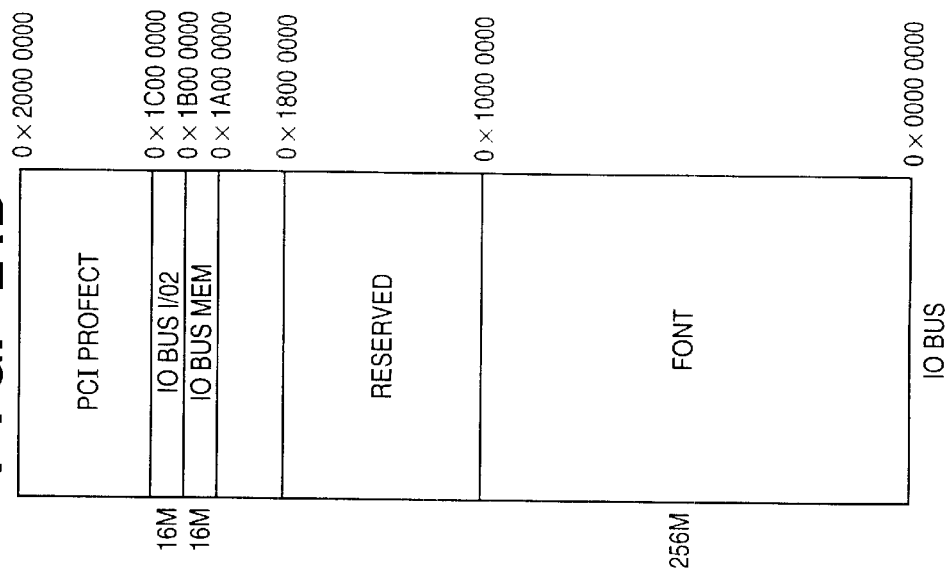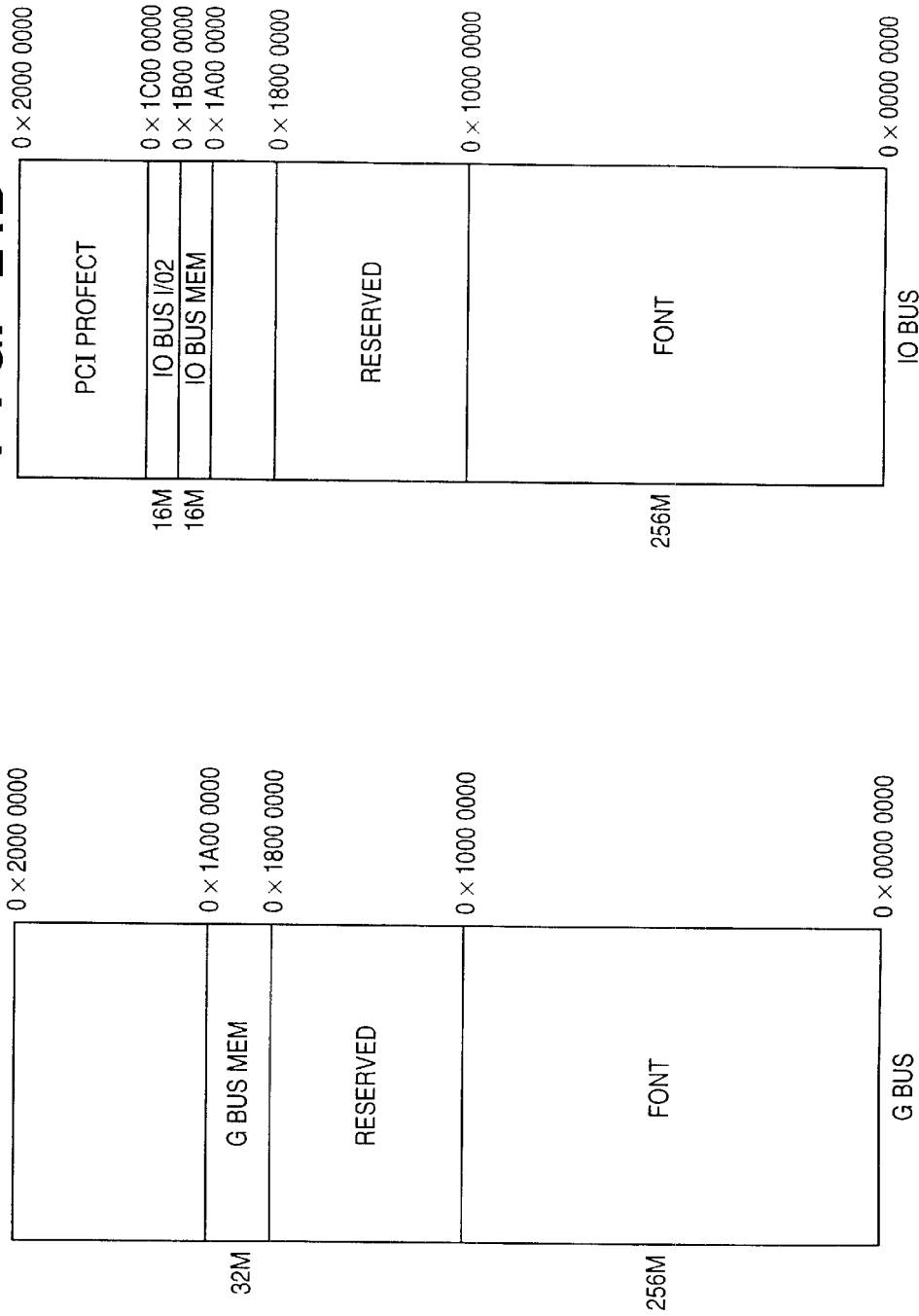

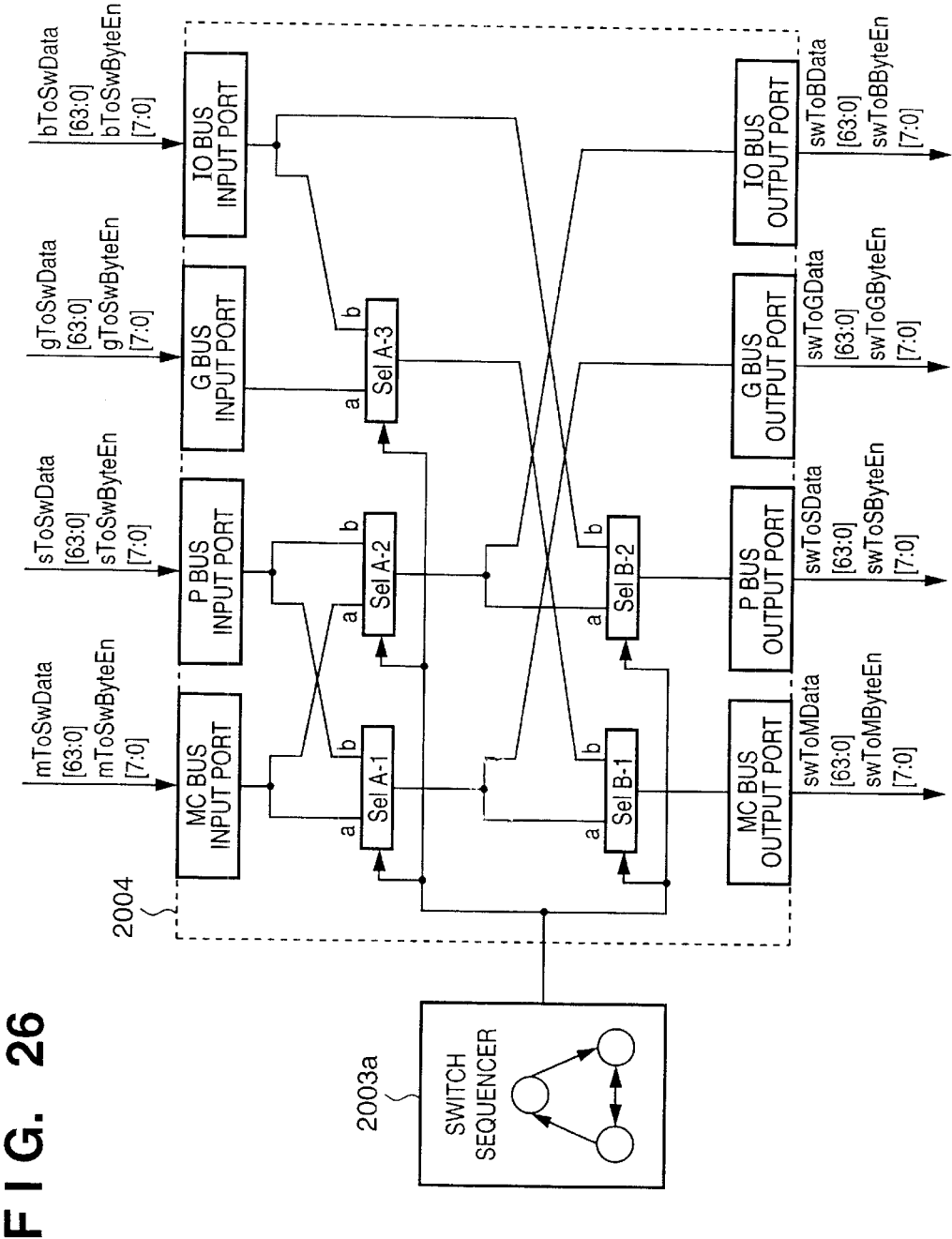
F I G. 26

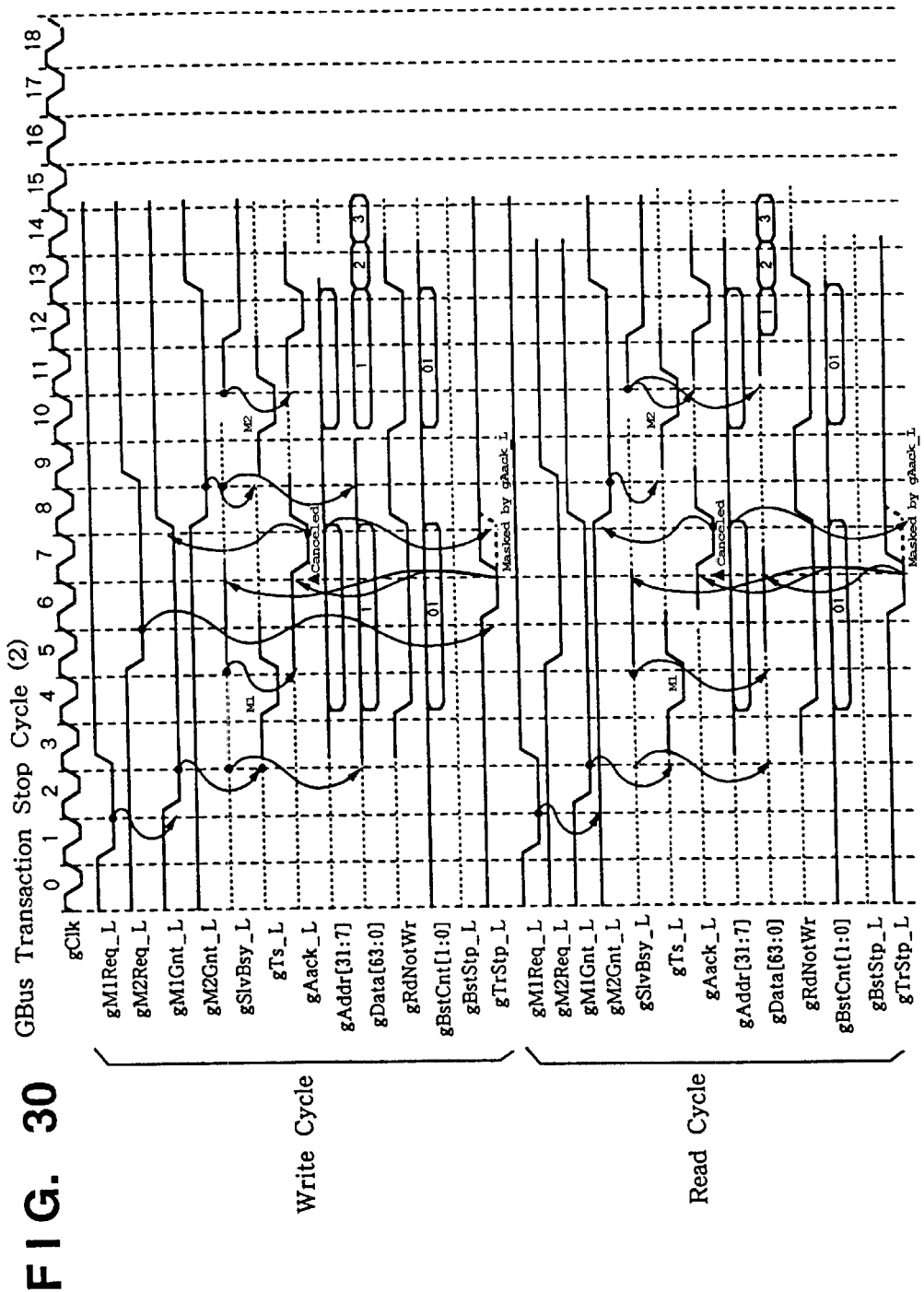
F I G. 30

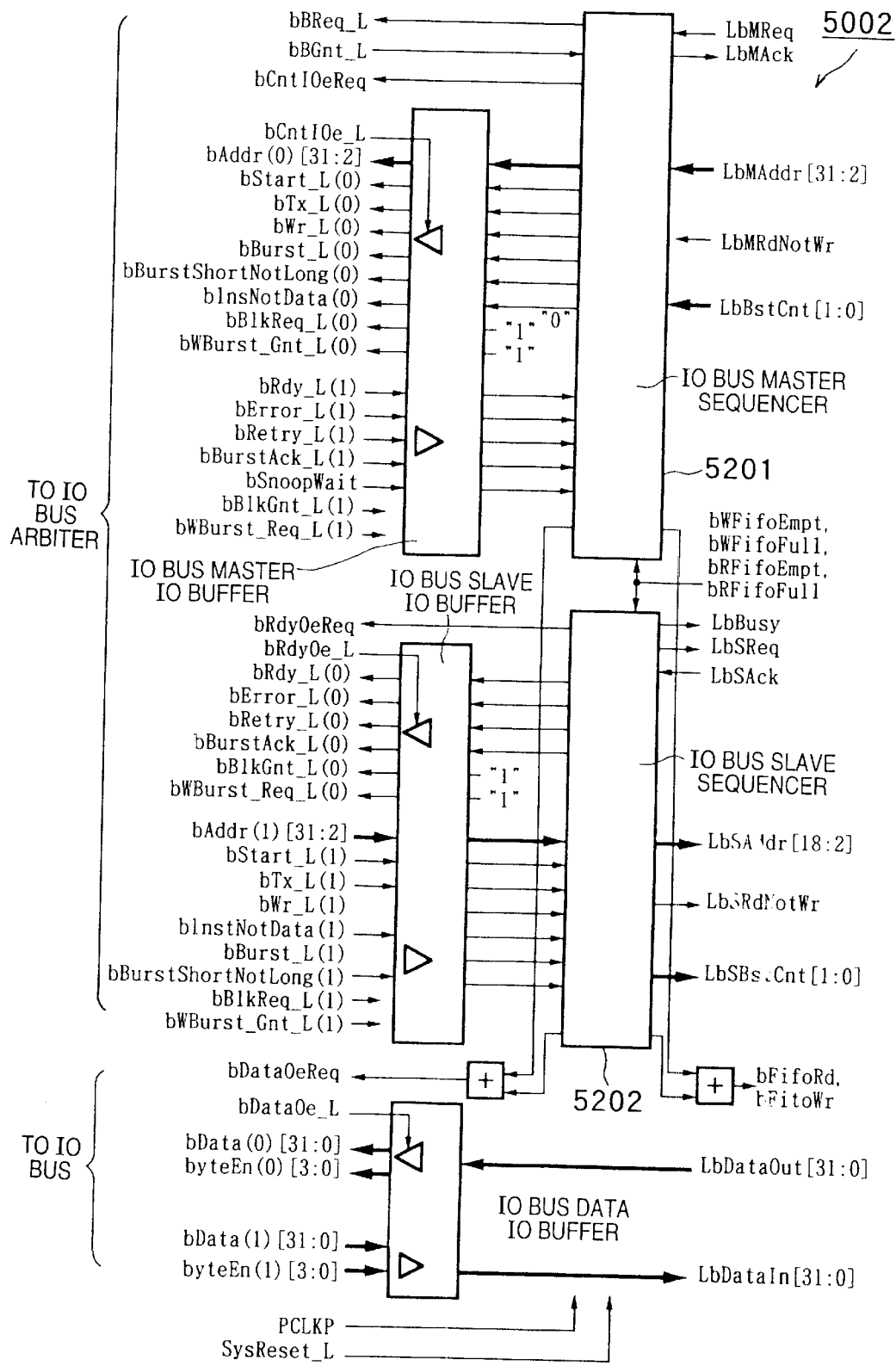
F I G. 52

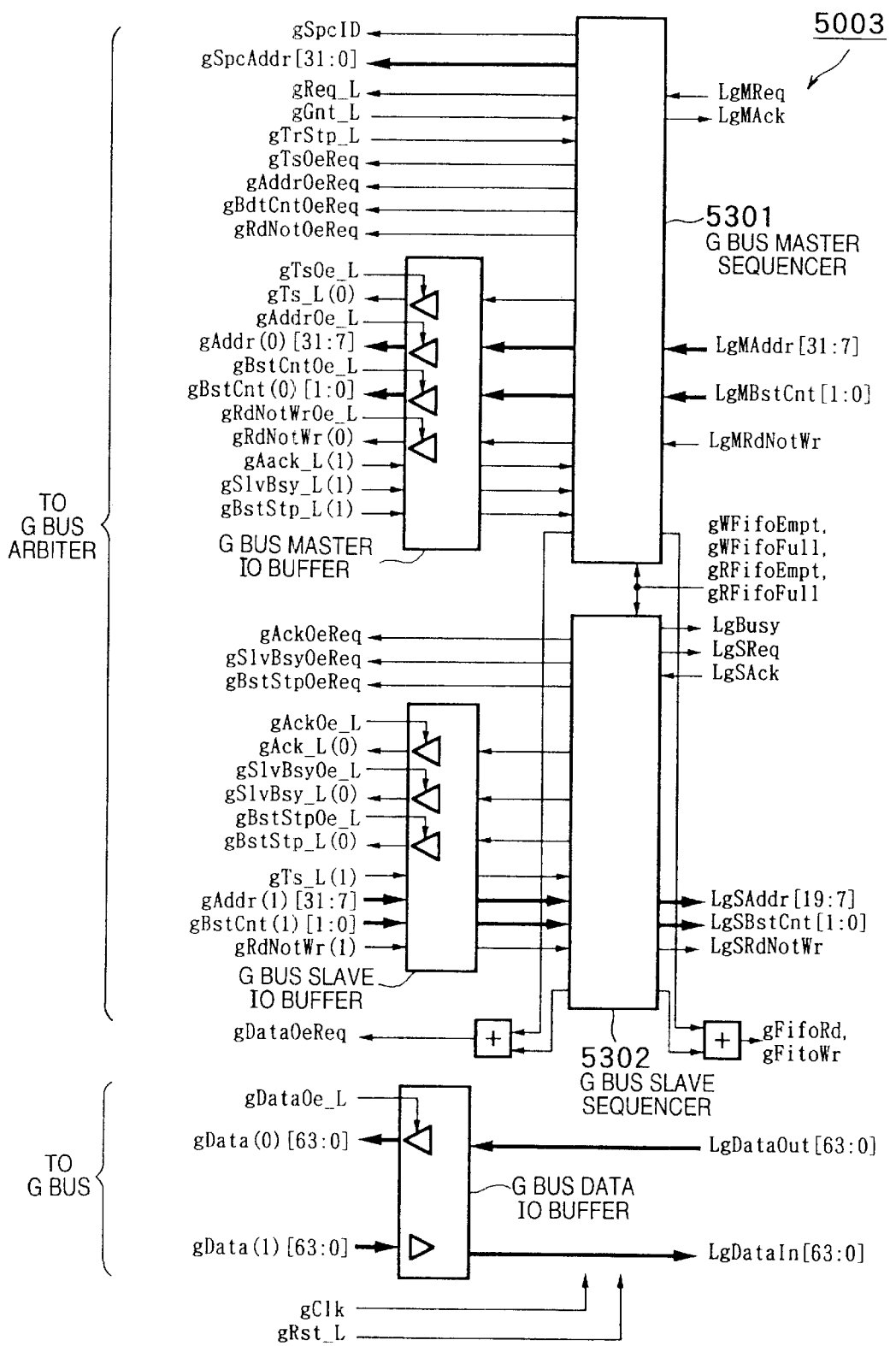
F I G. 53

MEMORY MANAGEMENT FOR USE WITH BURST MODE

CROSS REFERENCE TO RELATED APPLICATION

This application is a division of application Ser. No. 09/122,012, filed Jul. 24, 1998.

BACKGROUND OF THE INVENTION

This invention relates to a control apparatus for a multi-function device for efficient control of an image input unit such as a scanner and an image output unit such as a printer.

Copiers and facsimile machines which combine an image input unit such as a scanner and an image output unit such as a printer, as well as computer systems equipped with these as separate units, are now in practical use. Such systems require the efficient processing of enormous amounts of data in order to handle image data.

Such systems rely upon DMA transfer using a plurality of bus masters in order to transfer data. In a case where a plurality of bus masters execute processing in successive fashion, a series of processing operations is conceivable in which data in memory is first subjected to processing A (bus master 1) and then to processing B (bus master 2), after which the processed data is sent to a bus master 4.

If a DMA (Direct Memory Access) function in which each bus master reads the data from the memory and then writes the processed data back to the memory is available when performing such processing, usually the pertinent software sets DMA in such a manner that bus master 1 executes processing A. After master 1 has completed all processing, the software interrupts the processor and sets DMA in such a manner that processing will be terminated. After this processing is completed, the software sets DMA in such a manner that bus master 4 reads data out of the memory. Thus, in order to perform this series of processing operations, it is necessary to execute processing by software in such a manner that after the completion of one processing operation is verified, the next processing operation is started.

SUMMARY OF THE INVENTION

Thus, it is necessary for software to intervene whenever each processing operation is executed. In addition, it is necessary for the processed data to be written back to memory each and every time processing is executed. A first problem, therefore, is too much needless processing.

Further, owing to handling of a large quantity of data, a bottleneck develops in terms of bus transfer ability owing to use of a single bus. In order to eliminate this problem, a system using dual buses to improve transfer capability has been developed. However, even if a system has a plurality of buses, the bus arrangement lacks flexibility and sufficient transfer capability is not obtained in a case where a large quantity of data is transferred. This is a second problem with the prior art.

The usual practice is to use a single bus. In a case where a plurality of bus masters attempt to write data to the same memory address, the writing of data to memory in the order in which bus use privilege is acquired can be assured. However, in a system configuration in which bus arbitration of these buses and the connection of any one of these buses to the memory are carried out independently, there is a possibility that a plurality of bus masters connected to a plurality of buses will write to the same data space simultaneously, and there is a possibility that the write sequence will not be the sequence in which bus use privilege is obtained by bus arbitration. This is a third problem of the prior art.

Furthermore, a cache memory is used in the prior art to process data efficiently. Conventional cache control, however, is such that the cache is turned on and off based upon address information of the memory that is the destination of the data transfer. When a large quantity of data is transferred to a memory space for cache storage, therefore, a large quantity of data is cached and the memory space is rewritten entirely by new data. If another device accesses the memory, there is a good possibility of a cache miss. Though increasing cache storage capacity may appear to be a solution, this leads to a major increase in manufacturing cost. In particular, when printing or the like is carried out, a large quantity of data that has been read out is delivered to the printer engine and, even though the data has been cached, it is not used twice. Caching data indiscriminately in this manner rather lowers the cache hit rate. Thus, a fourth problem is that cache memory cannot be used efficiently.

In a system employing a plurality of buses, it is required that a bus master that is capable of using the plurality of buses decide which bus to use. Conventionally, once the destination to be accessed has been determined, the bus is decided accordingly. However, a fifth problem is that since the bus used is fixed in dependence upon the destination, it is not possible to make effective use of buses that takes into account the transfer speed and ratio of use of each bus.

Furthermore, a sixth problem is that when such a system is integrated on a single semiconductor chip, a large quantity of heat is evolved and may damage the package and chip.

Accordingly, in view of the first problem set forth above, a first object of the present invention is to provide a bus manager and a control apparatus for a multifunction device having the bus manager in which overall processing speed is raised without requiring the intervention of software for each and every processing operation.

In view of the second problem set forth above, a second object of the invention is to provide a bus manager and a control apparatus for a multifunction device having the bus manager in which the bus arrangement is provided with flexibility and data transfer can be carried out upon selecting the optimum bus.

In view of the third problem set forth above, a third object of the present invention is to provide a bus manager and a control apparatus for a multifunction device having the bus manager in which it is possible to access a memory, from bus masters connected to respective ones of a plurality of buses, in the order in which the privilege to use the buses was obtained.

In view of the fourth problem set forth above, a fourth object of the present invention is to provide a bus manager and a control apparatus for a multifunction device having the bus manager in which the efficiency with which a cache is used is improved.

In view of the fifth problem set forth above, a fifth object of the present invention is to provide a bus manager and a control apparatus for a multifunction device having the bus manager in which the bus used by each bus master is decided dynamically to improve bus efficiency.

In view of the sixth problem set forth above, a sixth object of the present invention is to provide a bus manager and a control apparatus for a multifunction device having the bus manager in which the operating status of circuitry is monitored to suppress power consumption and, hence, the evolution of too much heat.

According to the present invention, the foregoing objects are attained by providing a bus manager comprising at least one bus, a plurality of bus masters connected to the bus, means for storing conditions for starting and conditions for ending granting of bus use privilege to each of the plurality of bus masters, and bus arbitration means for granting the plurality of bus masters the bus use privilege or depriving the plurality of bus masters of the bus use privilege in accordance with the conditions if there are bus use requests from the plurality of bus masters.

In another aspect of the present invention, the foregoing objects are attained by providing a bus manager comprising at least four buses, bus masters connected to the buses, and changeover means for changing over a connection among the buses in conformity with bus requests from bus masters connected to respective ones of the buses.

In another aspect of the present invention, the foregoing objects are attained by providing a bus manager comprising at least two buses each having a bus master, a memory accessed via the buses, arbitration means connected to respective ones of the buses for arbitrating bus requests from the bus masters of the corresponding buses and granting a bus use privilege to any of the bus masters, and bus synchronizing means operable, in a case where a plurality of bus masters that have been granted bus use privilege with respect to the respective buses perform a write operation with respect to the same destination, for so notifying the arbitration means so that the arbitration means will stop the granting of the bus use privilege to the bus masters with the exception of a bus master that issued the bus request first.

In another aspect of the present invention, the foregoing objects are attained by providing a bus manager comprising at least two buses each having bus arbitration means, bus masters connected to the buses, and decision means for judging status of each of the buses and information relating to bus requests issued by the bus masters, and deciding which of the buses should be used.

According to another aspect of the invention, the present invention provides a memory manager comprising a memory for supporting a burst mode in which a data transfer to successive locations is carried out, and memory control means having a cache memory preceding the memory for temporarily storing data exchanged with the memory, wherein the memory control means controls the cache memory in such a manner that data is transferred to the memory directly without the intermediary of the cache memory if transfer of the data to the memory is performed in the burst mode, and such that data is first written to the cache memory if transfer of the data to the memory is performed in a single mode.

In another aspect of the present invention, a memory manager comprises a memory for supporting a burst mode in which a data transfer to successive locations is carried out, memory control means having a cache memory preceding the memory for temporarily storing data exchanged with the memory, and a plurality of bus masters which access the memory, wherein the memory control means performs control in such a manner that data is transferred to the memory directly without the intermediary of the cache memory, or is transferred to the memory upon first writing the data to the cache memory, in dependence upon the bus master that is to transfer the data to the memory.

According to another aspect of the present invention, the present invention provides a power manager for controlling power consumption of an electric circuit which includes a plurality of circuit blocks controlled by a controller, comprising status monitoring means for monitoring operating status of each circuit block, adding means for summing power consumed by each circuit block in the operating state, and notification means for comparing summed power with a predetermined threshold value and, if the summed power exceeds the threshold value, so notifying the controller.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 23A shows a virtual memory map;

FIG. 23B shows a physical memory map;

FIG. 23C is a memory map of G bus address space;

FIG. 23D is a memory map of IO bus address space;

FIG. 24A is a map showing 512 MB of the shaded portion in FIG. 23A, which includes a register, etc.;

FIG. 24B is a map showing 512 MB of the shaded portion in FIG. 23B, which includes a register, etc.;

FIG. 24C is a map showing 512 MB of the shaded portion in FIG. 23C, which includes a register, etc.;

FIG. 24D is a map showing 512 MB of the shaded portion in FIG. 23D, which includes a register, etc.;

FIG. 26 is a block diagram of a data switch 2004;

FIG. 30 is a timing chart showing the transaction stop cycle of a G bus;

FIG. 52 is a block diagram of an IO bus controller;

FIG. 53 is a block diagram of a G bus controller;

DESCRIPTION OF THE PREFERRED EMBODIMENTS

Figure 1:
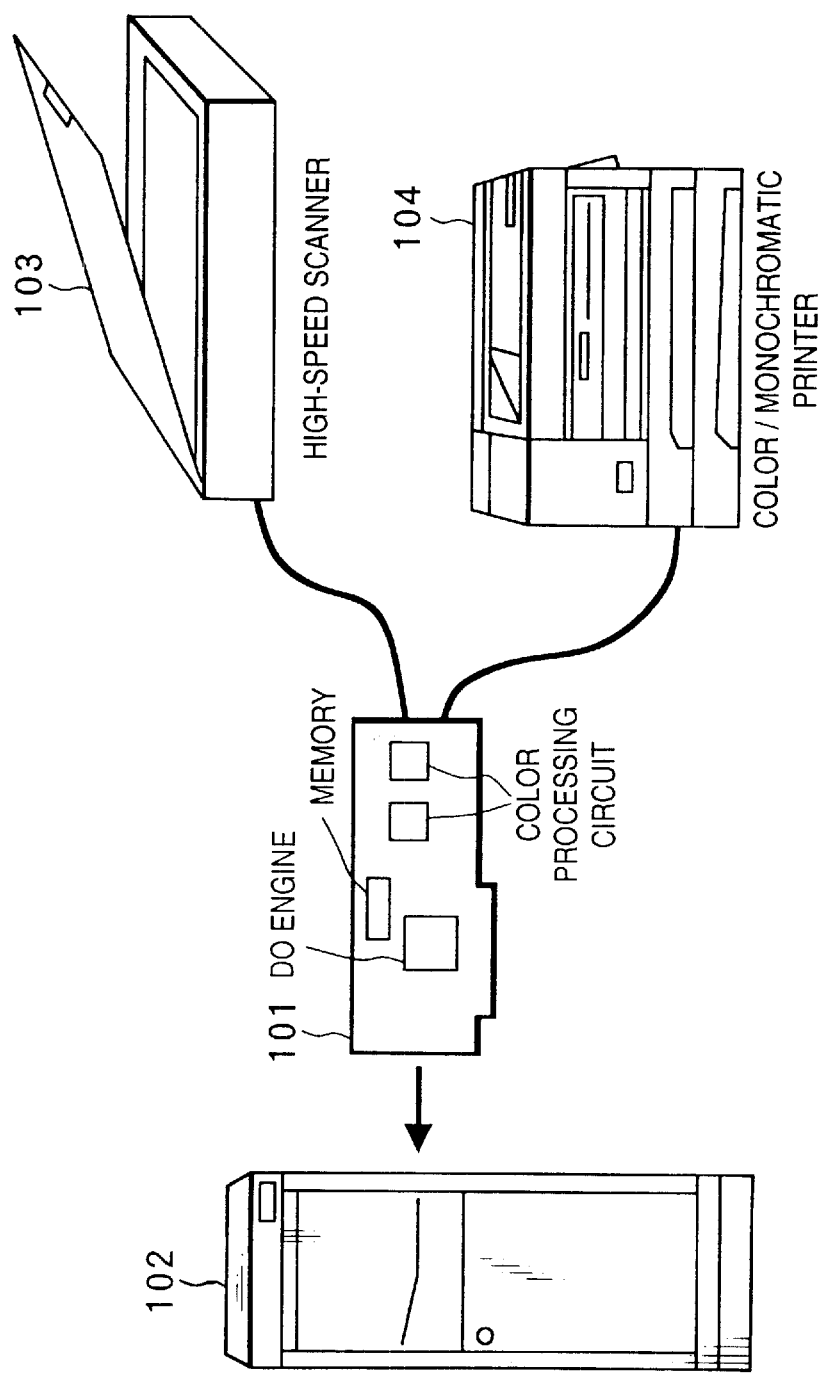
FIG. 1 is a diagram showing the configuration of an apparatus or system using a DoEngine.

A so-called "DoEngine" will be described as an embodiment of the present invention. The DoEngine is a single-chip scanning and printing engine having an internal processor core, a processor peripherals controller, a memory controller, a scanner/printer controller and a PCI interface.

1. Overview of DoEngine

A DoEngine is a single-chip scanning and printing engine internally incorporating a processor core compatible with the R4000 processor manufactured by MIPS Technologies, Inc., a processor peripherals controller, a memory controller, a scanner/printer controller and a PCI interface. The DoEngine employs high-speed parallel operation and building-block techniques.

It is possible to internally incorporate a 32-KB cache memory having a maximum of 16 KB of memory for each of transactions and data, an FPU (floating-point operation unit), an MMU (memory management unit) and a user definable coprocessor in the processor shell (the generic term for the processor peripherals circuitry inclusive of a coprocessor).

Since the DoEngine has a PCI bus interface, it is capable of being used together with a computer system having a PCI bus slot. In addition to being usable in a PCI satellite configuration, the DoEngine is capable of being issued in a PCI bus configuration in the form of a PCI host bus bridge. By being combined with an inexpensive PCI peripheral device, the DoEngine can also be used as the main engine of a multifunction peripheral. Furthermore, it is also possible to combine the DoEngine with a rendering engine or compression/expansion engine having a PCI bus interface.

The DoEngine has two independent buses within its chip, namely an IO bus for connecting a general-purpose IO core and a graphics bus (G bus) optimized for transfer of image data. High-speed data transfer with a high degree of parallel operation essential for simultaneous operation in a multi-function switch is realized by connecting a memory, a processor and the buses thereof via a crossbar switch.

In order to support a synchronous DRAM (SDRAM) having maximum cost performance and minimize a decline in random accessing performance in small data units which cannot enjoy the merits of the burst access high-speed data transfer of a SDRAM in regard to the accessing of a continuous data string, which is typified by image data, an 8-KB 2-way set associative memory front cache is provided within the memory controller. A memory front cache makes it possible to realize higher performance by cache memory without a complicated construction even in a system configuration employing a crossbar switch in which bus snooping for all memory write operations is difficult. The DoEngine has a data interface (video interface), which is capable of real-time data transfer (device control), for interfacing a printer and scanner. High-quality, high-speed copying can be achieved even in an arrangement in which the scanner and printer are discrete devices by supporting synchronization between devices and executing image processing by hardware.

The DoEngine has a core that operates at 3.3 V and an IO unit that operates at 5 V.

FIGS. 1, 2, and 3A–3C show examples of the configuration of an apparatus or system using the DoEngine. FIG. 1 shows a distributed arrangement in which a local board 101 having a DoEngine is connected to a personal computer 102 via a PCI interface possessed by the DoEngine. Besides having the DoEngine, the local board 101 is provided with a memory, which is connected to the DoEngine via a memory bus, described later, and color processing circuit (chip). A high-speed scanner 103 and a color/monochromatic printer 104 are connected to the personal computer 102 via the local board 101. By virtue of this arrangement, image information that has entered from the high-speed scanner 103 can be processed by the local board 101 and output from the printer 104 under the control of the personal computer.

Figure 2:
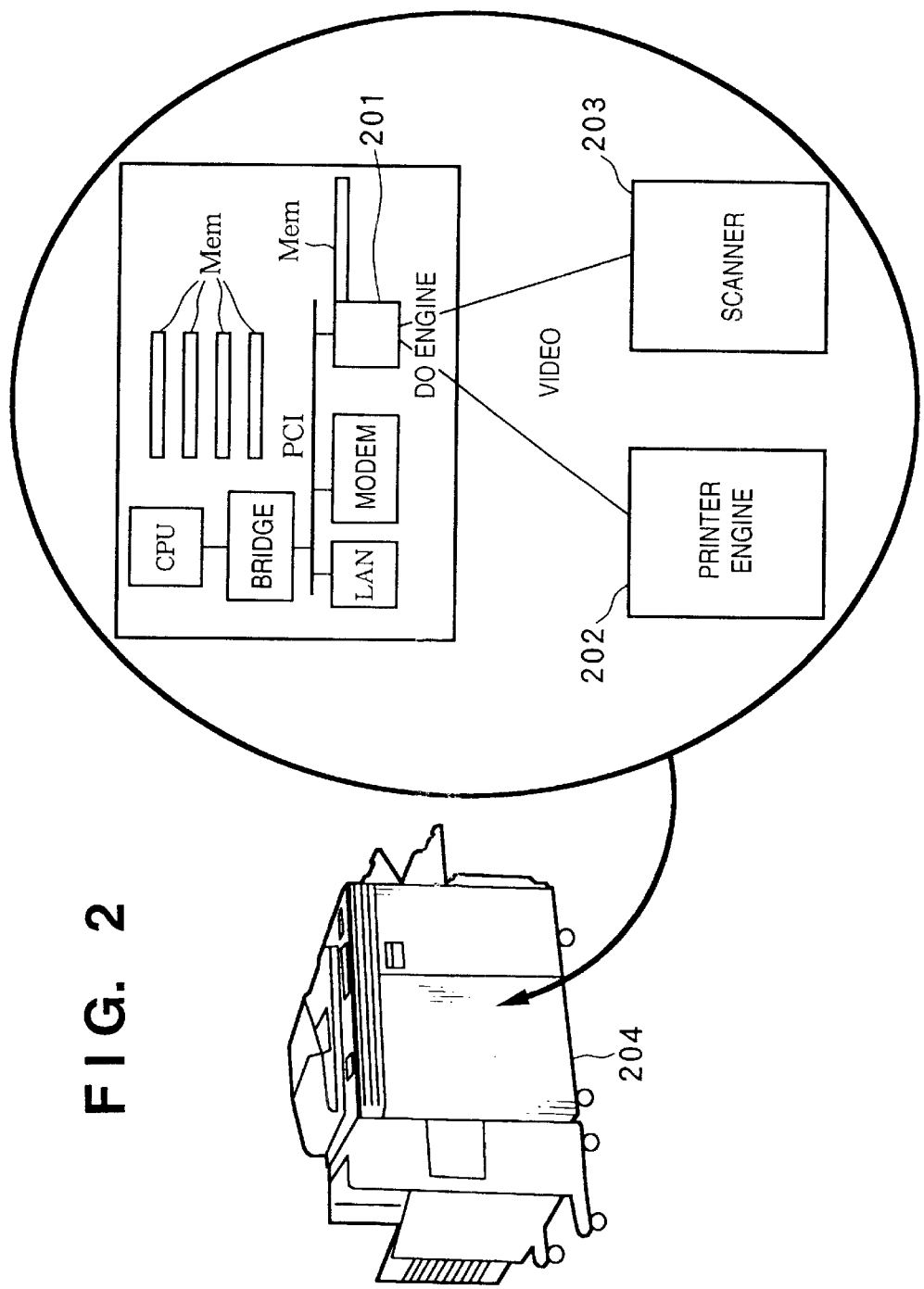
FIG. 2 is a diagram showing the configuration of an apparatus or system using a DoEngine.
Figure 3C:
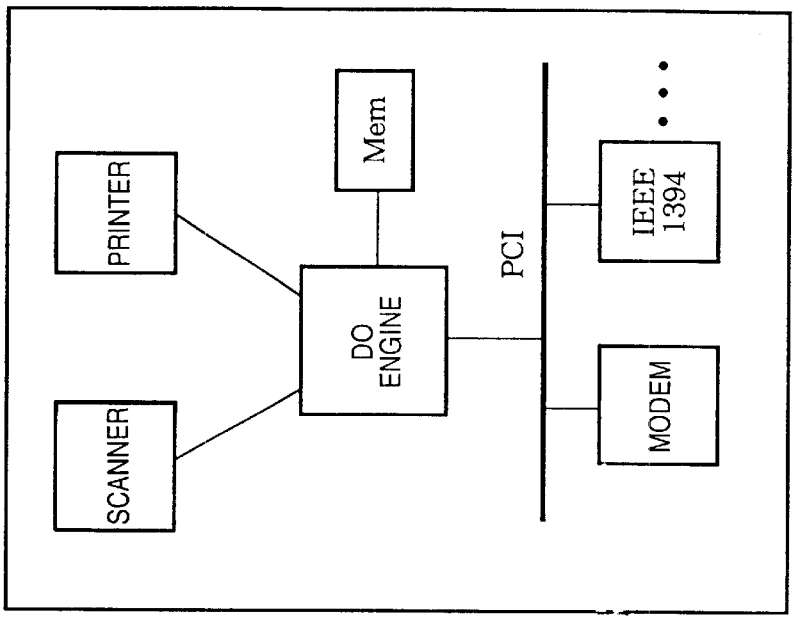
FIGS. 3A–3C are diagrams showing the examples of apparatuses using a DoEngine.
Figure 3A:
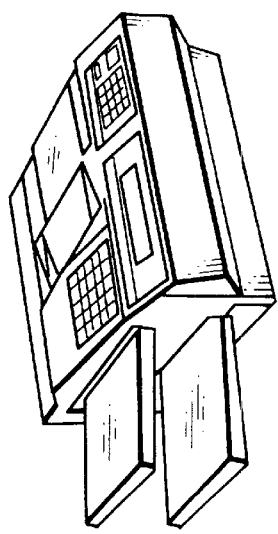
Figure 3B:
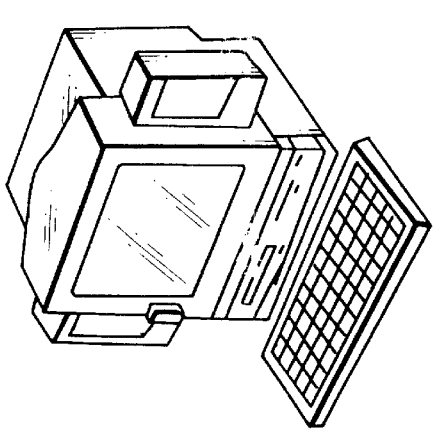

FIGS. 2 and 3A–3C show examples in which a scanner 203 and printer 202 are incorporated in the same device. FIG. 2 shows a configuration resembling an ordinary copier, FIG. 3A illustrates the arrangement of a facsimile apparatus or the like, and FIG. 3B shows a computer for controlling the arrangement of FIG. 3A.

FIGS. 1 and 2 show examples of use in a slave mode, in which the DoEngine is controlled by an external CPU connected via the PCI interface. FIGS. 3A–3C show examples of use in a master mode, in which the CPU of the DoEngine is the nucleus and controls the device connected via the PCI interface.

Table 1 illustrates the specifications of the DoEngine. The DoEngine is equipped with a PCI, memory bus, video, general-purpose input/output, IEEE 1284, RS232C, 100baseT/10baseT, LCD panel and keys as external interfaces. As for the internal blocks, the DoEngine is equipped with a primary cache, a memory controller with cache, a copy engine, an IO bus arbiter and a graphic bus arbiter, etc., in addition to the CPU core. A DMA controller has five channels and arbitration is carried out in accordance with a priority first-come first-served scheme along with the graphics bus and IO bus.

TABLE 1

| ITEM | SUMMARY | SPECIFICATIONS |
|---|---|---|
| CHIP | OPERATION FREQUENCY | INTERNAL: 100 MHz; EXTERNAL BUS & MEMORY BUS: 100 MHz |
| | PACKAGE | 313-PIN BGA |
| | EXTERNAL INTERFACE | PCI MEMORY BUS VIDEO GENERAL-PURPOSE I/O IEEE1284 RS232C |

TABLE 1-continued

| ITEM | SUMMARY | SPECIFICATIONS |
|---|---|---|
| | | (USB) LAN 100/10baseT LCP PANEL & KEYS |
| | INTERNAL BLOCKS | CPU CORE PRIMARY CACHE MMU ICU SYSTEM BUS BRIDGE CONTROLLER W. CACHE COPY ENGINE PLL POWER CONTROL UNIT IO BUS ARBITER GRAPHICS BUS ARBITER |
| DMA CONTROLLER | NUMBER OF CHANNELS | FIVE CHANNELS |
| | MAX. TRANSFER SPEED (PEAK) | 200 MB/s @ 50 MHz |
| | TRANSFER-CAPABLE PATH | INTERNAL OUTPUT BLOCK ←→LOCAL MEMORY |
| MEMORY & BUS CONTROL | SUPPORT MEMORY | SDRAM |
| | DATA WIDTH | 64 BITS |
| | MAXIMUM MEMORY CAPACITY | 1 GB |
| | MAXIMUM MEMORY BUS TRANSFER SPEED | 682 MB/s |
| GRAPHICS BUS | ARBITRATION METHOD | PRIORITY FIRST-COME FIRST-SERVED PROCESSING |
| | MAXIMUM BUS TRANSFER SPEED | 800 MB/s |
| | BUS WIDTH | 64 BITS. 100 MHz |
| PCI BUS | PCI BUS FORMAT | Rev 2.1, 32-BIT, 33M PCI |
| | TRANSFER SPEED WHEN MASTER | READ 96 MB/s, WRITE 88 MB/s |
| | TRANSFER SPEED WHEN SLAVE | READ 101 EM/s, WRITE 111 MB/s PRIORITY FIRST-COME FIRST- |
| IO BUS | ARBITRATION METHOD | SERVED PROCESSING 200 MB/s |
| | MAXIMUM BUS TRANSFER SPEED BUS WIDTH | 32 BITS, 50 MHz |

2. Construction and Operation of DoEngine

This section describes the outline of the DoEngine as well as block diagrams for each of the functional blocks and diagrams illustrating general features, detailed features, a core interface and timing.

2.1. Chip construction of DoEngine

Figure 4:
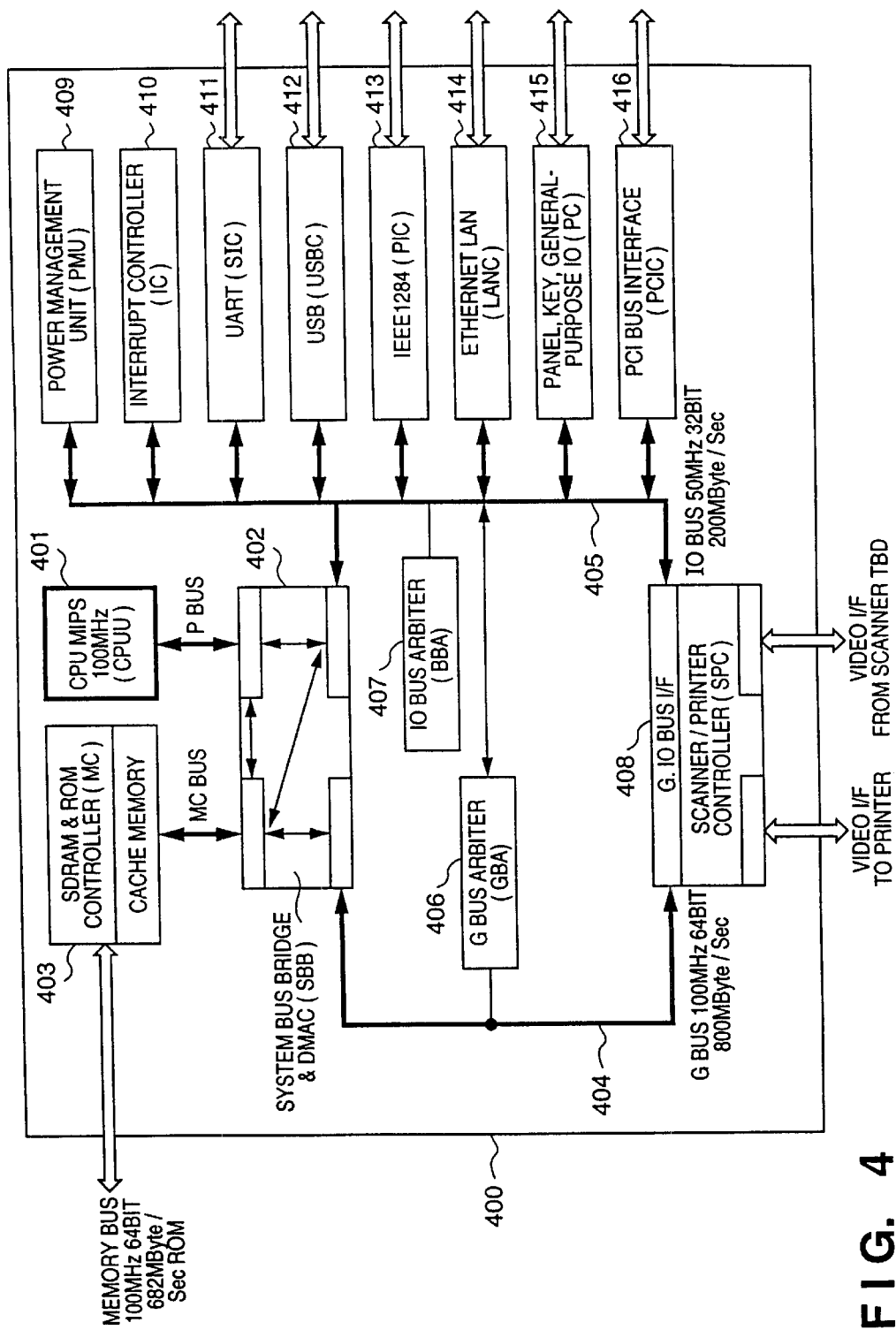
FIG. 4 is a block diagram of a DoEngine.

FIG. 4 is a block diagram of the DoEngine. The DoEngine, indicated at 400, was designed and developed as a controller mainly of next-generation multifunction peripherals (MFPs) or multifunction systems (MFSs). A MIPS R400 core manufactured by MIPS Technologies, Inc. is employed as a CPU (processor core) 401. Packaged in the processor core 401 are cache memories of 8 KB each for instructions and data, and MMU, etc. The processor core

401 is connected to a system bus bridge (SBB) 402 via a 64-bit processor bus (P-bus). The SBB 402 is a 4×4 64-bit crossbar switch and is also connected to a memory controller 403, which is for controlling an SDRAM and ROM and has a cache memory, via a special-purpose local bus (MC bus), and to a G bus 404, which is a graphics bus, and an IO bus 405, which is an input/output bus. Thus, the system bus bridge 402 is connected to a total of four buses. The system bus bridge 402 is connected to these buses on a one-to-one basis. To the greatest extent possible the system bus bridge 402 is designed in such a manner that the two pairs of buses can be connected in parallel.

The G bus 404 is controlled by a G bus arbiter (GBA) 406 and is connected to a scanner/printer controller (SPC) 408 for connecting a scanner and printer. The IO bus 405 is controlled by an IO bus arbiter (BBA) 407 and is connected to an SPC 408, a power management unit (PMU) 409, an interrupt controller (IC) 410, a serial interface controller (SIC) 411 which uses a UART, a USB controller 412, a parallel interface controller (PIC) 413 which uses an IEEE 1284, a LAN controller (LANC) 414 which uses an Ethernet, an LCD panel, key, general-purpose input/output controller (PC) 415, and a PCI bus interface controller (PCIC) 416.

2.2. Processor shell

The processor shell is a block which includes, in addition to the processor core, an MMU (Memory Management Unit), an instruction cache, a data cache, a write-back buffer and a multiplication unit.

<Cache memory>

Figure 5:
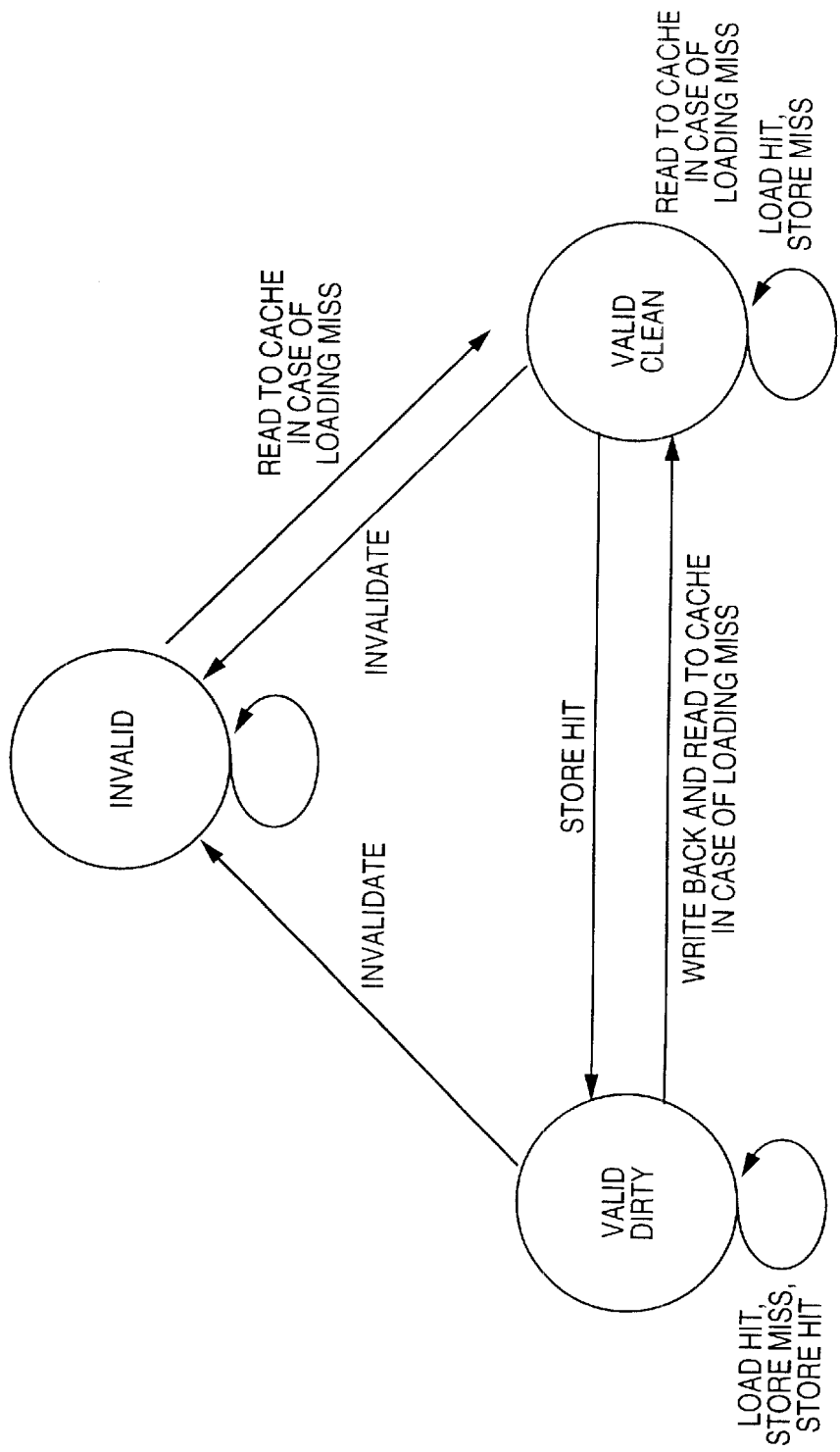
FIG. 5 is a diagram showing three states of a cache memory controller.

As shown in FIG. 5, the cache memory controller manages a cache in three states, namely invalid, valid clean (the cache has not been updated) and valid dirty (the cache has been updated). The cache is controlled in dependence upon the particular state.

2.3. Interrupt controller

Figure 6:
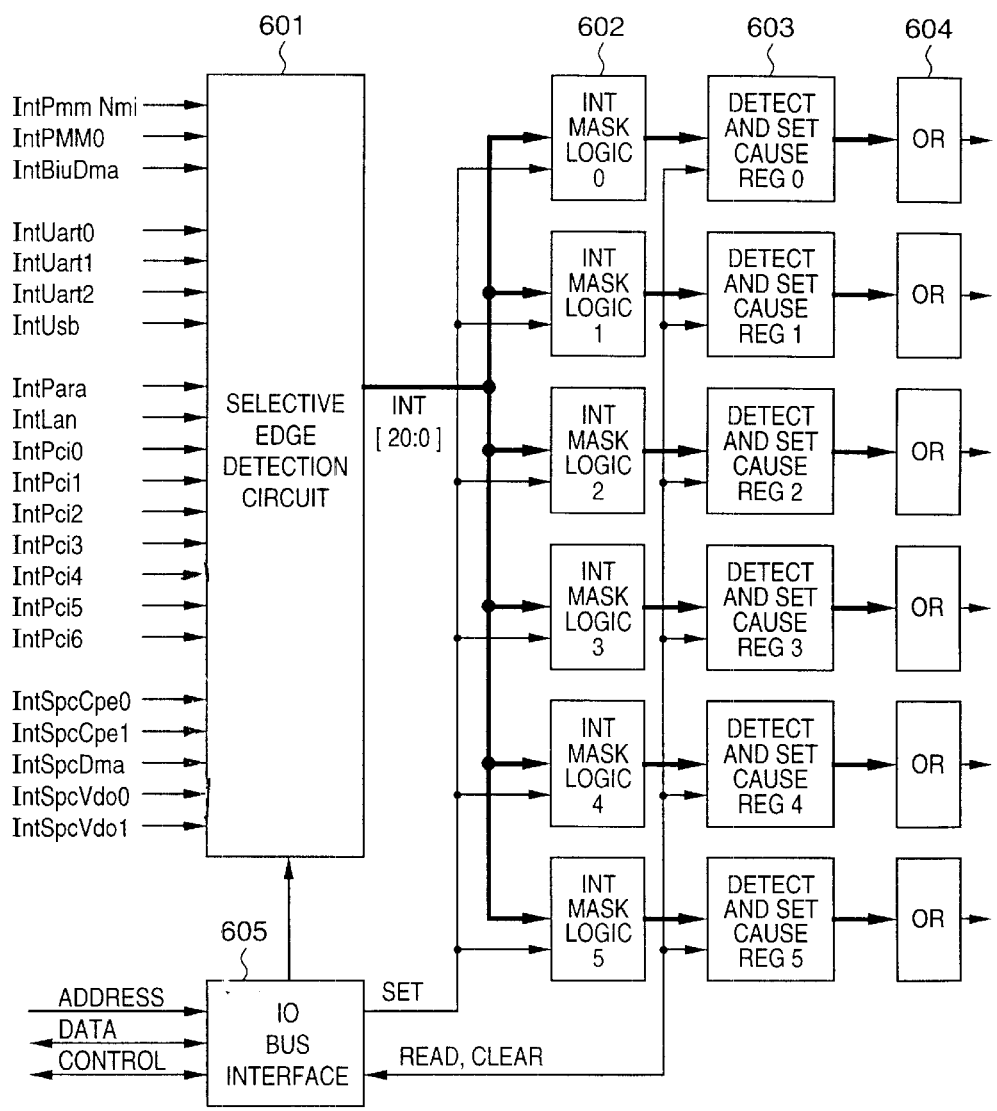
FIG. 6 is a block diagram showing an interrupt controller.

FIG. 6 is a block diagram of the interrupt controller 410.

The interrupt controller 410 is connected to the IO bus 405 via an IO bus interface 605. The interrupt controller 410 collects interrupts from each of the function blocks within the DoEngine chip and from outside the chip and redistributes the interrupts to six levels of external interrupts and non-maskable interrupts (NMI) supported by the CPU core 401. The function blocks are the power management unit 409, the serial interface controller 411, the USB controller 412, the parallel interface controller 413, the Ethernet controller 414, the general-purpose input/output controller 415, the PCI bus interface controller 416 and the scanner/printer controller 408.

It is possible to mask an interrupt for every interrupt source by a mask register (Int Mask Logic 0-5) the software of which can be configured. As for external interrupt inputs, edge sense/level sense can be selected for each signal line by a selective edge detection circuit 601. A cause register (detect and set cause register 0–5) 603 indicates, for each level, which interrupt has been asserted and, by performing a write operation, is capable of performing a clearing operation for each level.

The interrupt signal of each level is output as a logical sum by an OR circuit 604 in such a manner that an interrupt signal is output if there is at least one interrupt for each level. It should be noted that level assignment between causes within each level is performed by software.

2.4. Memory controller

Figure 7:
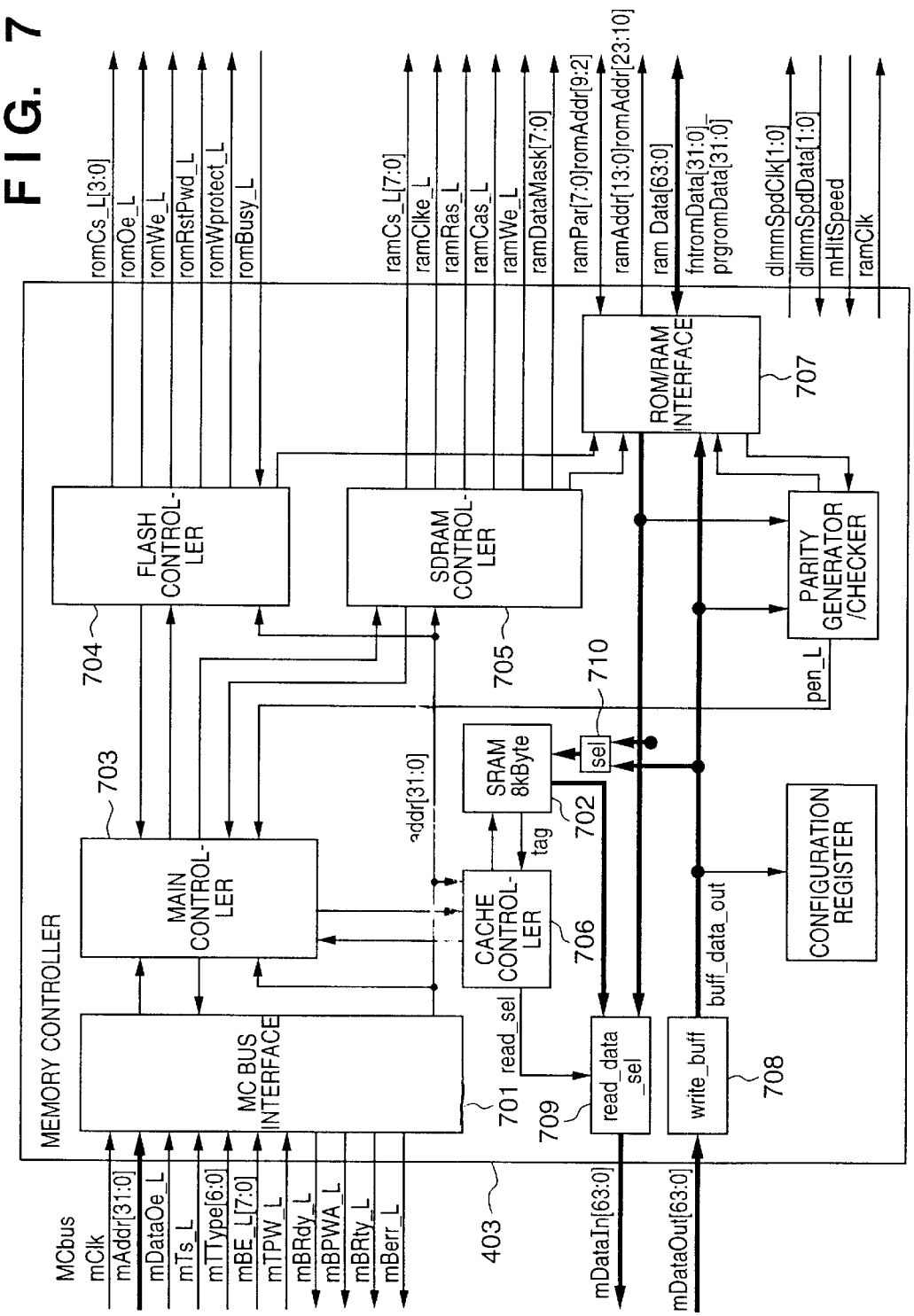
FIG. 7 is a block diagram showing a memory controller.

FIG. 7 is a block diagram of the memory controller 403. The memory controller 403, which is connected to the MC bus, namely the special-purpose local bus of the memory controller, supports a synchronous DRAM (SDRAM) of a maximum of 1 GB and 32-MB flash ROM or ROM. In order to exploit the characteristic high speed of the SDRAM at the time of burst transfer, 64 (16×4)-burst transfer is implemented. Taking into account single transfer of continuous addresses from the CPU or IO bus, an SRAM (memory front cache) 702 is incorporated within the main controller and direct single transfer to the SDRAM is avoided to the maximum extent to thereby raise the transfer efficiency. The data bus width between the memory controller and the SDRAM is 72 bits for the signals ramData and ramPar (of which the 8-bit signal ramPar is parity), and the width of the data buses fntromData, prgromData between the memory controller and the flash ROM is 32 bits.

2.4.2. Construction and operation

Each portion of the main controller has a construction which will now be described.

<MC bus interface (701)>

The MC bus is a special-purpose bus between the SMM 402 and the memory controller 403 and is used as the basic bus within the SBB.

The burst transfer of the special-purpose PBus connecting the CPU 401 and the system bus bridge 402 is limited to four bursts, whereas transfers up to 16 bursts×4 are added on in the MC bus. For this reason, mTType [6:0] is defined anew as a signal indicating the burst length.

(Definition of MC bus signals)

Each signal of the MC bus is defined as set forth below.

mClk (output) . . . MC bus clock mAddr[31:0] (output) . . . MC bus address

Each of these signals is a 32-bit address and is held from the moment mTs_L is asserted to the moment mBRdy_L is asserted.

mDataOut[63:0] (output) . . . MC bus data output

This signal is 64-bit output data and is valid only when mDataOe_L has been asserted.

mDataOe_L (output) . . . MC bus data output enable

This signal indicates that signal mDataOut[63.0] is valid. Further, it indicates that the transfer is Write.

mDataIn[63:] (input) . . . IC bus data input

This signal is 64-bit input data and is sampled at the rising edge of mClk at which mBRdy_L is being asserted.

mTs_L . . . (output) MC bus transaction start strobe

This signal indicates that transfer has started. It is asserted only during the initial clock of the transfer. If the transfer ends at one clock and the next transfer starts immediately, mTs_L remains asserted as is.

mTType[6:0] (output) . . . MC bus transaction type

This signal indicates the type of transfer on the MC bus. At the time of single transfer, this signal is held during the transfer. At the time of burst transfer, the signal is held during the initial transfer (beat). The three higher order bits represent the source (master) and the lower order bits the single/burst length. The types are as follows:

| mTType [6:4] | Signal Source |
|---|---|
| 001 | CPU |
| 010 | IO bus |
| 100 | G bus |

-continued

| mTType [3:0] | Single/Burst Length |
|---|---|
| 1xxx | single (1–8 byte) |
| 0001 | 2 bursts |
| 0010 | 4 bursts |
| 0011 | 6 bursts |
| 0100 | 8 bursts |
| 0101 | 16 bursts |
| 0110 | 2 × 16 bursts |
| 0111 | 3 × 16 bursts |
| 0000 | 4 × 16 bursts | mBE_L[7:0] (output) . . . MC bus transaction byte enable

This signal indicates a valid byte lane on the 64-bit data bus at the time of single transfer. At the time of burst transfer the signal is valid only for Write and is ignored for Read.

mBRdy_L (input) . . . MC bus ready

This signal indicates that the present transfer (beat) has ended.

mTPW_L (output) . . . Next transaction is in-page write

This signal indicates that the next transfer is a write on the same page (same row address). Write can be continued up to a maximum of four. Page size is set in a configuration register in advance.

mBPWA_L (input) . . . Bus in-page write allowed

This signal indicates whether the MC bus slave (memory controller) allows an in-page write transaction and is sampled at the same clock as that of mBRdy_L. If mBPWA_L is de-asserted at this time, mTPW_L is rendered meaningless.

mBRty_L (input) . . . Bus retry

This signal is asserted in a case where the MC bus slave (memory controller) terminates access without access having been executed and indicates that retry must be performed after idling for more than at least one cycle. (In a case where mBRdy_ and mBRty_L have been accessed simultaneously, mBRty_L takes priority.)

mBerr_L (input) . . . Bus error

This signal is asserted in a case where a parity error or other bus error has occurred.

It should be noted that the above-described indications of input/output are definitions as seen only from the SBB.

(MC bus transaction)

The following transactions are supported as transactions on the MC bus:

① Basic transaction (1, 2, 3, 4, 8-byte Read/Write)

A 1, 2, 3, 4, 8-byte single transaction is supported in accordance with mBE_L[7:0].

② Burst transaction

A transaction (from the CPU) up to a 4-double-wide burst is supported.

③ A transaction from the G bus up to 16-double-wide burst×4 is supported.

④ In-page write transaction

Continuous write access is supported in regard to the same in-page write indicated by mTPW_L.

⑤ Bus retry

In a case where memory access cannot be performed owing to a limitation within the memory controller, mBRty_L is asserted and bus retry is reported.

<SDRAM controller (705)>

The memory controller 403 controls a SDRAM having the following construction in the manner set forth below:

(DRAM construction)

As for DRAM construction, ×4, ×8, ×16 bit type 16/64 megabit SDRAMs can be 8-bank controlled by a 64-bit data bus.

TABLE 2

| NUMBER OF DEVICES IN BANK | DEVICE CON-STRUCTION | ROW BITS (BANK SELECTION BIT × COLUMN BITS | BANK SIZE | MAXIMUM MEMORY (8 BANKS) |
|---|---|---|---|---|
| 16 (64-MBIT TYPE) | 16 M × 4 | 14 × 10 | 128 MB | 1 GB |
| 8 (64-MBIT TYPE) | 8 M × 8,9 | 14 × 9 | 64 MB | 512 GB |
| 4 (64-MBIT TYPE) | 4 M × 16,18 | 14 × 8 | 32 MB | 256 GB |
| 16 (64-MBIT TYPE) | 4 M × 4 | 12 × 10 | 32 MB | 256 GB |
| 8 (64-MBIT TYPE) | 2 M × 8,9 | 12 × 9 | 16 MB | 128 GB |
| 4 (64-MBIT TYPE) | 1 M × 16,18 | 12 × 8 | 8 MB | 64 GB |

(DRAM address bit construction)

With regard to assignment of DRAM address bits, MA[13:0] is used in case of a 64-bit DRAM and MA[11:0] is used in case of a 16-bit SDRAM.

TABLE 3

| 64 Mbit SDRAM | | | | | | |
|---|---|---|---|---|---|---|
| 31 | 30 | 29 . . . 27 | 26 | 25 | 24 . . . 11 | 10 . . . 3 | 2 . . . 0 |
| 0 | 0 | CS | | C9 | C8 | R13 . . . R0 | C7 . . . C0 | BS |

| 16 Mbit SDRAM | | | | | | |
|---|---|---|---|---|---|---|
| 31 | 28 | 27 . . . 25 | 24 | 23 | 22 . . . 11 | 10 . . . 3 | 2 . . . 0 |
| 0 | 0 | Cs | | C9 | C8 | R11 . . . R0 | C7 . . . C0 | BS |

0 Zero

Cs Chip Select

C9-C0 Column Address

C8 ignored in case of ×8 bit SDRAM

C9, C8 ignored in case of ×16 bit SDRAM

R13-R0 Row Address

R11 of 1M SDRAM used in bank select in SDRAM.

With 16M SDRAM, R12, R13 used in bank select in case of 4-bank arrangement and

R13 used in bank select in case of 2-bank arrangement.

BS Byte Select

[SDRAM programmable construction (mode register)]

The SDRAM has an internal mode register and sets the following items using a mode register set command:

① Burst length

Burst length can be set to any of 1, 2, 4, 8, full page. However, since burst transfer length from the CPU is 4, 4 is the optimum burst length. Transfer from the G bus in excess of 16 bursts is realized by issuing the Read/Write command (without automatic pre-charge) successively.

② Wrap type

The order in which the address is incremented at the time of burst transfer is set at this item. Either "sequential" or "interleaved" can be set.

③ CAS latency

Any of 1, 2 or 3 can be set for CAS latency. This is decided by the grade of the SDRAM used and the operating clock.

(SDRAM command)

The following commands are supported with regard to the SDRAM. The details of each command are described in the SDRAM data book.

Mode register setting command
Precharge command
Write command
Read command
CBR(Auto) refresh command
Self-refresh start command
Burst stop command
NOP command (SDRAM refresh)

Since the SDRAM is a 2048 cycle/32 ms (4096/64 ms) SDRAM, the CBR refresh command is issued every other 16,625 ns. The memory controller has a settable refresh counter and issues the CBR refresh command automatically. A refresh request is not accepted during the time that a 16-burst×n transfer from the G bus is being carried out. Accordingly, a refresh counter must set a value having enough margin with respect to time for performing the 16-burst×n transfer. Further, self-refresh is supported. When this command is issued, self-refresh continues resumes at the time of the power-down mode (ramclke_L=Low).

(SDRAM initialization)

The memory controller initializes the SDRAM, in the manner set forth below, after power-on reset. Specifically, after a pause of 100 μs following introduction of power, the memory controller (1) precharges all banks using the precharge command;
(2) sets the mode register of the SDRAM; and
(3) performs refresh eight times using the auto-refresh command.

<Flash ROM controller (704)>

A flash ROM controller 704 supports an address signal romAddr[23:2] and four chip-select (romCs_L[3:0] signals. Address signals romAddr2–romAddr9 are multiplexed with parity signals ramPar0–rampar7, and address signals romAddr10–romAddrw23 are multiplexed with DRAM addresses ramAddr0–ramAddr13.

<SRAM control (memory front cache)>

An SDRAM used as a main memory provides very high burst transfer speed but such high speed cannot be achieved in case of a single transfer. Accordingly, a memory front cache is packaged within the memory controller to speed up single transfer. The memory front cache is composed of a cache controller 706 and an SRAM 702. Since the transfer master and transfer length can be ascertained by the mTType [6:0] signal defined for the MC bus, cache ON/OFF can be set for every master or for every transfer length. The cache schemes are as set forth below. It should be noted below that, unless stated otherwise, the term "simple cache" or "cache memory" refers not to a cache incorporated within the processor core but to a memory front cache incorporated in the main controller.

Figure 8:
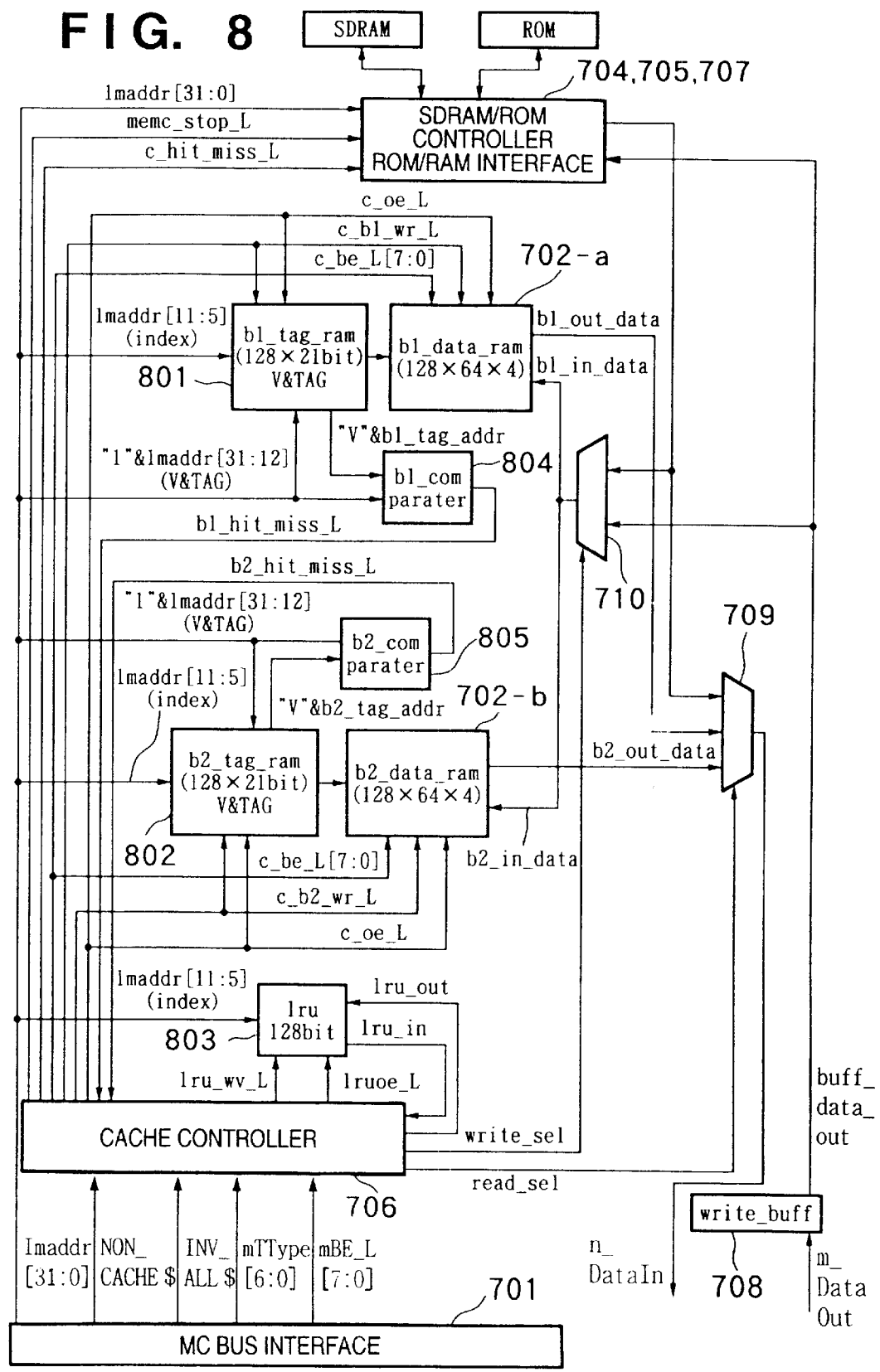
FIG. 8 is a detailed block diagram the focus of which is a cache controller.

2-way set associative
8-KB data RAM
128×21×2 Tag RAM
LRU (Least Recently Used) algorithm
Write-thru
No write allocate Cache operation in a case where a memory read/write transfer has been requested from an MC bus will be described with reference to the block diagram of FIG. 8 and the flowcharts of FIGS. 9 and 10.

If data transfer from an MC bus starts, it is judged whether the transfer is performed with cache ON or with cache OFF depending upon mTType[6:0] indicated on the MC bus at the start of the transfer. In this description, the ON decision is rendered if the transfer is single transfer and the OFF decision is rendered if the transfer is burst transfer (step S901). That is, if mTType(3) is "1"h, this represents single transfer and, hence, the transfer is performed with the cache ON. If mTType(3) is "0"h, this represents burst transfer and, hence, the transfer is performed with the cache OFF.

If address lmaddr[31:0] is applied in case of single transfer (cache ON), then it is applied to b1_tag_ram 801, b2_tag_ram 802, b1_data_ram 702-a, b2_data_ram702-b and lru 803 with lmaddr[11:5] serving as the index, and valid bit "v" and b1_tag_addr"; valid bit "v" and b2_tag_addr; b1_out_data; b2_out_data; and lru_in, which correspond to the entered index, are output from the respective blocks (step S902).

Next, b1_tag_addr and b2_tag_addr output by b1_tag_ram 801 and b2_tag_ram 802 are compared with the address lmaddr[31:12] by a b1_comparator 804 and b2_comparator 805. The result, namely hit or miss, is reported to the cache controller 706 by b1_hit_miss_L, b2_hit_missL signals, whereby hit or miss is judged (step S903).

In case of a hit, read or write is determined (step S904). If a hit is detected, this is a case where the address lmaddr [31:12] agrees with either b1_tag_addr or b2_tag_addr. If a hit is detected and then read is determined, operation is as follows: If b1 is a hit and the requested transfer is read, b1_out_data is selected of b1_out_data and b2_out_data that have already been read out, and 8-byte data indicated by lmaddr[4:3] is output to the MC bus (step S905). At the same time, lru corresponding to this index is rewritten as "0" (=b1 hit) and the transfer is terminated. If b2 is a hit and the requested transfer is read, b2_out_data is selected of b1_out_data and b2_out_data that have already been read out, and 8-byte data indicated by lmaddr[4:3] is output to the MC bus (step S905). At the same time, lru corresponding to this index is rewritten as "1"h (=b2 hit) and the transfer is terminated.

On the other hand, if a hit is detected and then write is determined, operation is as follows: If b1 is a hit and the requested transfer is write, then, of the 8-byte data indicated by lmaddr[4.3] of b1_data_ram 702-a indicated by the index, only a valid byte lane indicated by mBE_L[7.0] is rewritten. At the same time, lru corresponding to this index is rewritten as "0"h (=b1 hit). Further, the SDRAM also is rewritten and transfer is terminated in similar fashion (step S906). If b2 is a hit and the requested transfer is write, then, of the 8-byte data indicated by lmaddr[4.3] of b2_data_ram 702-b indicated by the index, only a valid byte lane indicated by mBE_L[7.0] is rewritten. At the same time, lru corresponding to this index is rewritten as "1"h (=b2 hit). Further, the SDRAM also is rewritten and transfer is terminated in similar fashion (step S906).

If b1 and b2 are both misses, on the other hand, a read or write judgment is rendered (step S1001). If the requested transfer is read, 8-byte data indicated by lmaddr[31:3] is read out of the SDRAM (step S1003) and is output to the MC bus (step S1004). At the same time, lru corresponding to this index is read out. If lru is "0"h, data from the SDRAM is written to b2_data_ram and lru also is rewritten as "1"h. If lru is "1"h, data from the SDRAM is written to b1_data_ram and lru also is rewritten as "0"h (step S1005), after which the transfer is terminated. If b1 and b2 are both misses and the requested transfer is write, the data is merely written to the SDRAM and the transfer is terminated (step S1002).

In case of a burst transfer (cache OFF) at step S901, read is carried out only with respect to the SDRAM (steps S907, S909) and rewriting of cache data or tags is not performed. In case of burst write, it is determined whether or not data corresponding to the write address is cached in a cache line. When it is determined that the data is cached, a valid bit of the cache line is cleared and the cache line is invalidated.

<ROM/RAM interface (707)>

Figure 11:
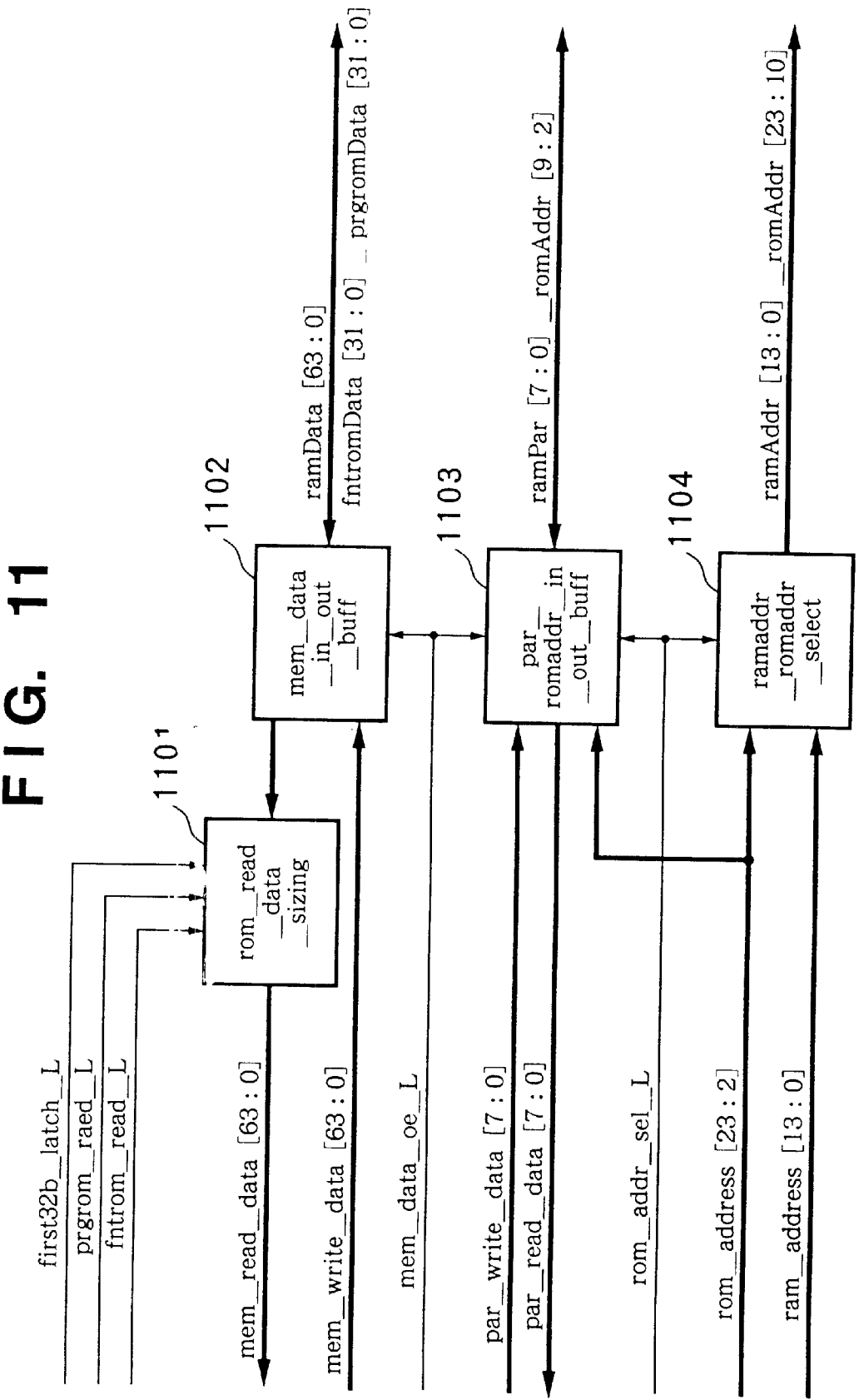
FIG. 11 is a diagram showing the construction of a ROM/RAM controller.

FIG. 11 illustrates the construction of the ROM/RAM controller 707. An SDRAM data signal, address signal and parity signal are multiplexed with the data signal and address signal of a flash ROM by blocks 1101 through 1104.

2.4.3. Timing diagrams

The timing of processing, such as data read and write, by the memory controller 403 set forth above will be described with reference to FIGS. 12 through 19.

Figure 12:
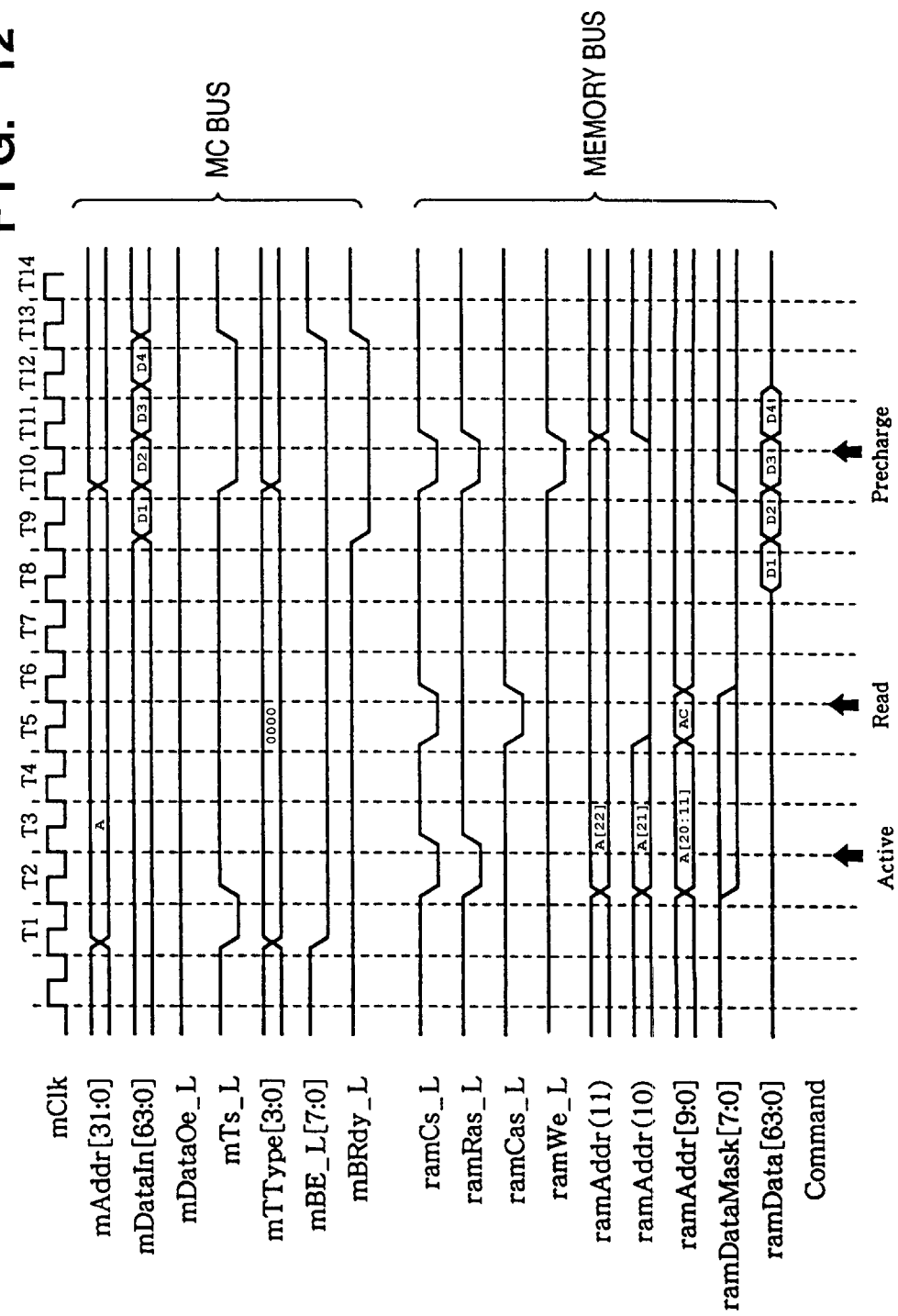
FIG. 12 is a timing chart showing the timing of burst readout from a CPU.

FIG. 12 shows the timing of burst readout from the CPU. The burst length is 4 and the CAS latency is 3. This corresponds to the processing at step S909 in FIG. 9.

Figure 13:
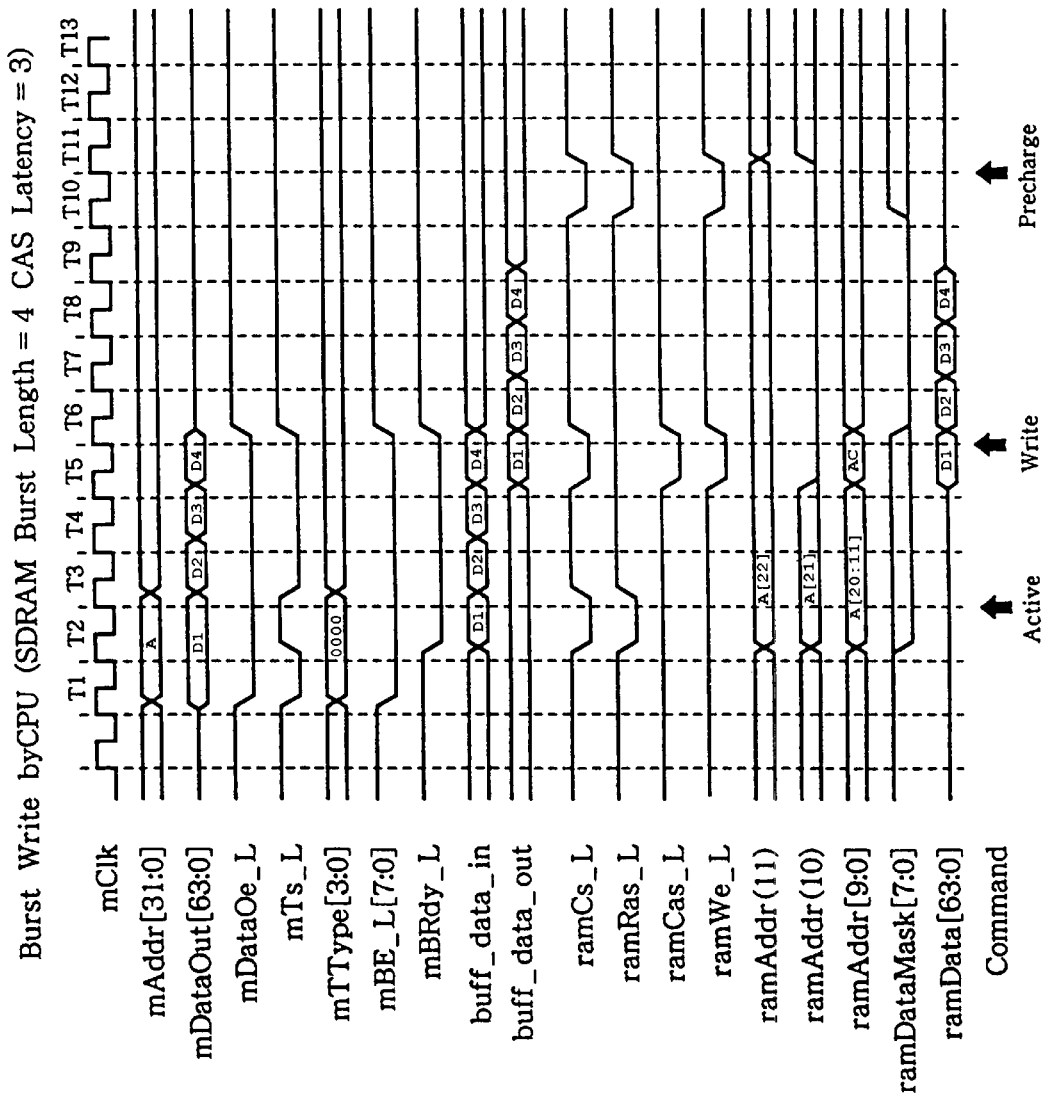
FIG. 13 is a timing chart showing the timing of burst write from a CPU.

FIG. 13 shows the timing of burst write from the CPU. The burst length is 4 and the CAS latency is 3. This corresponds to the processing at S908 in FIG. 9.

Figure 14:
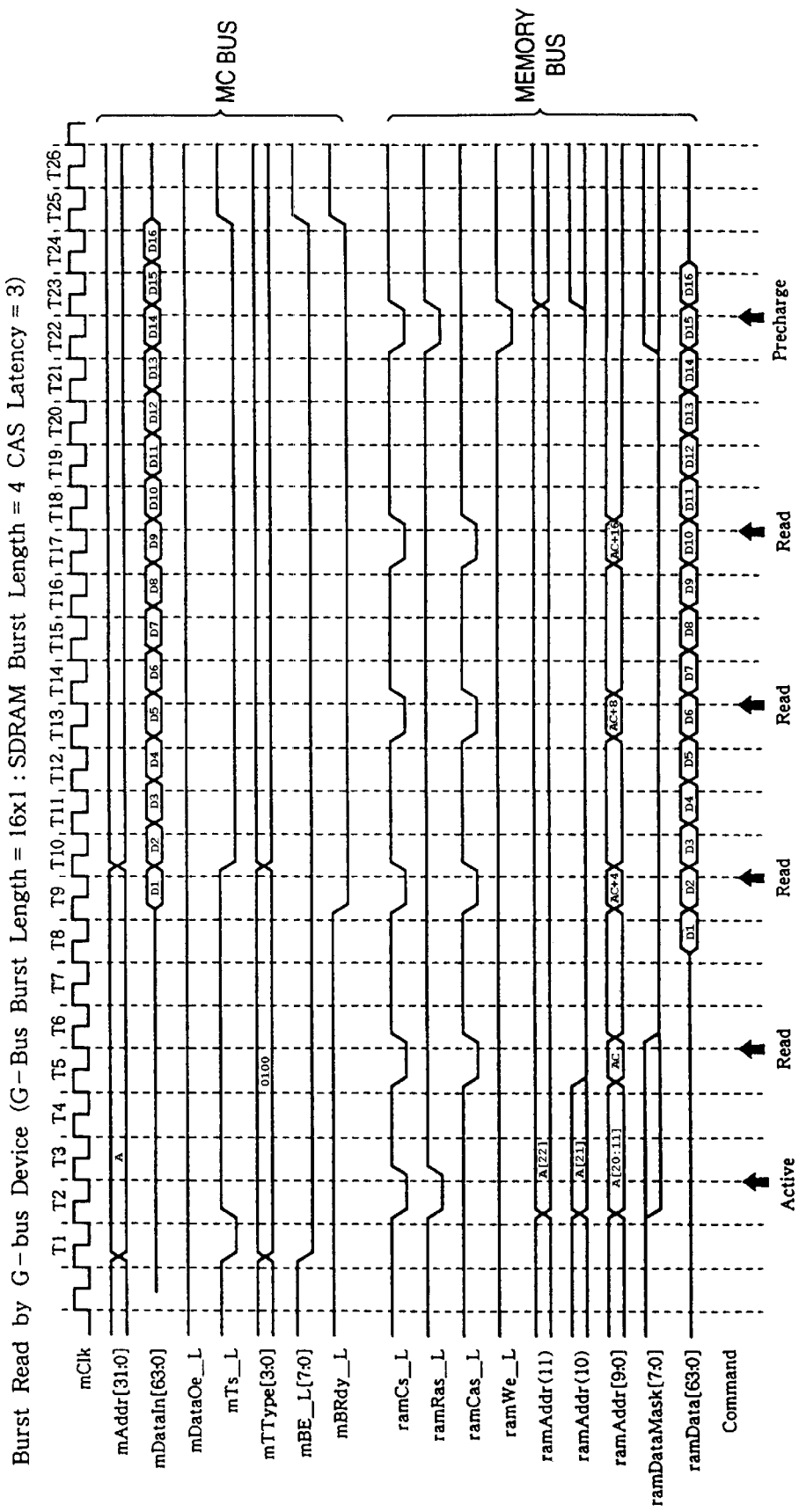
FIG. 14 is a timing chart showing the timing of burst readout from a G bus device.

FIG. 14 shows the timing of burst readout from the G bus device. The burst length of the G bus is 16, the burst length of the SDRAM is 4 and the CAS latency is 3. This corresponds to the processing at S909 in FIG. 9.

Figure 15:
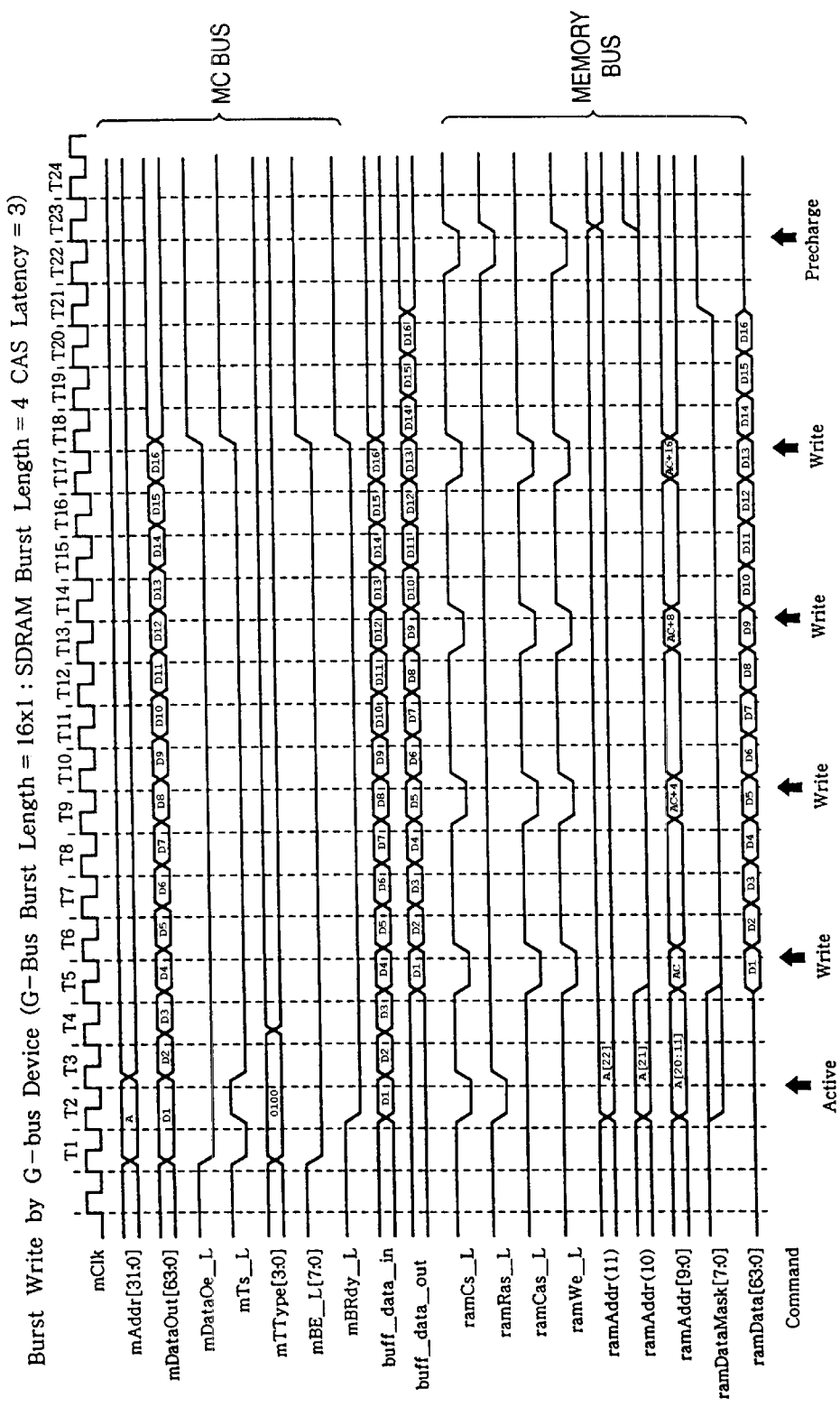
FIG. 15 is a timing chart showing the timing of burst write from a G bus device.

FIG. 15 shows the timing of burst write from the G bus device. The burst length of the G bus is 16, the burst length of the SDRAM is 4 and the CAS latency is 3. This corresponds to the processing at S908 in FIG. 9.

Figure 16:
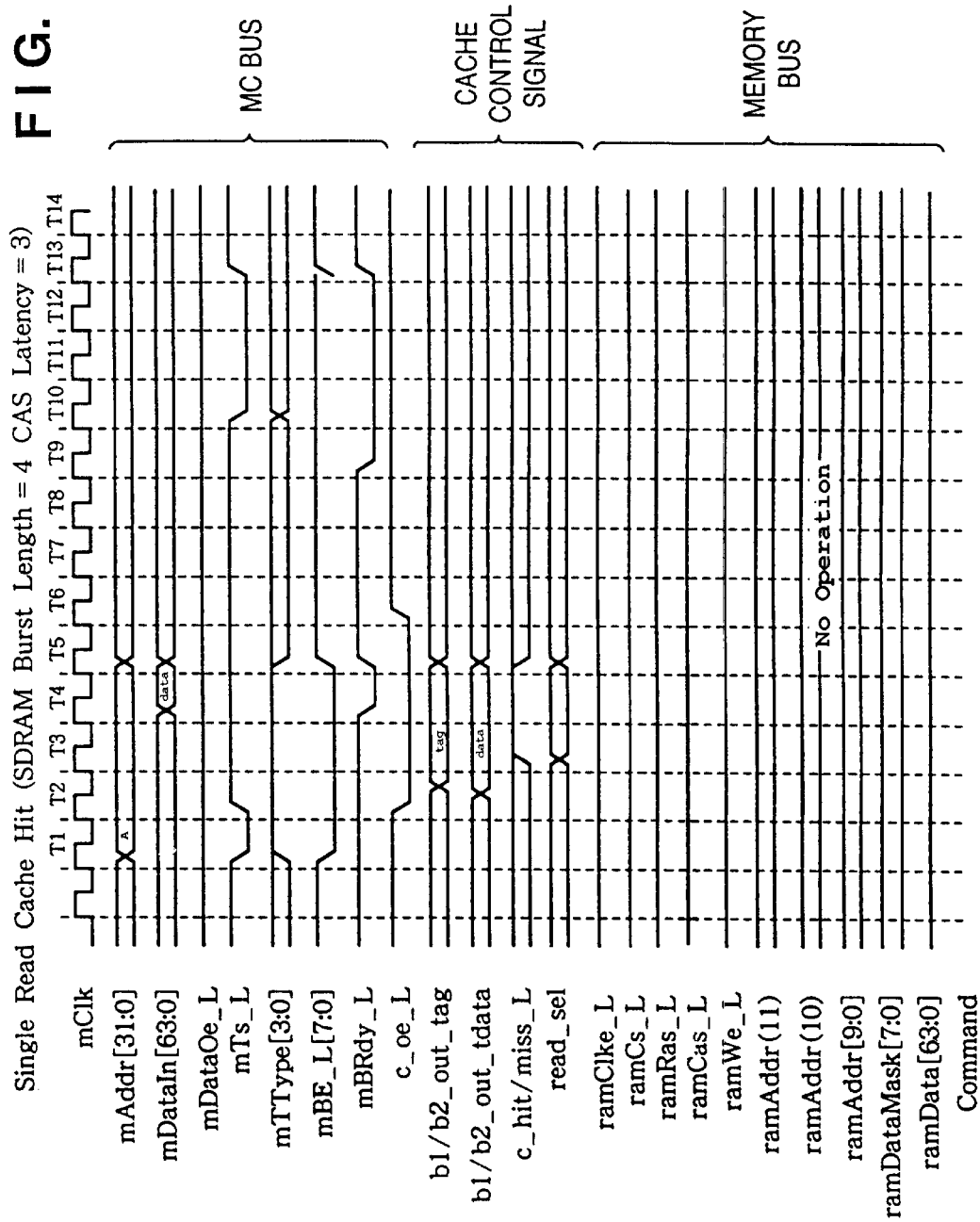
FIG. 16 is a timing chart showing the timing of single readout in a case where a hit has occurred in a memory front cache.

FIG. 16 illustrates the timing of single readout in case of a hit in the memory front cache. Here b1/b2_out_data, which has been read out of the cache memory b1_data_ram 702-a or b2_data_ram 702-b, is output as data mDataIn[63:0] to be read out. The burst length of the SDRAM is 4 and the CAS latency is 3. This corresponds to the processing at step S905 in FIG. 9.

Figure 17:
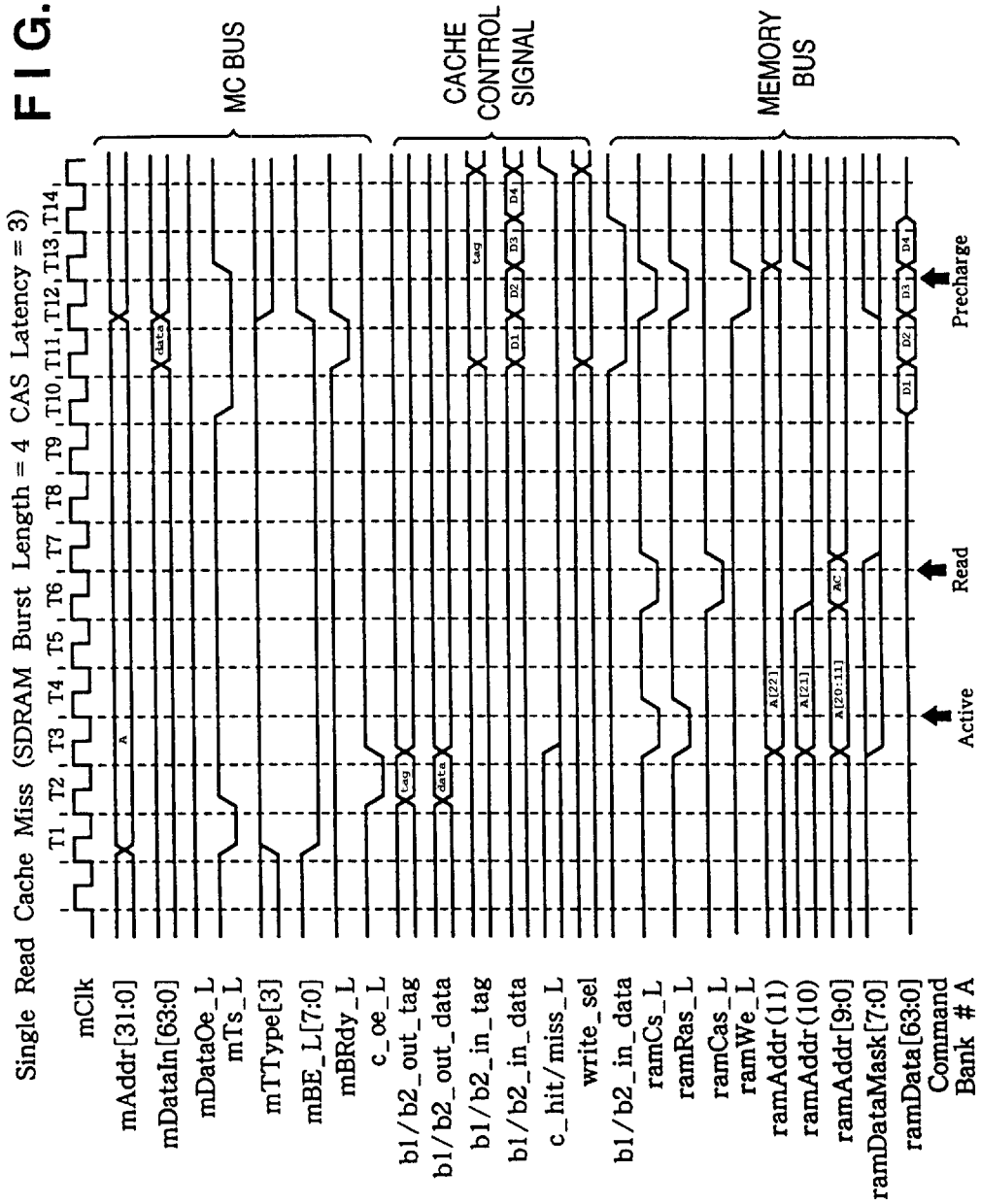
FIG. 17 is a timing chart showing the timing of single readout in a case where a hit has not occurred in a memory front cache.

FIG. 17 illustrates the timing of single readout in a case where there is no hit in the memory front cache. Data ramData[63:0], which has been read out of the SDRAM, is output as data mDataIn[63:0] to be read out. This data is written also to cache memory b1_data_ram 702-a or b2_data_ram 702-b as b1/b2_in_data. The burst length of the SDRAM is 4 and the CAS latency is 3. This corresponds to the processing at steps S1004 and S1005 in FIG. 10.

Figure 18:
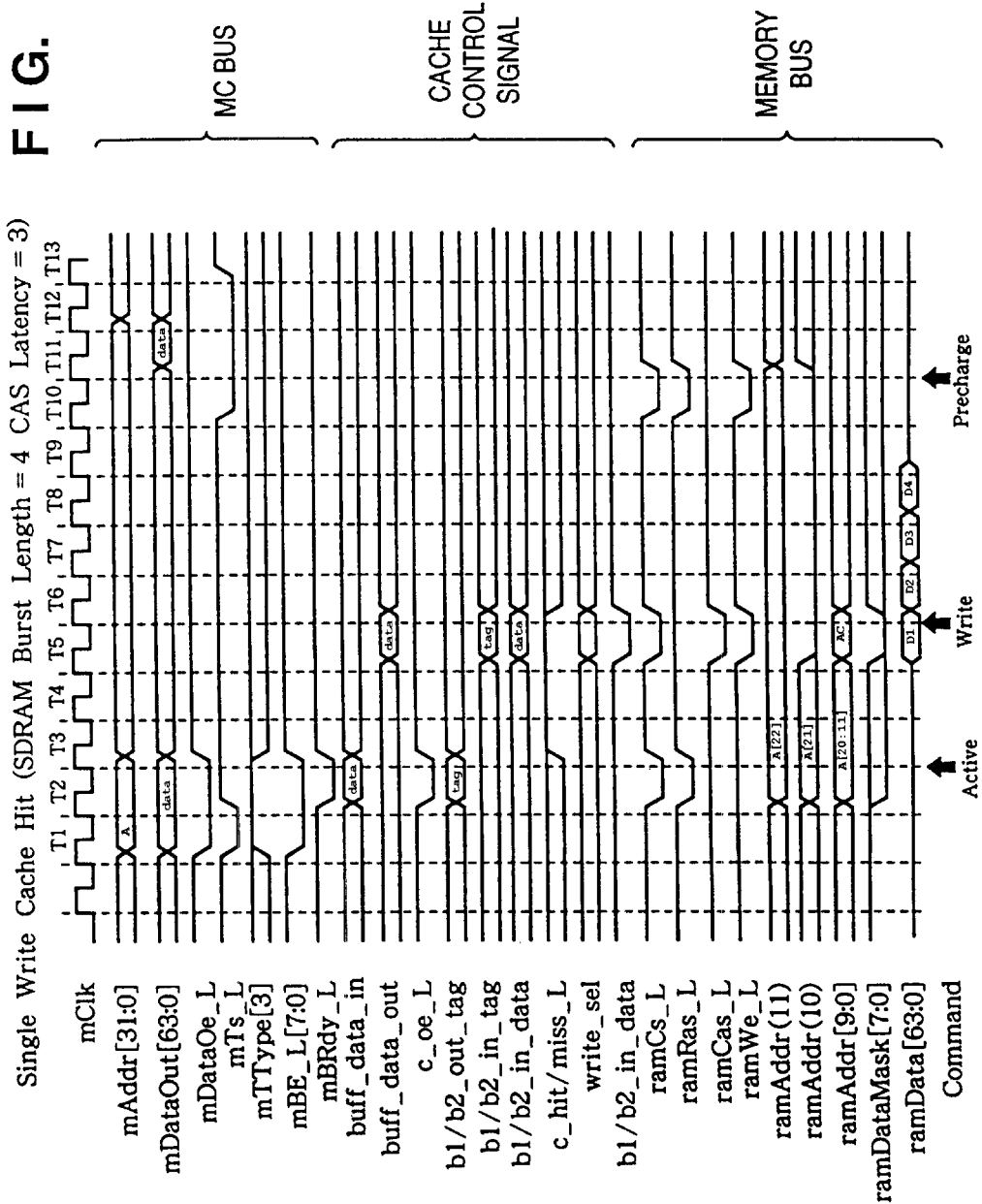
FIG. 18 is a timing chart showing the timing of single write in a case where a hit has occurred in a memory front cache.

FIG. 18 illustrates the timing of single write in case of a hit in the memory front cache. Data mDataOut[63:0] to be written is written to cache memory b1_data_ram 702-a or b2_data_ram 702-b and to the SDRAM as well. The burst length of the SDRAM is 4 and the CAS latency is 3. This corresponds to the processing at step S906 in FIG. 9.

Figure 19:
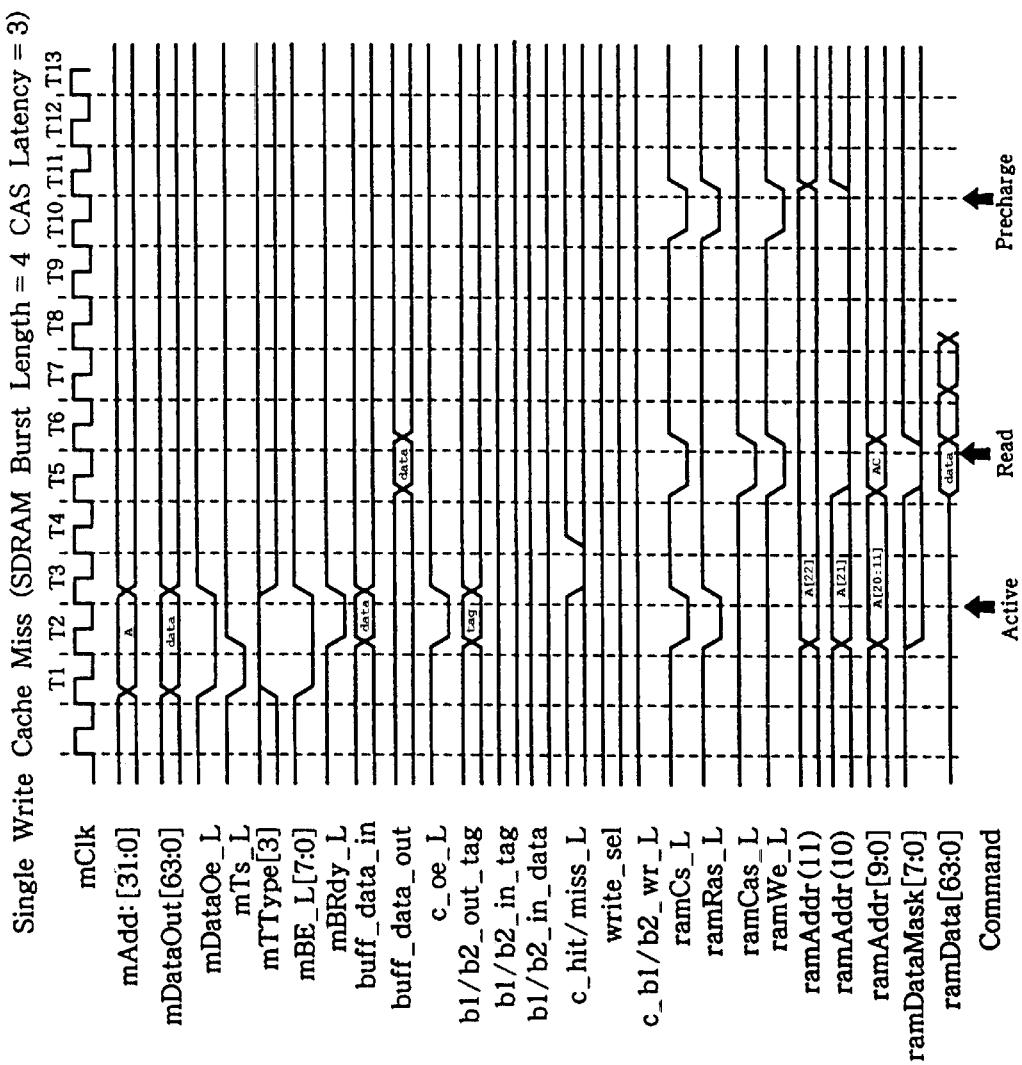
FIG. 19 is a timing chart showing the timing of single write in a case where a hit has not occurred in a memory front cache.

FIG. 19 illustrates the timing of single write in a case where there is no hit in the memory front cache. Data mDataOut[63:0] to be written is written only to the SDRAM and not to cache memory b1_data_ram 702-a or b2_data_ram 702-b. The burst length of the SDRAM is 4 and the CAS latency is 3. This corresponds to the processing at step S1002 in FIG. 10.

When data transfer is started from the MC bus, the cache ON is decision is rendered if the transfer is single transfer and the cache OFF decision is rendered if the transfer is burst transfer, depending upon mTType [6:0] indicated on the MC bus at the start of the transfer. However, an arrangement may be adopted in which, in the case of the burst transfer, the burst length is discriminated and cache ON is construed if the burst length is smaller than one line of the cache, with cache OFF being decided otherwise.

By including on the MC bus a signal that indicates the identifier of the bus master than requested the data transfer to the memory, the memory controller can discriminate this identifier and control the cache ON/OFF operation in dependence upon the identifier. In this case a rewritable table that maps identifiers and cache ON/OFF can be provided and cache ON/OFF can be changed over by referring to the table. This table can be rewritten from the CPU 401 by allocating specific addresses, etc.

2.5. System bus bridge (SBB) and IO bus, G bus

Figure 20:
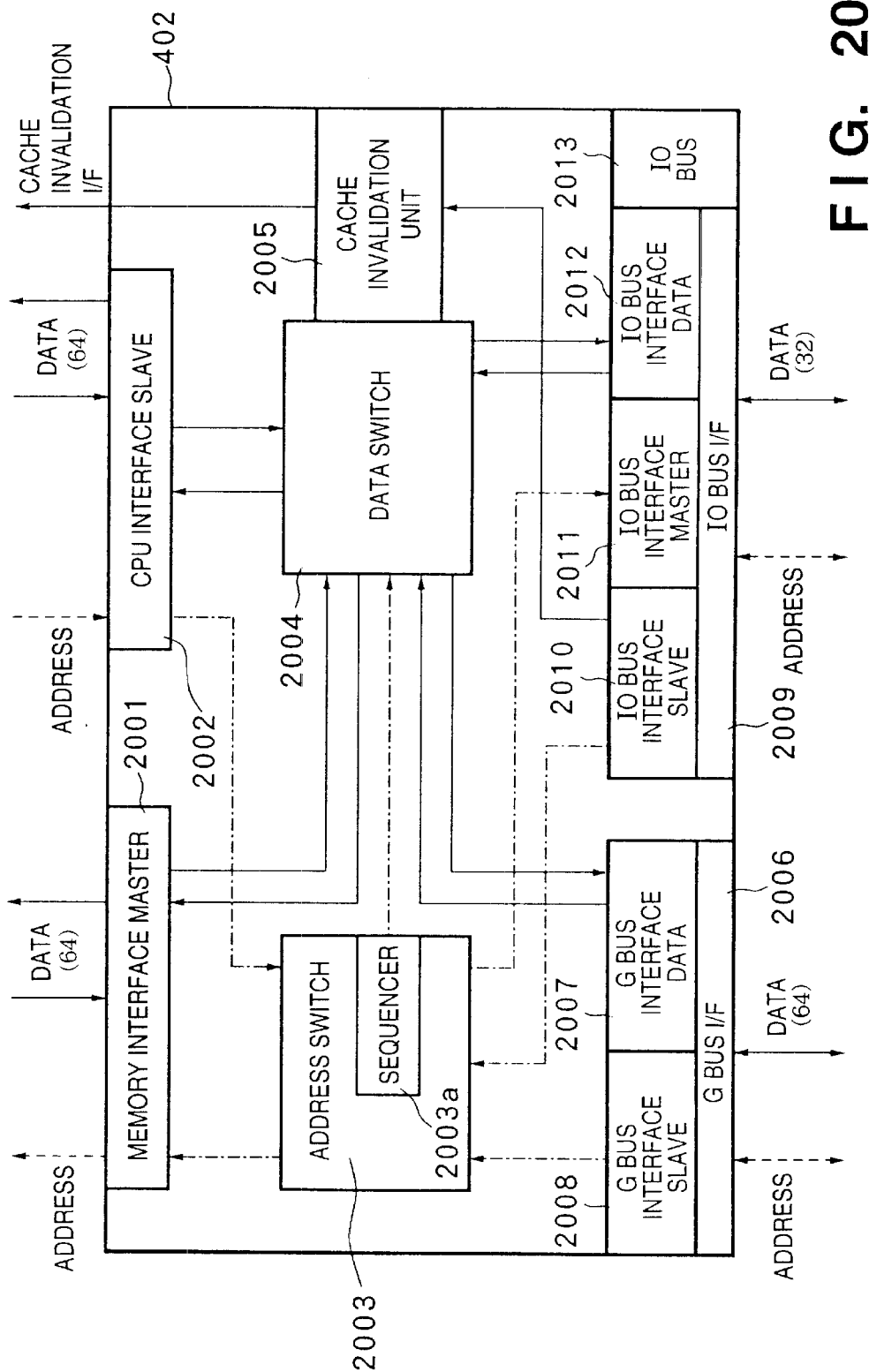
FIG. 20 is a block diagram of a system bus bridge (SBB)

FIG. 20 is a block diagram of the system bus bridge (SBB) 402.

The SBB 402 is a multichannel bidirectional bus bridge which provides the interconnection among the IO bus (input/output), G bus (graphics bus), P bus (processor local bus) and MC bus by using a crossbar switch. By virtue of the crossbar switch, the connections of two systems can be established simultaneously and it is possible to realize high-speed data transfer with a high degree of parallel operation.

The SBB 402, besides having an IO bus interface 2906 for connecting the IO bus 405, a G bus interface 2006 for connecting the G bus 404, a CPU interface slave port 2002 for connecting the processor core 401 and a memory interface master port for connecting the memory controller 403, also includes an address switch 2003 for connecting an address bus and a data switch 2004 for connecting a data bus. The SBB 402 further includes a cache invalidation unit 2005 for invalidating the cache memory of the processor core.

A write buffer for speeding up DMA writing from the IO bus device and read prefetch queues for raising the efficiency of the reading of the IO bus device are packaged in the IO bus interface 2009. Coherency management relating to data that exists in these queues temporarily is performed by hardware. It should be noted that a device connected to the IO bus is referred to as a "device".

The processor core supports dynamic bus sizing in regard to a 32-bit bus. However, this is not supported by the SBB 402. The reason is to minimize necessary modification of the SBB in a case where a processor core that does not support bus sizing is used in the future.

<IO bus interface>

Figure 21:
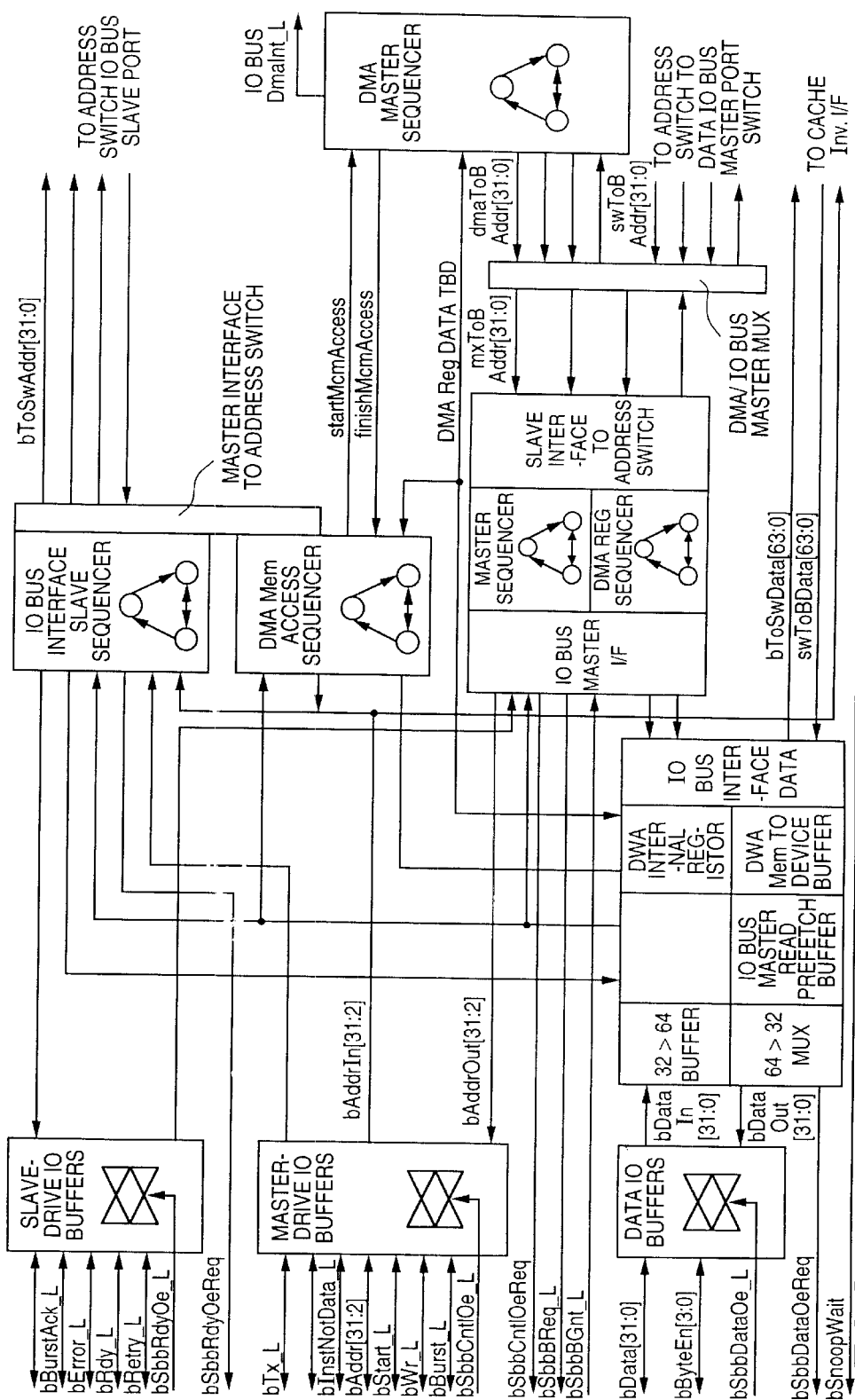
FIG. 21 is a block diagram of an IO bus interface.

FIG. 21 is a block diagram of the IO bus interface

The IO bus interface 2009 is a bidirectional bridge circuit between the IO bus and the MC bus. The IO bus is an internal general-purpose bus of the DoEngine.

Five blocks, namely a master control block 2011, slave control block 2010, data interface 2012, DMAC 2013 and IO bus buffer, are included in the IO bus interface 2009. In FIG. 21, the DMAC 2013 is partitioned functionally into three sequencers and register blocks. Among the three sequencers, a DMA memory access sequencer is incorporated within the IO bus slave control block 2010 and a DAM reg sequence is incorporated within the IO bus master control block 2011. A DMA register, which is a register block, is incorporated within the IO bus data interface 2012.

The IO bus interface 2009 controls invalidation of both data and instruction caches in the CPU shell via a cache invalidation interface when a write is performed from the IO bus side to the memory and when a transfer is made from a device to a memory by DMA.

Though a write-back buffer for when CPU write is performed is not packaged in the IO bus interface, a write buffer for external master write on the IO bus is packaged in the IO bus interface. As a result, continuous write from an external master, which is not burst transfer, is speeded up. Flashing of this write buffer is performed when connection to the memory is allowed by the IO bus arbiter 407. Write buffer bypass of the IO bus master read is not carried out.

Further, read prefetch queuing of the external master is executed. As a result, continuous readout of a data stream from an external master is speeded up. Invalidation of the read buffer is performed 1. when new reading of the IO bus has not produced hit in the buffer;
2. when write from the CPU to the memory has been performed;
3. when write from the G bus to the memory has been performed; and
4. when write from the IO bus to the memory has been performed.

The DMA controller 2013 between each device on the IO bus 405 and the memory is incorporated within the IO bus interface 2009. By incorporating a DMA controller in the system bus bridge 402, access requests can be issued to the bridge in both directions simultaneously and efficient DMA transfer can be implemented.

The IO bus interface 2009 does not require use of dynamic bus sizing in response to an access request from the processor 401 and does not support bus sizing from the memory controller 403 when there is a memory access request from the IO bus master. In other words, the memory controller should not expect bus sizing.

<IO bus>

The IO bus is a general-purpose bus within the DoEngine and has the following specifications:

address, data discrete-type 32-bit bus any weight cycle insertable; shortest is no wait supports burst transactions maximum transfer speed is 200 MB/s when clock is 50 MHz supports bus error and bus retry supports plural bus masters (IO bus signal definition)

The definition of bus signals will now be described. The format of the descriptions will be "signal name (in English): input source>output destination, (3 State) . . . description of the signal". It should be noted that the "3 States" item is limited to a 3-state signal.

bAddr[31:2] (IO Bus Address Bus): Master>Slave, 3 State . . . IO Bus address bus bData[31:0] (IO Bus Data Bus): DataDriver>DataReceiver, 3 State . . . IO Bus data bus b(Datadrivername)DataOeReq (IOBus Data Output Enable Request): Datadriver>DefaultDriverLogic . . . This is an output signal to default driver control logic for the purpose of realizing a bidirectional IO bus, described later. This is a request signal for driving data on the bus by a device having Datadrivername. b (Datadrivername) DataOe_L is output from default driver control logic to a device for which output of data has been allowed. Examples of Datadriver are Pci, Sbb, Jpeg, Spu, etc.

b(Datadrivername) DataOe_L (IOBus Data Output Enable): dfaultDriverLogic>Datadriver . . . In a case where default driver logic allows drive of data to the data bus in regard to a device that has output b(Datadrivername) DataOeReq, the b(Datadrivername)DataOe_L signal is sent back to this device.

bError_L (IOBus Bus Error): Slave>Master, 3 State . . . This signal indicates that an IO transaction has ended in an error.

b(Mastername)BGnt_L (IOBus Grant): Arbiter> Master . . . Indicates that this master has obtained the privilege to use the bus by a bus arbiter transaction. Examples of Mastername are Pci, Sbb, Jpeg, Spu, etc.

bInstNotData (IOBus Instruction/Data Output Indicator): Master>Slave, 3 State . . . In a case where the IO bus master performs an instruction fetch with regard to the IO bus slave, this signal is driven high. In case of a data transaction, the signal is driven low.

b(Mastername)CntIoeReq (IOBus Master Control Output Enable Request): Master>DefaultDriverLogic . . . In a case where the IO bus master wishes to drive signals bStart_L, bTx_L, bWr_L,vInstNotData and bAddr[31:2] on a 3-state bus, this signal is asserted in regard to IOBus Output Control Logic. Based upon bMCntlOeReq, IO Bus Output Control Logic sends signal b(Mastername)CntlOe_L, from each master, back to the master which allows drive.

b(Mastername)CntlOe_L (IOBus Master Control Output Enable): DefaultDriverLogic>Master . . . In a case where default driver logic allows drive of a signal in regard to a master that has output b(Mastername)CntlOeReq, the b(Mastername)CntlOe_L signal is sent back to this master.

bRdy_L (IOBus Ready): Slave>Master, 3 State . . . The IO bus slave asserts this signal in order to indicate that the present IO bus data transaction will end at the present clock cycle. The IO bus master ascertains from this signal that the present transaction will be ended by this clock cycle.

b(Mastername)BReq_L (IOBus Bus Request): Master>Arbiter . . . Indicates that the IO bus master has requested bus use privilege of the IO bus arbiter.

bRetry_L (IOBus Bus Retry): Slave>Master, 3 State . . . Requests re-execution of the bus transaction.

b(Slavename)RdyOeReq (IOBus Slave Ready Output Enable Request): Slave>DefaultDriverLogic . . . In a case where the IO bus slave wishes to drive bRdy_L, bWBurstReq_L, bBurstAck_L on a 3-state bus, this signal is asserted in regard to IOBus Output Control Logic. Based upon b(Slavename)RdyOeReq, IO Bus Default Driver Logic sends signal b(Slavename)RdyOe_L, from each master, back to the slave which allows drive.

b(Slavename) RdyOe_L (IOBus Slave Ready Output Enable): DefaultDriverLogic>Slave . . . In a case where default driver logic allows drive in regard to a master that has output b(Slavename)RdyOeReq, the b(Slavename) RdyOe_L signal is sent back to this master.

bSnoopWait (IOBus Snoop Wait): SBB>NextMaster: Indicates that the IO bus interface is currently executing cache snooping in regard to another device connected to the IO bus. The device connected to the IO bus cannot issue a new transaction while this signal is being asserted.

bStart_L (IOBus Transaction Start): Master>Slave, 3 State . . . This is a signal which indicates that the IO bus master starts an IO bus transaction. By monitoring this signal, the IO bus slave can ascertain start of an IO bus transaction.

bTx_L (IOBus Transaction Indicator Input): Master>Slave, 3 State . . . This signal is asserted in order to indicate that the IO bus master is currently executing an IO bus transaction with respect to the IO bus slave.

bWBurstGnt_L (IO Bus Burst Write Grant): Master>Slave, 3 State . . . This signal is driven in order to indicate that the IO bus master executes burst write in response to a request for IO bus burst write.

bWBurstGnt_L (IO Bus Burst Write Request): Slave>Master, 3 State . . . This signal is asserted in a case where the IO bus slave requests burst write in regard to an IO bus master.

bWr_L (IOBus Write Transaction Indicator): Master>Slave, 3 State . . . This signal is asserted in order for the IO bus master to indicate that the present transaction is a write in regard to the IO bus slave.

bByteEn[3:0] (IO Bus Byte Enables): Data Driver>Data Receiver, 3 State . . . This signal is driven high in order for an agent which drives data on the IO bus to indicate that a byte lane on bData[31:0] corresponding to each bit is valid. Each line of this signal and the byte lane of the bData are related as shown in Table 4.

TABLE 4

| Byte Enable | Corresponding bData [31:0] |
|---|---|
| bByte En3 | [31:34] |
| bByte En2 | [23:16] |
| bByte En1 | [15:8] |
| bByte En0 | [7:0] | bBurst_L (IO Bus Extented Burst Request): Master>Slave, 3 State . . . Indicates that the IO bus master wishes to perform an extended burst. Assert and negate timings are the same as bTx_L.

bBurstAck_L (IO Bus Extended Burst Acknowledge): Slave>Master, 3 State . . . Indicates that the IO bus slave can perform an extended burst. Assert and negate timings are the same as bRdy_L.

bBurstShortNotLong_L (IO Bus Burst Length): Master>Slave, 3 State . . . Indicates burst length in a case where the IO bus master performs an extended burst. Assert and negate timings are the same as bTx_L. The correspondence between signal values and burst lengths are shown in Table 5.

TABLE 5

| bBurst Short Not Long_L | Burst Length |
|---|---|
| H | 4 beats |
| L | 8 beats |

The IO bus signals are as set forth above. Since the IO buses (and G buses), which are the internal buses of the DoEngine, are such that the number of function blocks that can be connected is ten or more, it is difficult to connect all blocks the InOut discrete buses. In-chip bidirectional buses are employed in DoEngine.

<G bus interface>

Figure 22:
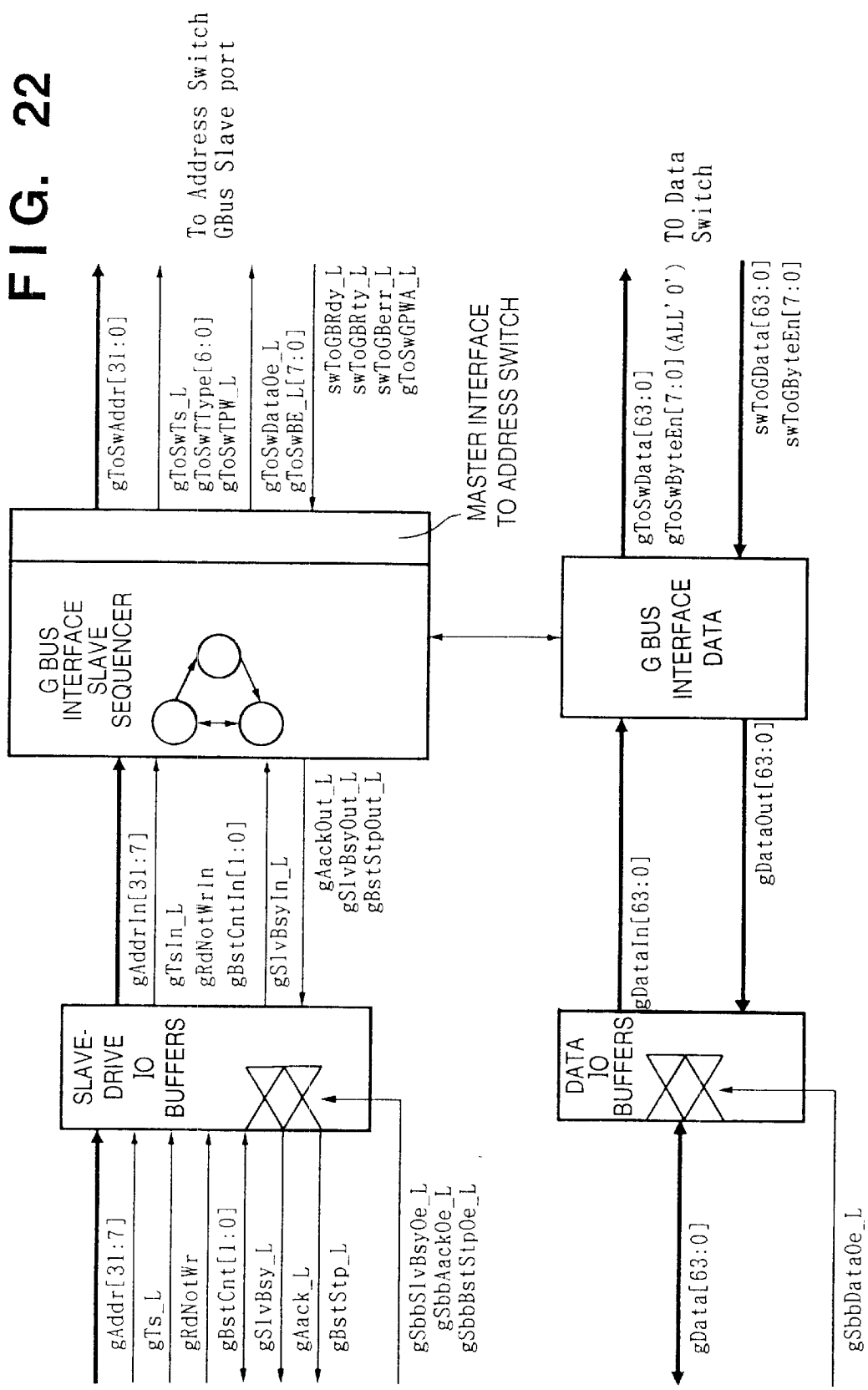
FIG. 22 is a block diagram of a G bus interface.

FIG. 22 is a block diagram of the G bus interface 2006. An overview of this interface will now be described.

(Outline of G bus)

The G bus is a bus defined in order to execute data transfer between the image data processors at high speed within a single-chip controller DoEngine for MFP. The G bus possesses a 64-bit data bus and supports an address space of 4 GB (128-byte boundary). The basic transfer is such that 16 beats (128 bytes=64 bits×16) is adopted as one long burst, and up to four successive long bursts (512 bytes=16 beats×4) are made possible. (A transfer of less than 16 beats, such as a single beat, is not supported.)

(G bus signal definition)

The symbols used in defining the signals are determined first. The direction of the signal is described as necessary immediately after the signal name. The determinations are made as follows:

In (Input signal) . . . input signal to bus agent
Out (Output signal) . . . output signal from bus agent
InOut (Bidirectional tri-state signal) . . . bidirectional signal A plurality of agents perform drive by these signals. Only one agent performs drive at one time. Enable request signals of the agents which drive the signals are centrally managed by the default driver, and the default driver decides which agent performs drive. Default driver signals are driven in a case where no agents issue enable requests or in a case where a plurality of agents are issuing enable requests simultaneously. In a case where a signal is driven low, the agent must perform drive high for one clock before and after. Assertion of the signal is carried out only after elapse of one clock from start of drive. Release of the signal basically is performed at the next clock negated.

It should be noted that the "L" after each signal name indicates that the signal is low active. The description of the signals is substantially in line with the description of the IO bus signals. This description will be divided into descriptions of system signals, address and data signals, interface control signals and arbitration signals. The bus agent is the generic term for a bus master or bus slave connected to the bus.

(System signals)

gClk (G-Bus Clock) . . . Provides the timing of all transactions on the G bus and is an input to all devices.

gRst_L (G-Bus Reset) . . . All devices on the G bus are reset by this signal. All internal registers are cleared and all output signals are negated.

(Address and data signals)

gAddr[31:7], InOut, (G-Bus Address): Master>Slave . . . Supports 4 GB of address space at 25 bits of gAddr[31]-gAddr [7] because all data transfer on the G bus is performed in units of 128 bytes (16 bits). Signal is driven by the master at the same time as drive:gTs_L. The timing at which this signal is asserted is the next clock following drive, and the timing at which this signal is negated is that of the clock at which the assertion of the signal gAack_L was verified.

g(Mastername)AddrOeReq (G-Bus Address Output Enable Request): Master>Default Driver Logic . . . This signal is the output signal to the default driver logic in order to realize a bidirectional G bus. It is a request signal by which the bus master drives the address bus.

g(Mastername)AddrOe_L (G-Bus Address Output Enable): Default Drive Logic>Master . . . This is a signal which indicates, to the bus master that output g (Mastername) AddrOeReq, that the default driver logic allows address bus drive.

gData[63:0], InOut, (G-Bus Data): Data Driver>Data Receiver . . . In case of a 64-bit data bus, this signal is driven by the master at the time of a write operation and by the slave at the time of a read operation. Timing when driven and assert, change and negate timings are as follows:

[Write]

drive: Driven by master at same time as gTs_L. However, when gSlvBsy_L is being asserted, the signal is driven after waiting for gSlvBsy_L to be negated.

assert: Asserted at the next clock following drive.

change: Clock at which assertion of gAack_L was verified, and then every clock thereafter.

negate: Negated at the clock at which assertion of gAack_L was verified when transfer ends or in a case where a transfer termination request by gTrStp_L was verified.

[Read]

drive: Driven by slave at same time as gAack_L.

assert: Asserted at the next clock following drive if the slave is ready. If the slave is not ready, the signal is asserted after waiting for the slave to be ready.

change: Clock at which assertion of gAack_L was verified, and then every clock thereafter. In case of read, every clock from clock asserted.

negate: When transfer is terminated.

release: One clock after negation or clock when transfer termination request by gTrStp_L was verified.

g(DataDrivername)DataOeReq (G-Bus Data Output Enable Request): Data Driver>Default Driver Logic . . . Request signal by which data driver drives data bus.

g(DataDrivername) DataOe_L (G-Bus Data Output Enable): Default Drive Logic>Data Driver . . . This is a signal which indicates, to the data driver that output g(DataDrivername)DataOeReq, that the default driver logic allows address bus drive.

(Interface control signals)

gTs_L (InOut G-Bus Transaction Start): Master>Slave . . . This signal, which is asserted low for one clock by the master, represents the start of transfer (the address phase). The master drives gAddr, gRdNotWr, gBstCnt together with gTs_L and clarifies the type of transfer and the quantity of data. In case of a write operation, the master must assure that the clarified transfer data quantity is issued without waiting. In case of a read operation, the master must assure that the clarified transfer data quantity is received without waiting. In a case where the slave can no longer perform data transfer in mid-course, there are instances where the next 16-bit transfer is canceled by gBsStep_L. However, transfer is never canceled in the middle of 16 bits.

drive: Driven at a clock at which assertion of gGnt_L was verified.

assert: Asserted by the next clock following drive.

negate: Negated one clock after assert.

g(Mastername)TsoeReq (G-Bus Transaction Start Output Enable Request): Master>Default Driver Logic . . . Request signal by which bus master drives gTs_L.

g(Mastername)TsOe_L (G-Bus Transaction Start Output Enable): Default Driver Logic>Master . . . Signal which indicates, to bus master that output g (Mastername) TsoeReq, that the default driver logic allows drive of gTs_L.

gAack_L, InOut, (G-Bus Address Acknowledge): Slave>Master . . . Driven low for one clock by the slave. The slave recognizes the transfer, confirms that the bus is idle and notifies the master that the data transfer can start. In the case of a write operation, the slave must assure that a requested transfer data quantity can be received from the master without waiting. In the case of a read operation, the slave must assure that the requested transfer data quantity can be issued without waiting. In the event that a data transfer can no longer be performed in mid-course, the next 16-bit transfer can be canceled by gBstStp_L. However, transfer is never canceled in the middle of 16 bits.

drive: At the time of an address decode bit, drive is started at the clock at which assertion of gTs_L was verified. However, when gSlvBsy_L is being asserted, the signal is driven after waiting for gSlvBsy_L to be negated. In a case where the signal could not be driven because the data bus was in use, drive starts at the clock at which a transfer termination request by gTrStp_L was verified.

assert: Asserted at the next clock following drive if the slave is ready. If the slave is not ready, the signal is asserted after waiting for the slave to be ready. When there is a response to transfer termination by gTrStp_L, the signal is asserted at the next block driven.

negate: In a case where gTrStp_L is asserted after drive, the signal is asserted at the clock at which gTrStp_L was verified. The signal is negated one clock after assert.

g(Slavename)AackOeReq (G-Bus Address Acknowledge Output Enable Request): Slave>Default Driver Logic . . . Request signal by which slave drives gAack_L.

g(Slavename)AackOe_L (G-Bus Address Acknowledge Output Enable): Default Driver Logic>Slave . . . Signal which indicates, to slave that output g(Slavename) AackOeReq, that the default driver logic allows drive of gAack_L.

gSlvBsy_L, InOut, (G-Bus Slave Busy): Slave>Master . . . Indicates that the slave performs drive and that data is being transferred by the data bus.

drive: At the time of an address decode bit, drive is started at the clock at which assertion of gTs_L was verified. However, when gSlvBsy_L is being asserted, the signal is driven after waiting for gSlvBsy_L to be negated.

assert: Asserted at the next clock following drive if the slave is ready. If the slave is not ready, the signal is asserted after waiting for the slave to be ready.

negate: Negate at end of transfer.

release: One clock after negation or clock when transfer termination request by gTrStp_L was verified.

g(Slavename)SlvBsyOeReq (G-Bus Slave Busy Output Enable Request): Slave>Default Driver Logic . . . Request signal by which data slave drives gSlvBsy_L.

g(Slavename)SlvBsyOe_L (G-Bus Slave Busy Output Enable): Default Driver Logic>Slave . . . Signal which indicates, to slave that output g(Slavename)SlvBsykOeReq, that the default driver logic allows drive of gSlvBsy_L.

gRdNotWr, InOut, (G-Bus Read (High)/Write (Low)): Master>Slave . . . This signal is driven by the master and represents READ when high and WRITE when low. The period during which drive is performed is the same as GA.

drive: Master performs drive at the same time as gTs_L.

assert: Next clock driven.

negate: Clock at which assertion of gAack_L was verified.

g(Mastername)RdNotWrOeReq (G-Bus Read/Write Output Enable Request): Master>Default Driver Logic . . . Request signal by which the bus master drives gRdNotWr.

g(Mastername)RdNotWrOe_L (G-Bus Read/Write Output Enable): Signal which indicates, to bus master that output g(Mastername)RdNotWrOeReq, that the default driver logic allows drive of gRdNotWr.

gBstCnt[1:0], InOut, (G-Bus Burst Counter): Master>Slave . . . This signal is driven by the master and represents the number (1–4) of burst transfers performed in succession. The correspondence between the signal values and the number of bytes in burst transfer is shown in Table 6.

drive: Master performs drive at the same time as gTs_L.

assert: Next clock following drive.

negate: Clock at which assertion of gAack_L was verified.

TABLE 6

| gBstCnt [1:0] | | Number of bytes transferred |
|---|---|---|
| 01 | 16 beats × 1 | 64 bits × 16 × 1 = 128 bytes |
| 10 | 16 beats × 2 | 64 bits × 16 × 2 = 256 bytes |
| 11 | 16 beats × 3 | 64 bits × 16 × 3 = 384 bytes |
| 00 | 16 beats × 4 | 64 bits × 16 × 4 = 512 bytes | g(Mastername)BstCntOeReq (G-Bus Burst Counter Output Enable Request): Master>Default Driver Logic . . . Request signal by which the bus master drives gBstCnt.

g(Mastername)BstCntOe_L (G-Bus Burst Counter Output Enable): Default Driver Logic>Master . . . Signal which indicates, to bus master that output g(Mastername)BstCntOeReq, that the default driver logic allows drive of gBstCnt.

gBstStp_L, InOut, (G-Bus Burst Stop): Slave>Master . . . This signal is driven by the slave and indicates that acceptance of the next successive burst transfer is not allowed. The signal is asserted at the 15th beat of one burst (16 beats). Not driven if not stopped.

drive: 14th beat
assert: 15th beat
negate: One clock after assert g(Slavename)BstStpOeReq (G-Bus Burst Stop Output Enable Request): Slave>Default Driver Logic . . . Request signal by which slave drives gBstStp_L.

g(Slavename)BstStpOe_L (G-Bus Burst Stop Output Enable): Default Driver Logic>Slave . . . Signal which indicates, to slave that output g(Slavename)BstStpOeReq, that the default driver logic allows drive of gBstStp_L.

(Arbitration signals)

g(Mastername)Req_L, Out, (G-Bus Request): Master>Arbiter . . . This signal is driven by the master and request the arbiter for a bus. The signal possesses a special-purpose gReq_L for each master device.

assert: Master necessary for the data transfer asserts the signal.

negate: Negated if gGnt_L is received.

g(Mastername)Gnt_L, In, (G-Bus GNT): Arbiter>Master . . . This signal is driven by the arbiter and grants the next bus privilege in response to a bus request. The signal possesses a special-purpose gGnt for each master device. The signal grants bus privileges in regular order starting from the bus master having the highest priority. With regard to masters having the same priority, the signal grants bus privilege in the order in which bus requests were issued.

assert: This signal is asserted with respect to a master selected by arbitration when gGnt_L has not been granted to another master or when gGnt_L, which has been granted to another master, is negated by the next clock.

negate: Clock at which assertion of gAacK was verified.

gTrStp_L, In, (G-Bus Transaction Stop): Arbiter>Master, Slave . . . This signal is driven by the arbiter in order to suspend a transaction for which an address phase has already been started by gGnt_L. However, a transaction for which a data phase has already been started by gAack_L cannot be suspended. Further, this signal is masked by gAack_L. When gAack_L has been asserted, the signal is negated and output even though asserted.

assert: Asserted when a bus request has arrived from a master having a priority higher than that of the transaction for which the address phase has already started.

negate: Clock at which assertion of gAack_L was verified.

(G-bus write cycle)
The G-bus write cycle is as follows:

① The master issues a bus request and asserts gReq_L.

② The arbiter grants permission, asserts gGnt_L and negates gReq_L.

③ The master receives gGnt_L and drives gTs_L, gAddr, gRdNotWr, gBstCnt. In case of a write operation, the master also drives gData simultaneously if gSlvBsy_L has not been asserted. If gSlvBsy_L is being driven, the master performs drive upon waiting for gSlvBsy_L to be freed.

④ The slave decodes the address when gTs_L has been asserted. If is hit occurs, i.e., if a decoded address is the device's own address, the device recognizes the transfer to itself. If gSlvBsy_L has not been asserted by another slave at this time, drive of gSlvBsy_L and gAack is started. In case of a read operation, gData is driven as well. If gSlvBsy_L has been asserted by another slave, this means that the data bus is currently in use. Drive is started, therefore, upon waiting for this signal to be negated. If the slave can make preparations for data transfer following the start of drive of gSlvBsy_L, gAack_L, (gData), then each of these signals is asserted and data transfer is begun.

⑤ The address phase ends and the master negates gAddr, gRdNotWr, gBstCnt at the moment gAack_L is asserted. At this time, moreover, the master changes over the write data every clock and transfers only the amount of data specified by gBstCnt. The master and slave must become aware of the end of data transfer by counting the clock themselves.

In a case where the slave can no longer transfer the requested amount of data from the master in the middle of a transfer, the slave asserts bStStp_L at the 15th bit, thereby canceling the transfer of the next 16 bits. However, cancellation in the middle of 16 bits cannot be carried out.

If the master and slave have asserted gBstStp_L, transfer of data must be finished at the next clock.

<Cache Invalidation Unit (CIU)>

The cache invalidation unit (referred to as a "CIU" below) 2005 monitors a write transaction from the IO bus to the memory. If a write transaction occurs, the CIU invalidates the cache, which is incorporated within the CPU shell, using the cache invalidation interface of the CPU shell before the write to the memory is finished.

The CPU shell uses the following three types of signals:
SnoopADDR[31:5] (Cache Invalidation Address)
DCINV [Dcache (data cache) Invalidation Strobe]
ICINV [Icache (instruction cache) Invalidation Strobe]

Invalidation of the cache is performed by a maximum of three clocks, and write from the IO bus to memory does not end at three clocks. The cache invalidation unit 2005, therefore, does not perform handshake at the end of invalidation using the Stop_L signal output by the CPU shell 401. To be prepared for further modifications, however, bSnoopWait is driven on the IO bus at the same cycle as Stop_L.

In a case where write from the IO bus has occurred in the present implementation, Icache also is invalidated for safety's sake. If a self-modifying code is prohibited by the operating system and invalidation of the instruction cache is performed intentionally at loading of data which may possibly be used as an instruction, then invalidation of Icache is not necessary. In such case some improvement in performance is desired.

<Memory map>

FIGS. 23A–23D and FIGS. 24A–24D illustrate memory maps. FIG. 23A shows a virtual memory map, FIG. 23B a physical memory map, FIG. 23C a memory map of G bus address space and FIG. 23D a memory map of IO bus address space. FIGS. 24A–24D are maps showing 512 MB of the shaded portions in FIGS. 23A–23D.

The memory module of the processor core is based on the R3000. The physical address space of the processor core is four GB owing to 32-bit addressing. Similarly, 32-bit addressing is implemented for the virtual space. The maximum size of the user process is 2 GB. Address mapping in the kernel mode and address mapping in the user mode differ. The Figures show memory maps in a case where an MMP is not used.

(User-mode virtual addressing)

In virtual addressing in the user mode, 2 GB of user virtual address space (kuseg) becomes effective. Addresses of this user segment start from 0x00000000 and all effective access has an msb cleared to 0. In the user mode, reference to an address for which the msb has been set gives rise to exception treatment of address error. TLB maps all references to kuseg similarly in the user mode and kernel mode. Cacheable kuseg usually is used to retain user codes and data.

(Kernel-mode virtual addressing)

Virtual address space in the kernel mode has four address segments.

kuseg: 2 GB from 0x00000000 of the virtual address. Caching and mapping in page units are possible. This segment is overlapped by kernel memory access and user memory access.

kseg0: 512 MB from 0x80000000 of the virtual address. Mapping is performed directly to the first 512 MB of the physical memory. Though reference is cached, the TLB is not used in address conversion. Ordinarily kesg0 is used for kernel execution codes and kernel data.

kseg1: 512 MB from 0xA0000000 of the virtual address. Mapping is performed directly to the first 512 MB of the physical memory. Though reference is cached, the TLB is not used in address conversion. Ordinarily kesg1 is used for the I/O register, ROM code or disk buffer, depending upon the operating system.

kseg2: 1 GB from 0xC0000000 of the virtual address. Mapping is from the virtual address to the physical address by TLB in the same manner as kuseg. Caching is performed freely. The operating system ordinarily uses kseg2 for data in every process requiring remapping by a stack or context switch.

[Virtual address memory map (FIGS. 23A, 24A)]

The virtual address space is 4 GB and is accessible by all memories and I/Os in the system. SYSTEM MEMORY (1 GB) exists in kuseg.

An internal RAM (16 MB) exists in kseg0. This is implemented in a case where it is desired to program the vector of exceptional treatment, and the exceptional vector base address is set to 0x80000000. This address is mapped to 0x0000000 of the physical address space.

A ROM, an I/O and a register exist in kseg1. Included are a boot ROM (16 MB), an SBB internal register and MC internal register (16 MB), an IO bus I/O1 (16 MB: primitive IO bus registers such as a G bus arbiter internal register, IO bus arbiter internal register and PMU internal register), IO bus I/O2 (16 MB), IO bus MEM (16 MB), Gbus MEM (32 MB), FONT ROM (240 MB), FONT ROM or RAM (16 MB).

PCI I/O (512 MB), PCI MEM (512 MB) are present in kseg2.

Since kseg0, kseg1 are both mapped to the first 512 MB of the physical address space, the first 512 MB of kseg0, kseg1 and kuseg all refer to the same physical address space.

[Physical address memory map (FIGS. 23B, 24B)]

The physical address space also is 4 MB, just as the virtual address space, and is accessible by all memories and I/Os of the system.

What holds for the physical address memory map also holds for the physical address memory map in regard to PCI, I/O, PCI MEM and SYSTEM MEMORY.

Since kseg1, kseg2 are both mapped to the first 512 MB of the physical address space, ROM, I/O and Reg exist in the space from 0x0000000.

[G bus memory map (FIGS. 23C, 24C)]

The G bus address space is 4 GB and is accessible only by SYSTEM MEMORY, Gbus MEM and FONT.

[IO bus memory map (FIGS. 23D, 24D)]

The IO bus address space is 4 GB and is accessible only by PCI, I/O, PCI MEM, SYSTEM MEMORY, IO Bus I/O2, IO Bus MEM and FONT.

Since the IO bus I/O1 is a primitive register, the space from 0x1C000000 to 0x20000000 is protected from the PCI; access from the PCI is not possible.

<Address switch>

The address switch 2003 is for sending an address signal from the bus serving as the master to the bus serving as the slave via SBB 402 in order to perform a data transfer among the P bus, G bus, IO bus and MC bus. In the transfer via the SBB 402, the buses that can serve as the master are the P bus, G bus and IO bus, and the buses that can serve as the slave are the IO bus and MC bus. Any of the P, G and IO buses may serve as the master with respect to the MC bus, and only the P bus may serve as a master and send an address signal to the IO bus.

Further, transfer between the P bus and IO bus and transfer between the G bus and MC bus can be performed simultaneously.

Figure 25:
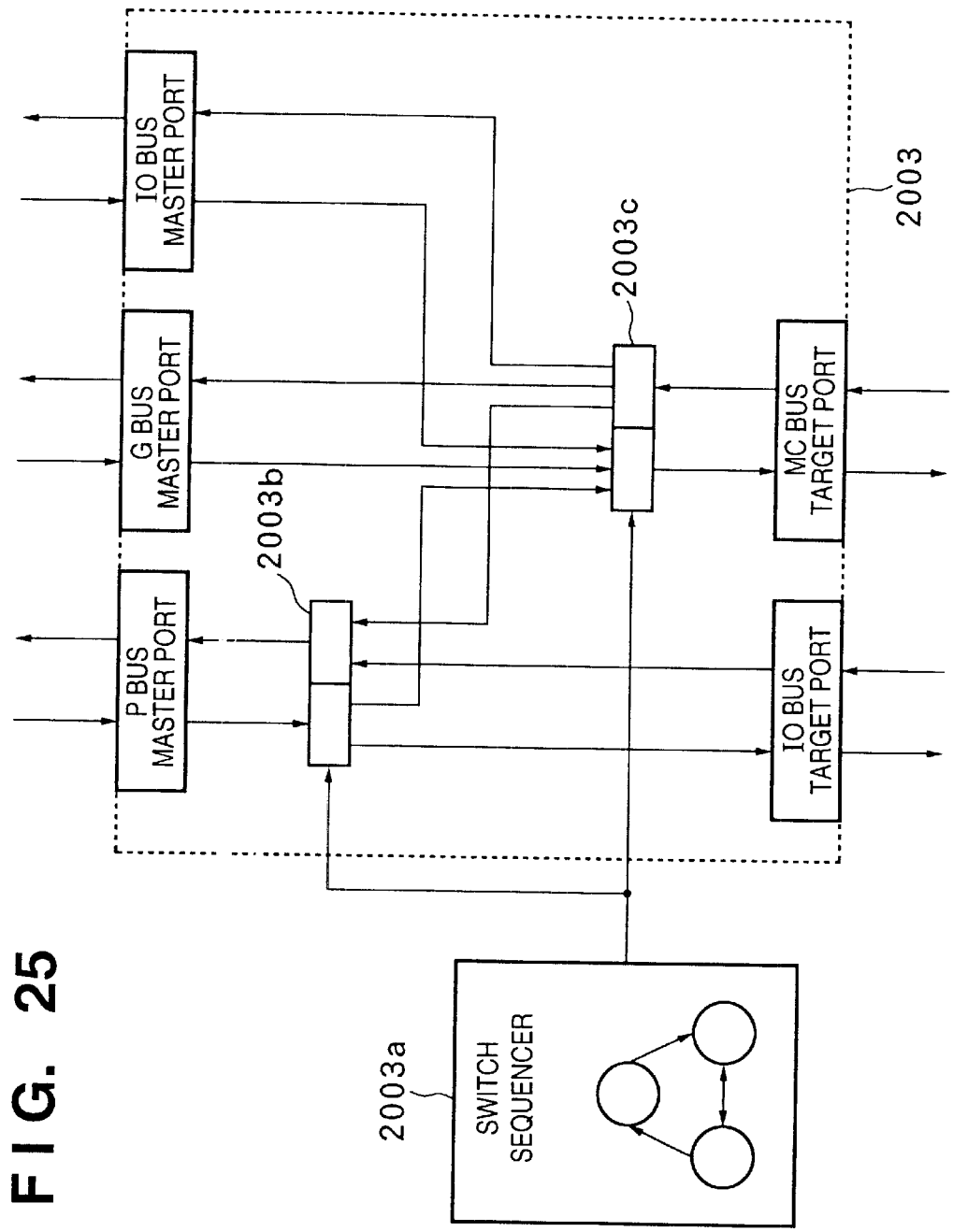
FIG. 25 is a block diagram of an address switch 2003.

FIG. 25 is a block diagram of the address switch 2003. The switch 2003b is changed over by the switch sequencer 2003a to switch the slave between the IO bus and MC bus, and the switch 2003c is changed over by the switch sequencer 2003a to switch the master among the P bus, G bus and IO bus. By virtue of this arrangement, any of the P, G and IO buses may serve as the master with respect to the MC bus, and only the P bus can serve as the master with regard to the IO bus. Further, transfer between the P bus and IO bus and transfer between the G bus and MC bus can be performed simultaneously.

<Data switch>

The data switch changes over the flow of data within the SBB a data transfer is performed among the P bus, G bus, IO bus and MC bus. Data is sent from the master to the slave at the time of a write operation and from the slave to the master at the time of a read operation.

FIG. 26 is a block diagram of the data switch 2004. In this arrangement, selectors A-1–A-3 and B-1, B-2 are changed over as shown in Table 7. Control can be performed in such a manner that write or read is carried out with any of the P, G and IO buses serves as the master and the IO bus or MC bus serving as the slave.

TABLE 7

| Master | Slave | W/R | Data Flow | A-1 | A-2 | A-3 | B-1 | B-2 |
|--------|-------|-----|-----------|-----|-----|-----|-----|-----|
| PBus | IOBus | Write | P → IO | | b | | | |
| | | Read | IO → P | | | | | b |
| | MCBus | Write | P → MC | b | | | a | |
| | | Read | MC → P | | a | | | a |
| GBus | MCBus | Write | G → MC | | | | a | b |
| | | Read | MC → G | a | | | | |
| IOBus | MCBus | Write | IO → MC | | | | b | b |
| | | Read | MC → IO | | a | | | |

<Arbitration>

In changing over the switches, the switch sequencer 2003a within the SBB 402 performs the following three types of arbitration among connection requests from outside the SBB:

1. CPU
2. G bus bus master
3. IO bus bus master

The type of arbitration is decided by present bus switch connection state and a priority set in advance. The result is a changeover in the address switch and data switch connections.

<Timing charts>

Figure 27:
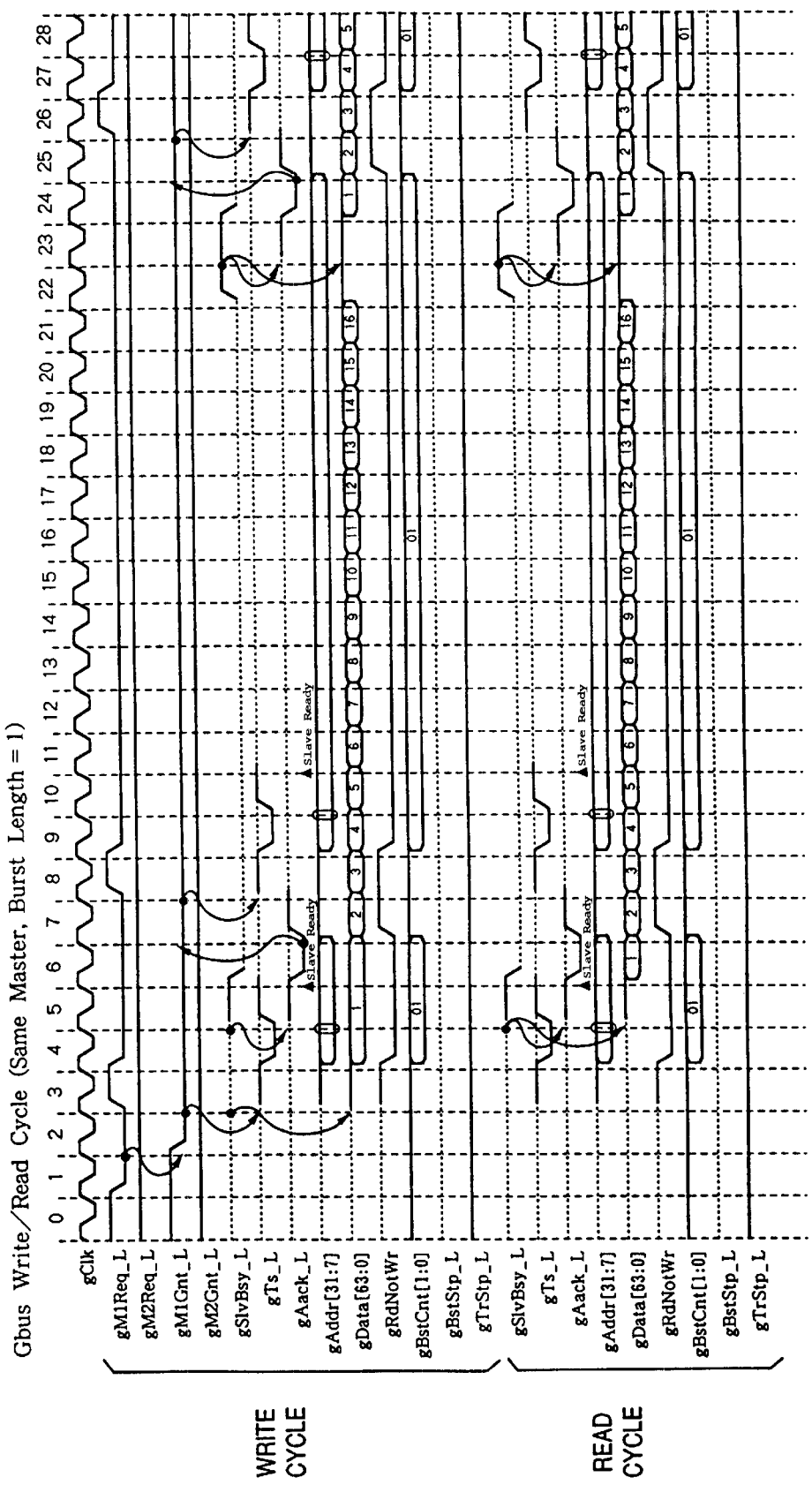
FIG. 27 is a timing chart of write/read cycles from a G bus.
Figure 28:
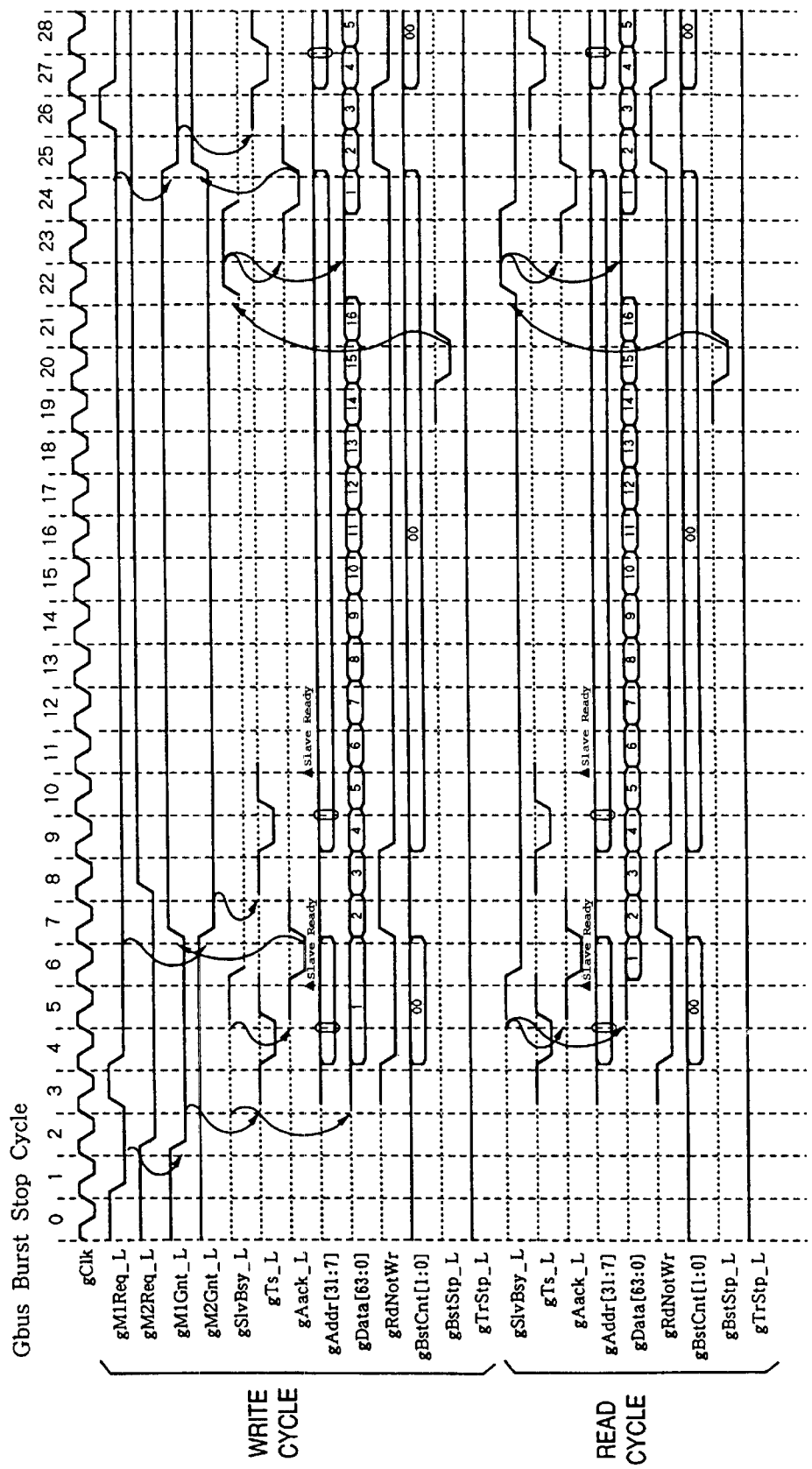
FIG. 28 is a timing chart showing the burst stop cycle of a G bus.
Figure 29:
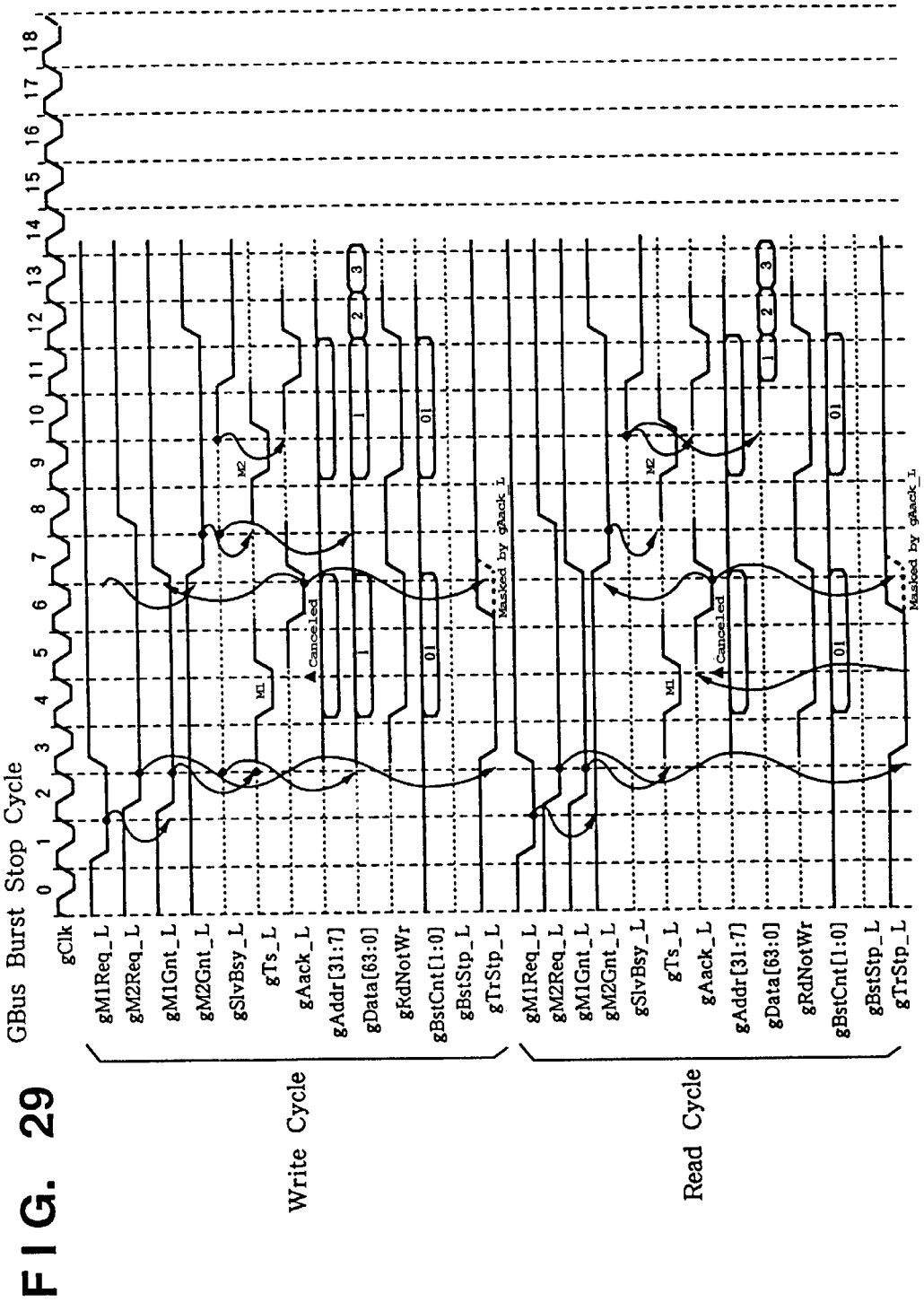
FIG. 29 is a timing chart showing the transaction stop cycle of a G bus.
Figure 31:
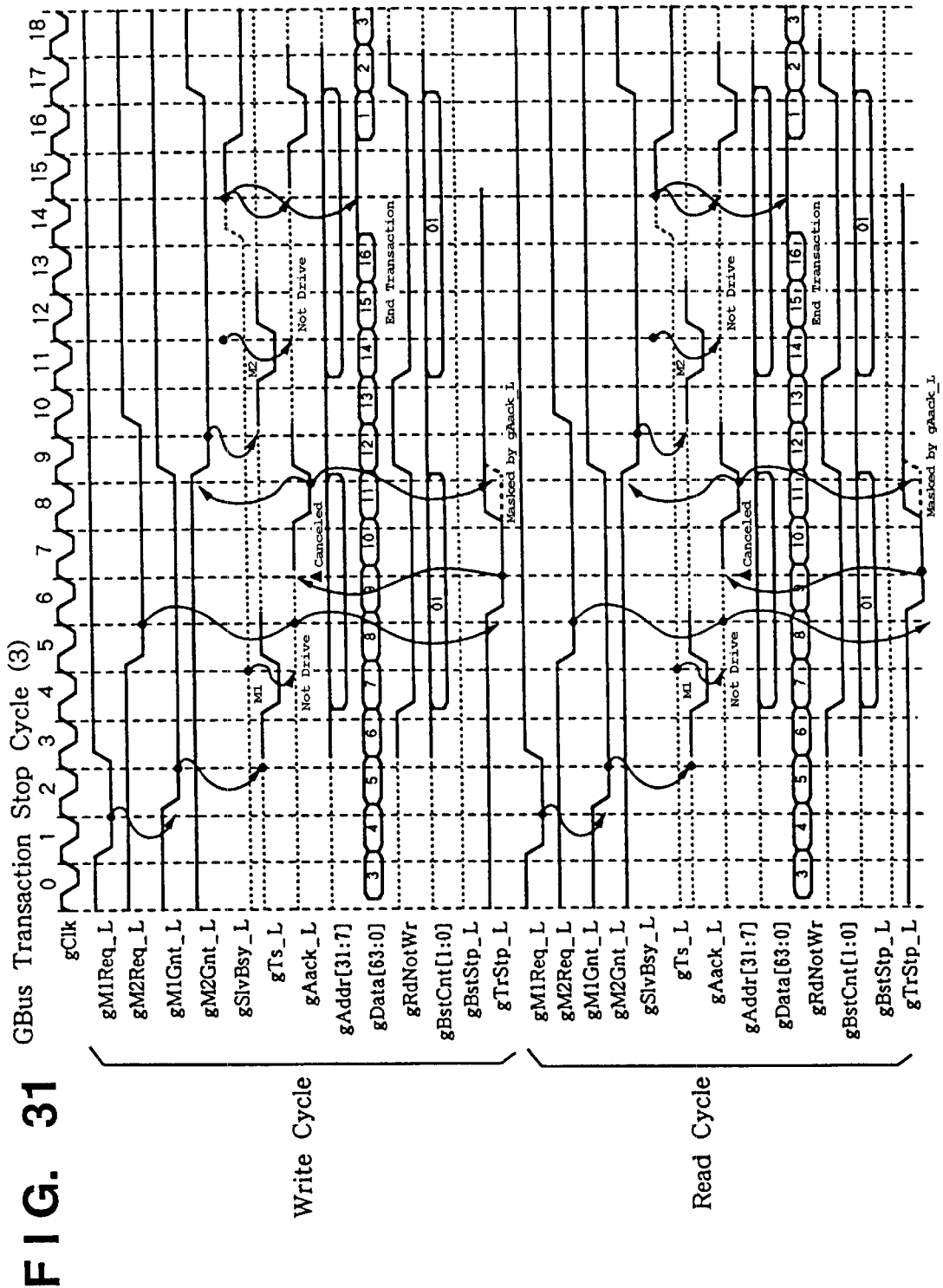
FIG. 31 is a timing chart showing the transaction stop cycle of a G bus.
Figure 32:
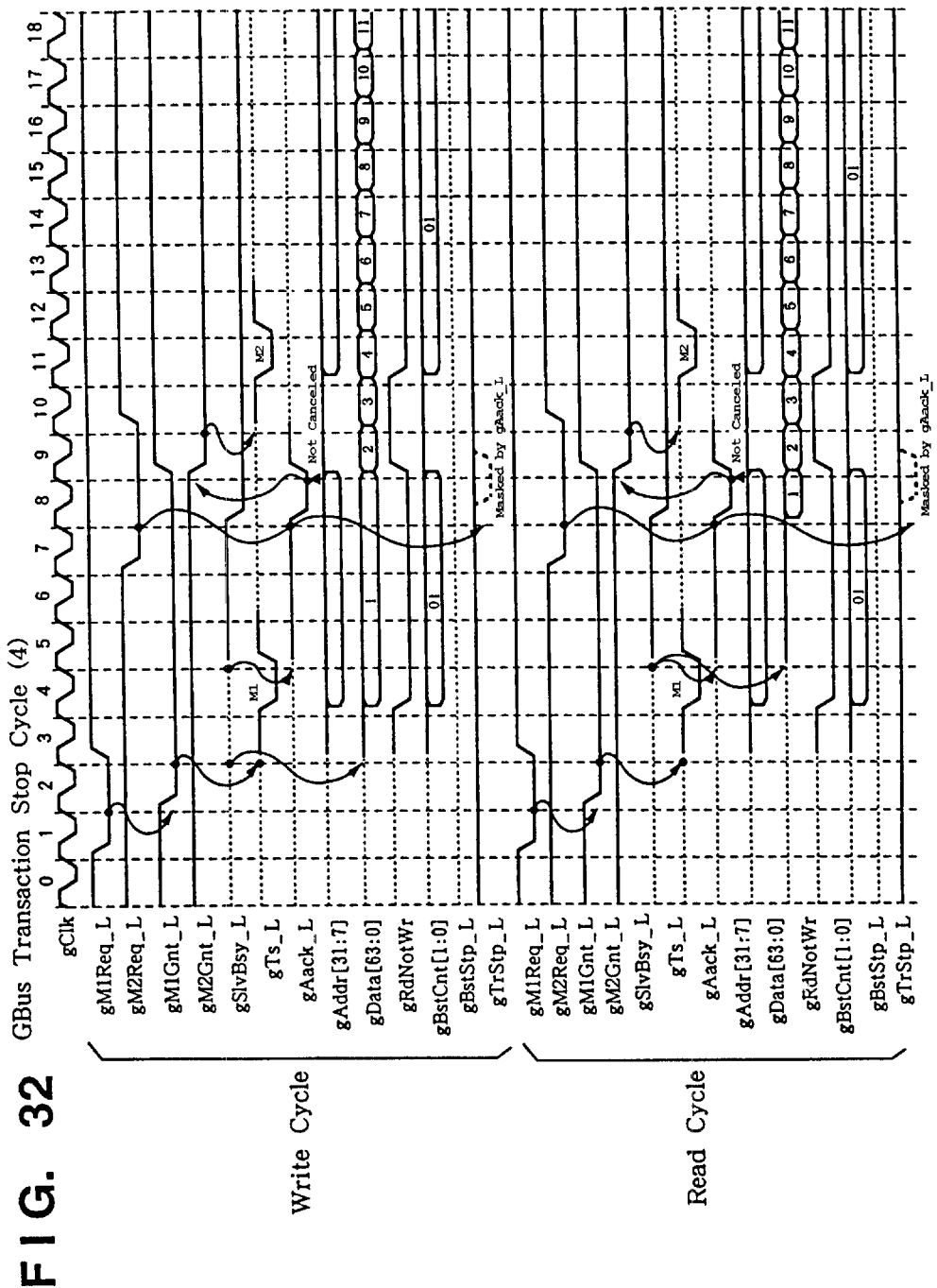
FIG. 32 is a timing chart showing the transaction stop cycle of a G bus.

FIGS. 27 through 32 are timing charts, in which FIG. 27 is a timing chart of write/read cycles from a G bus, FIG. 28 a timing chart showing the burst stop cycle of a G bus, and FIGS. 29 through 32 timing charts showing the transaction stop cycle of a G bus.

2.6. PCI bus interface

Figure 33:
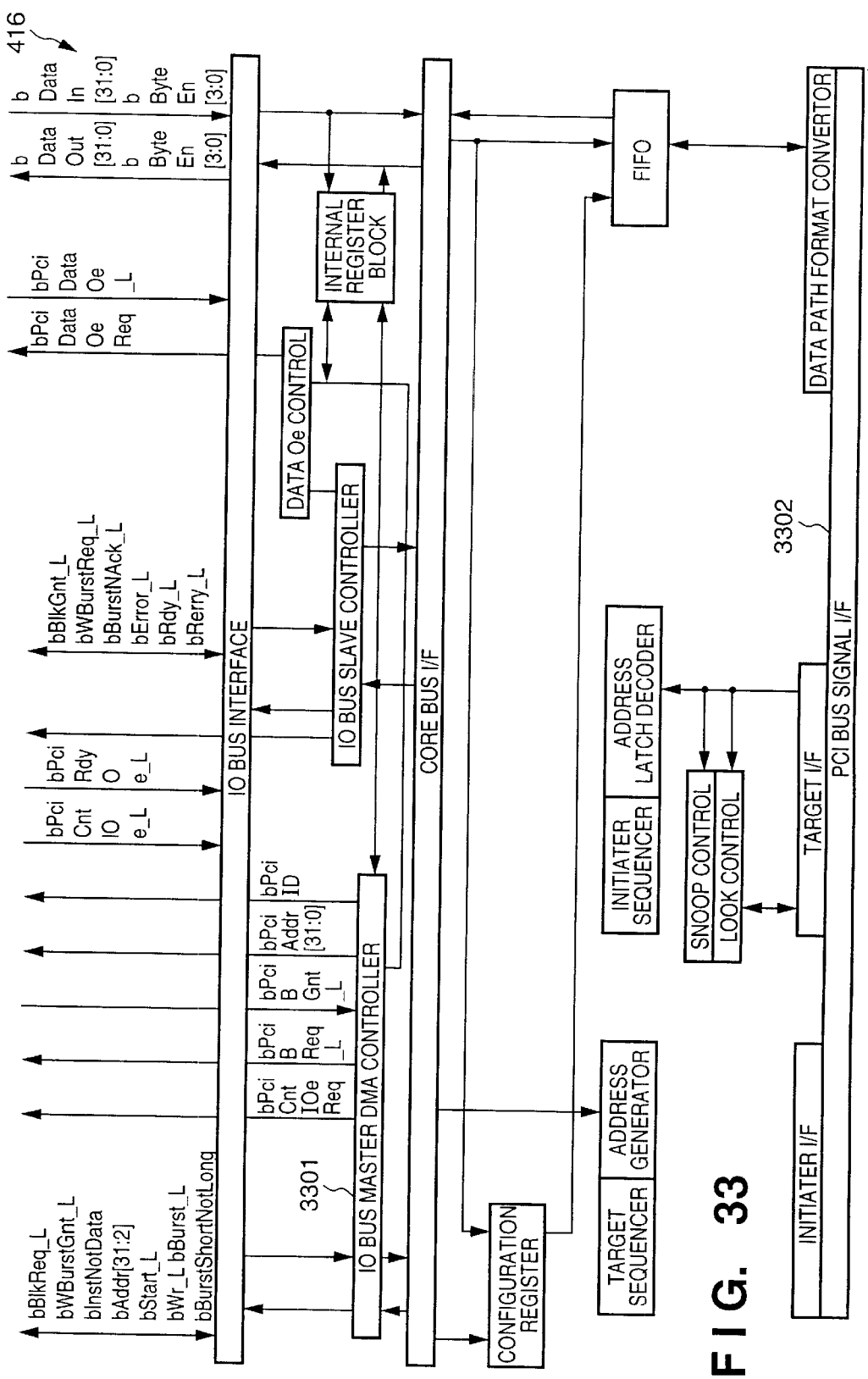
FIG. 33 is a block diagram showing a PCI bus interface.

FIG. 33 is a block diagram of the PCI bus interface 416.

The PCI bus interface 416 is a block for interfacing an IO bus that is general-purpose IO bus within the DoEngine and a PCI bus that is an IO bus external to the chip. Depending upon the input pin settings, it is possible at the time of restart to switch between a host bridge arrangement in which a PCI bus configuration is capable of being issued and a target configuration in which the PCI bus configuration is not issued.

The IO bus interface has a master DMA controller 3301 which, in a case where an access request for resources within the DoEngine has arrived from the PCI bus master via a PCI bus signal interface 3302, bridges this access request to the interior of the IO bus as an IO bus master.

Furthermore, the master DMA controller 3301 is capable of performing a DMA transfer from the memory mapped on the PCI bus to the DoEngine memory. At this time the controller issues a transfer destination address (bPciAddr [31:0] and an ID signal (bPciID) of the PCI master controller 3301 to the IO bus and arbitration sequencer at the same time as a bus request in order to perform operation while adhering to the access order of IO bus DMA and G bus DMA intended by the programmer.

The master DMA controller 3301 accepts a bus grant (bPciBGnt_L) and, when data transfer using the bus ends, terminates the assertion of the ID signal (bPciID).

It should be noted that the PCI bus is in conformity with a 33-MHz, 32-bit PCI 2.1.

2.7 G bus arbiter

Figure 34:
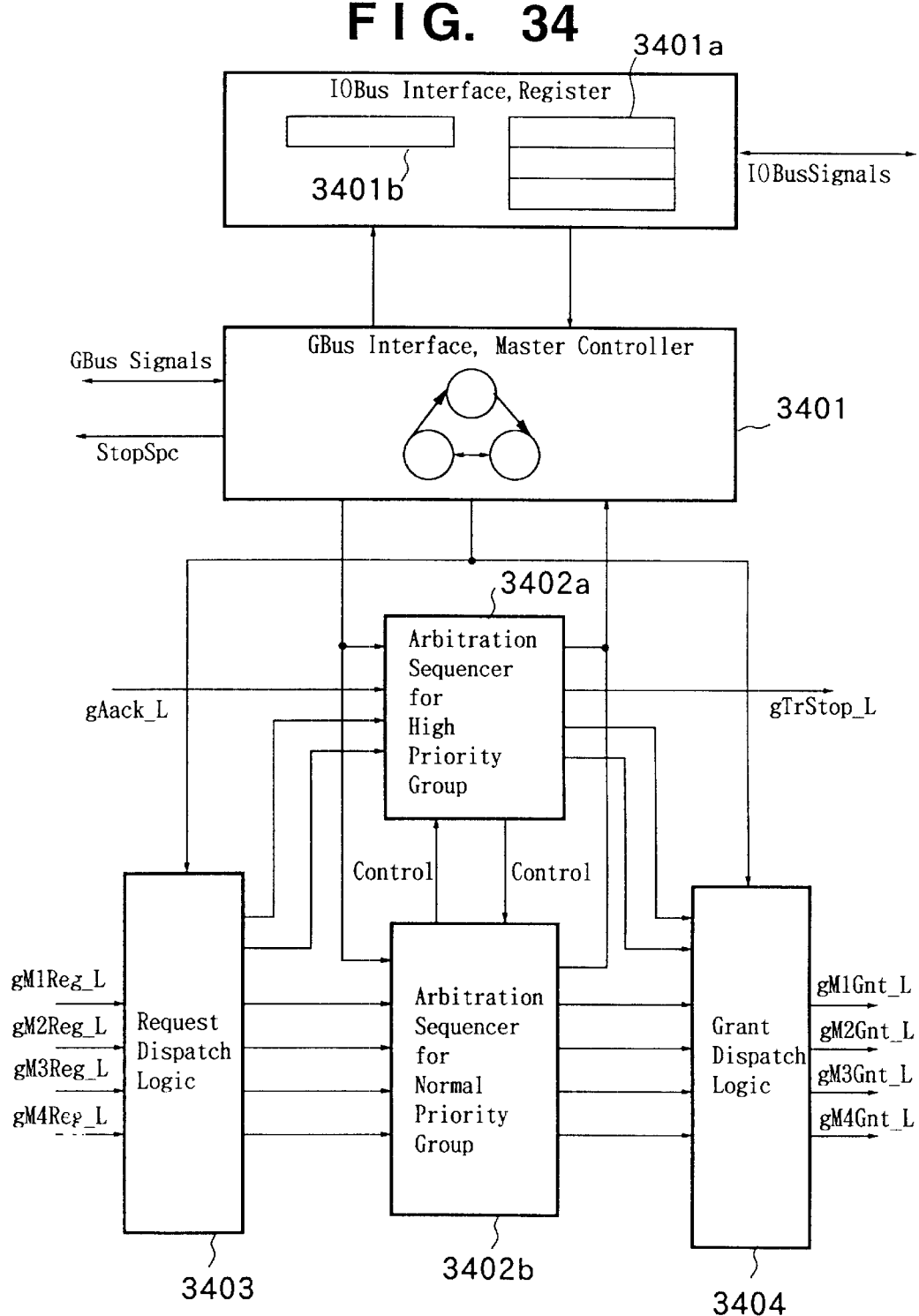
FIG. 34 is a block diagram showing a G bus arbiter (GBA)

FIG. 34 is a block diagram of the G bus arbiter (GBA) 406.

The G bus arbitration is a central arbitration scheme and possesses a special-purpose request signal

[g(mastername)Req_L] and a grant signal

[g(mastername) Gnt_L] with regard to each bus master. In FIG. 34, mastername is M1–M4. The bus arbiter 406 supports up to four bus masters on the G bus and has the following features:

The arbiter can be programmed by setting a register 3401*a* within the arbiter. The setting of the register is performed from the IO bus.

There is a fair arbitration mode in which bus privilege is granted fairly with all bus masters having the same right of priority, and a high-priority arbitration mode which raises the right of priority of any one bus master and causes the bus to be given priority in use. Which bus master is granted the right of priority is decided by the setting of the register 3401*b*.

It is possible to set the number of times a priority bus master can use a bus successively.

In regard to a transaction for which the address phase has already started but not the data phase, a transaction cycle for stopping this transaction is supported.

Programming of sequential processing in a plurality of bus masters can be performed (this will be described later). The programmed sequence is stored in a register table 3401*a*.

The arbiter has a mechanism in which, in a case where a G bus master and IO bus master have issued a write successively to the same memory address, puts the granting of bus use permission on hold in regard to a specific master based upon a master ID signal and stop signal from a synchronizing unit, this mechanism being for the purpose of maintaining the access sequence intended by the programmer.

It should be noted that programming of a register is carried out from the CPU 401 via the IO bus.

(Arbitration sequencer)

Arbitration sequencers 3402*a*, 3402*b*, which are at the core of the G bus arbiter, perform G bus arbitration between one priority master and four other non-priority masters. The fair arbitration is realized by allocating request signals and grant signals from four bus masters to the four non-priority masters by a request dispatch circuit 3403 and grant dispatch circuit 3404. Further, the high-priority arbitration mode is realized by allocating any one of the four bus masters to a priority master of the high-priority arbitration sequencer 3402*a*. These allocations are performed in accordance with the setting of registers 3401*a*, 3401*b*. The priority bus master is capable of acquiring bus use privilege at a probability higher than that of the other masters in the high-priority arbitration mode.

Furthermore, in addition to the fact that adjustment of bus acquisition probability by the priority bus master allocated to the high-priority sequencer 3402*a* is possible in the high-priority arbitration mode, the priority bus master can use the bus successively. The number of times the bus can be used in succession can be changed by a programmable register. This means that bus occupancy can be adjusted in such a manner that the bus is used often by a certain specific master.

(Fair arbitration mode)

In this mode all of the bus masters have the same priority and opportunities for granting bus privileges are equal. When a bus is free, the bus master that issues a request first can obtain the bus privilege. In a case where a plurality of bus masters issue requests simultaneously, bus privilege is granted sequentially in accordance with a predetermined order (this is a round-robin scheme). For example, if all bus masters from M1 to M4 have issued requests at the same clock, bus privilege is granted in the order M1→M2→M3→M4. In a case where all bus masters issue requests again at the end of the transaction of M4, bus privilege is granted through a similar sequence, i.e., M1→M2→M3→M4→M1→M2 . . . . If some bus masters have issued requests, privilege is granted to the master having a large number closest to the master that used the bus last, with a round wrap being performed from M4 to M1.

Once bus privilege has shifted to another bus master, the bus privilege cannot be obtained again unless it is after the granting of bus privilege to all other bus masters that have issued requests.

(High-priority arbitration)

In this mode one bus master (a bus master that has been registered in the register 3401*b*) becomes a priority bus master having a right of priority higher than that of other bus masters. The bus privilege is granted with a priority higher than that of the other bus masters. The orders of priority of bus masters other than the priority bus master are all the same.

In a case where a plurality of path masters issue requests and the priority bus master issues requests successively, the priority bus master and the other non-priority bus masters obtain the bus privilege by turns.

Once bus privilege has shifted from a non-priority bus master to another bus master, the non-priority bus master cannot obtain the bus privilege again unless it is after the granting of bus privilege to all other bus masters that have issued requests.

(Transaction stop cycle)

When the priority bus master issues a request in the high-priority arbitration mode, a transaction being carried out can be stopped and the priority bus master can obtain the bus privilege if the data phase has not yet been started, even if the other bus masters have already started the address phase. However, if the priority bus master possessed the bus privilege immediately before, the limitation on the number of times the bus privilege can be obtained successively by the priority bus master cannot be exceeded.

If the suspended bus master is issuing a request when the transaction of the priority bus master ends, then it is given priority in the granting of the bus privilege.

(Changeover of priority bus master)

It will suffice to rewrite the register 3401b in order to change over the priority bus master. When the register for selecting the priority bus master is rewritten, the priority bus master is rewritten upon waiting for the end of the transaction being executed at this time. The arbiter returns to the idle state and arbitration is performed anew on the grounds that the bus master that was issuing the request at such time issued the request simultaneously.

Sufficient care must be taken in changing over the priority bus master. If the priority bus master is changed over to a different bus master before DMA of the bus master to be given priority ends, the degree of priority of the DMA of the initial priority bus master will decline. If it is not desired to lower the degree of priority of the initial priority bus master, then it is necessary to perform the changeover of the priority bus master after it is confirmed that DMA has ended.

With software that requires that the changeover of the priority bus master be performed dynamically not only at system booting but also during system operation, the changeover of the priority bus master should be performed by suspending the setting of all bus masters and DMA control in such a manner that a new DMA request will not be generated on the G bus, subsequently setting an appropriate value in the register within the G bus arbiter 406, checking the status register in the G bus arbiter and activating access and DMA anew on the G bus upon confirming that the right of priority of the bus master has been changed over.

There is a possibility that the dynamic changeover of the priority bus master will change or violate the real-time assurance of the operating system and the setting of task priority. This means that the changeover must be performed upon giving full consideration to the above.

(Sequential processing)

Figure 35:
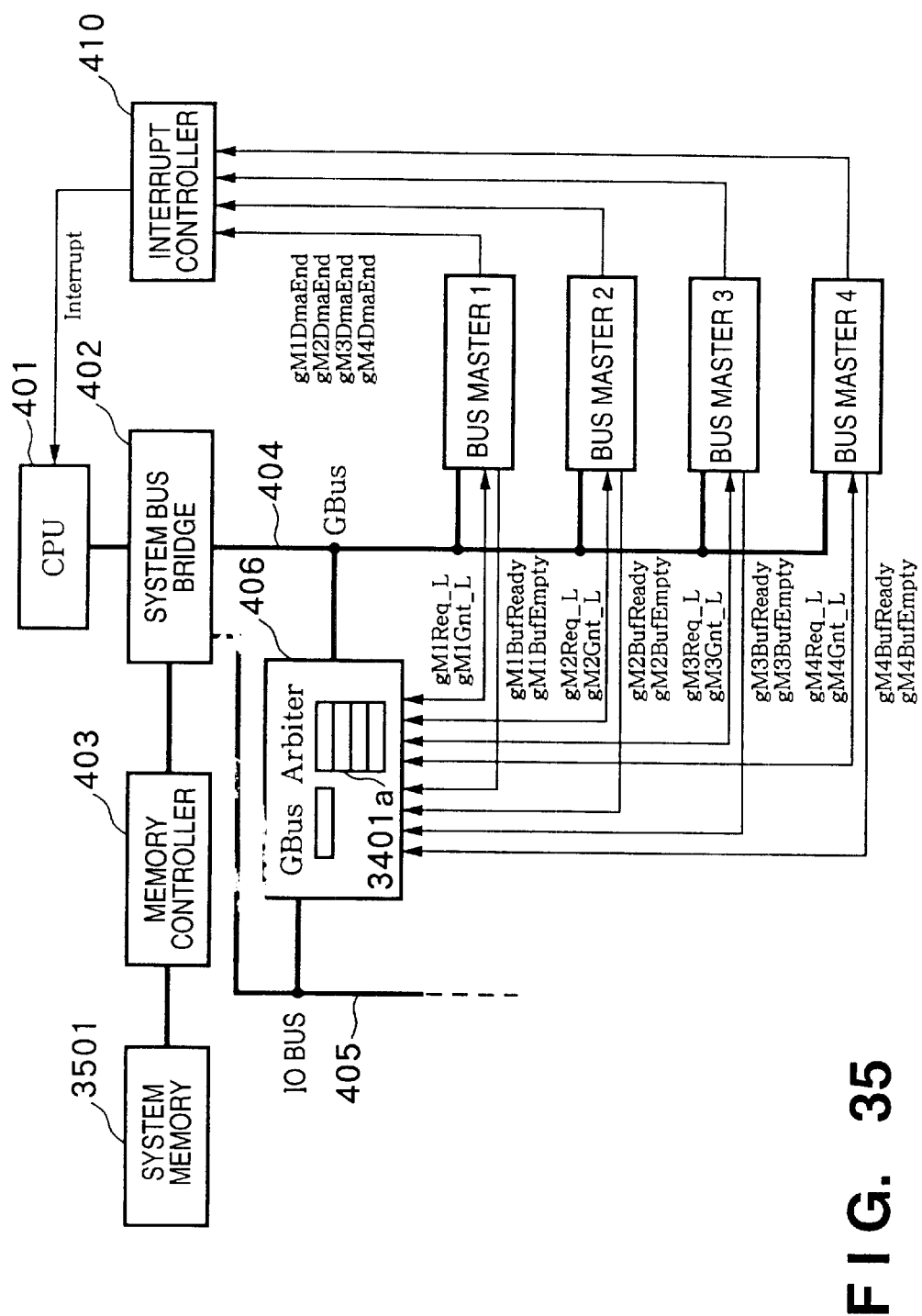
FIG. 35 is a block diagram relating to DMA by bus masters on a G bus, with the focus being on a G bus in a DoEngine.

FIG. 35 is a block diagram relating to DMA by bus masters on a G bus, with the focus being on the G bus 404 in a DoEngine 400.

Consider a series of processing operations in a case where a plurality of bus masters execute processing sequentially, e.g., in which after processing A is executed by a bus master 1 with respect to data in a memory 3501, processing B is executed by bus master 2 and then the processed data is sent to bus master 4.

The order in which buses are used by bus masters, the conditions for starting granting of bus privilege and the conditions for ending the granting of bus privilege are set in a register table 3401a within the bus arbiter 406 via the IO bus 405 by the software that performs this processing, i.e., by the program executed by CPU 401. In this example, the settings are as follows:

| | Bus Master | Starting Conditions | Ending Conditions |
|---|---|---|---|
| 1. | Bus Master 1: | gM2BufEmpty | gM1BufReady |
| 2. | Bus Master 2: | gM1BufReady | gM1BufEmpty |
| 3. | Bus Master 4: | gM2BufReady | gM2BufEmpty |

More specifically, upon receiving a signal set as a starting condition from each bus master, the G bus arbiter 406 grants bus use privilege to each bus master. Upon receiving a signal set as an ending condition, the G bus arbiter 406 deprives the bus master of the bus use privilege.

The software sets DMA for each bus master. As a result, each master issues a request [g(mastername)Req_L] to the G bus arbiter 404. The G-but arbiter 404 grants bus privilege (gM1Gnt_L) to bus master 1 in accordance with the sequence that has been registered in the register table 3401a. The bus master 1 reads data is certain units from the memory 301, executes the processing A and writes the data to a buffer within the bus master 1. The bus master 1 finishes the processing of one unit and notifies the arbiter 406, by way of the signal gM1BufReady, of the fact that the buffer has been prepared.

Upon receiving this notification, the arbiter 406 takes the bus privilege from bus master 1 and grants it to bus master 2 in accordance with the conditions, registered in the register table 3401a, under which a bus master grants and removes bus privilege. The bus master 2 reads the data from the buffer of bus master 1, executes the processing B and stores the data in a buffer within the bus master 2. If the buffer in bus master 1 becomes empty during this time, gM1BufEmpty is asserted and the arbiter 406 terminates the granting of bus privilege to bus master 2. Bus master 2 executes processing B and, when buffer preparation is complete, gives notification of this by the signal gM2BufReady.

Upon receiving this notification, the arbiter 406 now grants bus privilege to bus master 4 in accordance with the content of register 3401a. The bus master 4 reads the data from the buffer of bus master 2. If the buffer in bus master 2 becomes empty, the arbiter 406 is so notified by gM2BufEmpty. Upon receiving this notification, the arbiter 406 again grants bus privilege to bus master 1 in accordance with the content of register 3401a and starts processing of the next data.

If all DMAs set in the respective bus masters have ended, the respective bus masters notify the processor by an interrupt. When end notifications from all bus masters have been obtained, the software recognizes that the series of processing operations has ended.

The above-described operation is that of the complete sequential mode. A bus master other than one dealing with sequential processing cannot use a bus. A priority sequential mode is available in order to make it possible for a bus master not associated with sequential processing to use a bus even during sequential processing. Changeover between these modes is carried out by programming the register in the arbiter 406. In the priority sequential mode, a bus master that executes sequential processing can use the bus preferentially but if a bus master is one having nothing to do with sequential processing, use of the bus is allowed. Arbitration between a bus master that performs sequential processing and a bus master unrelated to sequential processing is equivalent to that in the high-priority arbitration mode described above. Of course, bus privilege is not granted to a bus master, associated with sequential processing, whose own turn has not come because the conditions for granting bus privilege have not been satisfied.

(Mechanism for maintaining access sequence)

If the signal stopSpc has been asserted, the scanner printer controller 408, which is one of the G bus masters, is excluded from arbitration and the bus use privilege is not granted even if a request is asserted. Arbitration is carried out among masters from which this master has been excluded. A detailed description is given in the section on the IO bus arbiter.

<Timing diagrams>

Figure 36:
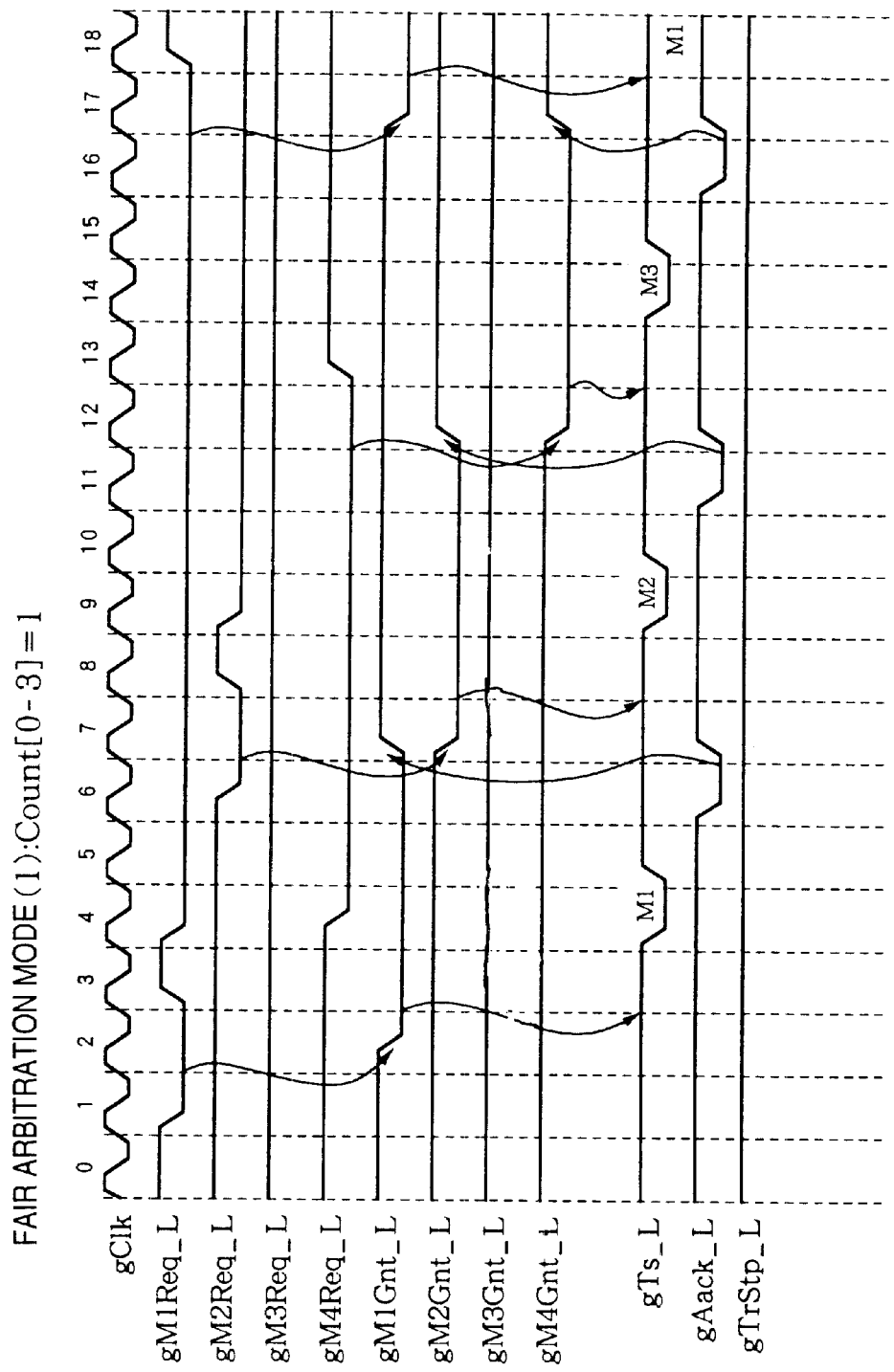
FIG. 36 is a diagram showing an example of a fair arbitration mode (fair mode) in a case where the number of times a bus is used in succession is set to one in regard to all bus masters 1–4.

FIGS. 36–39 are useful in describing the timing of G bus arbitration. FIG. 36 shows an example of a fair arbitration mode (fair mode) in a case where the number of times a bus is used in succession has been set to one in regard to all bus masters 1–4. A second bus request (issued from timing 4) from bus master 1 waits for all other bus masters issuing bus requests to be dealt with one time each.

Figure 37:
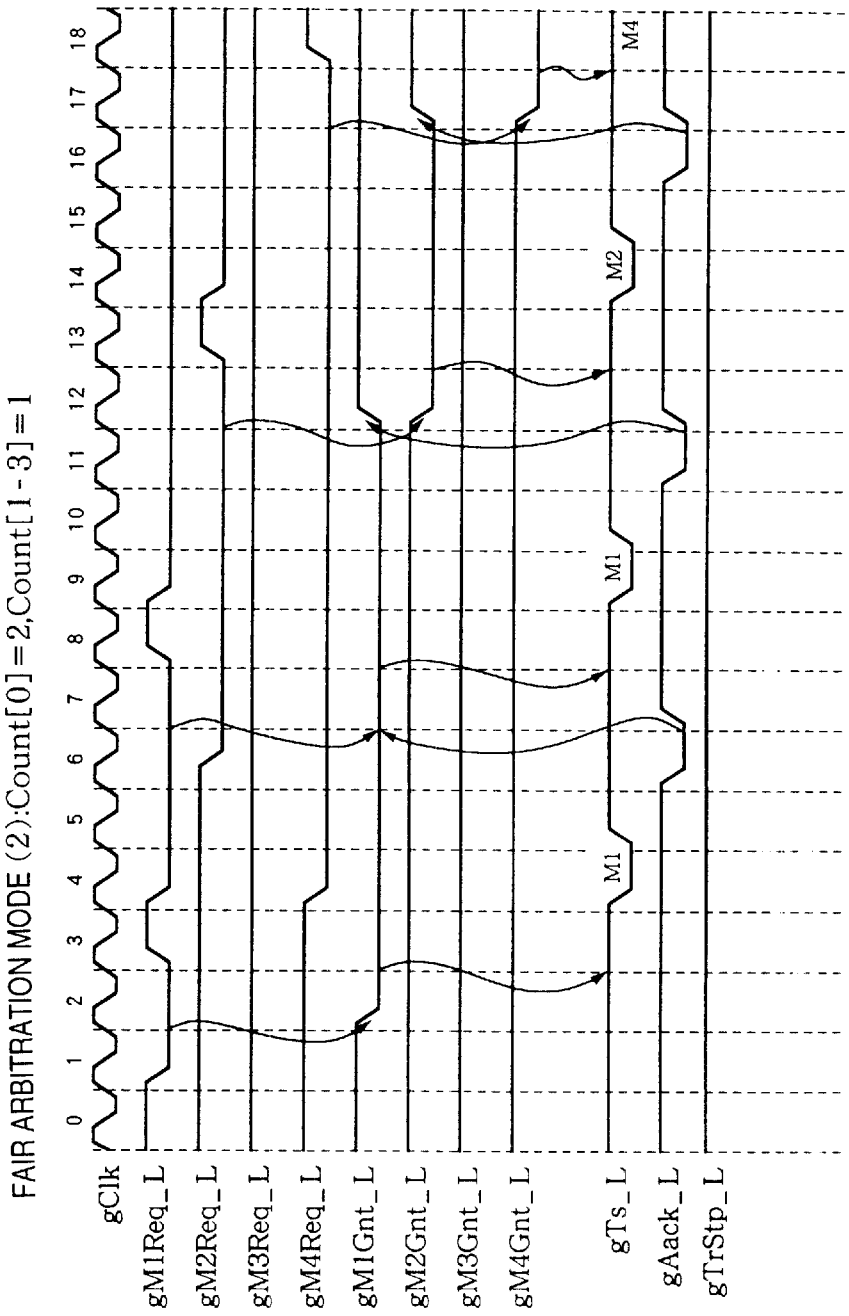
FIG. 37 is a diagram showing an example of a fair arbitration mode in a case where the number of times a bus is used in succession is set to two in regard to bus master 1 and to one in regard to other bus masters.

FIG. 37 shows an example of a fair arbitration mode in a case where the number of times a bus is used in succession is set to two in regard to bus master 1 and to one in regard to other bus masters. A second bus request (issued from timing 4) from bus master 1 is allowed immediately after the first request. The other bus masters wait until this processing is finished.

Figure 38:
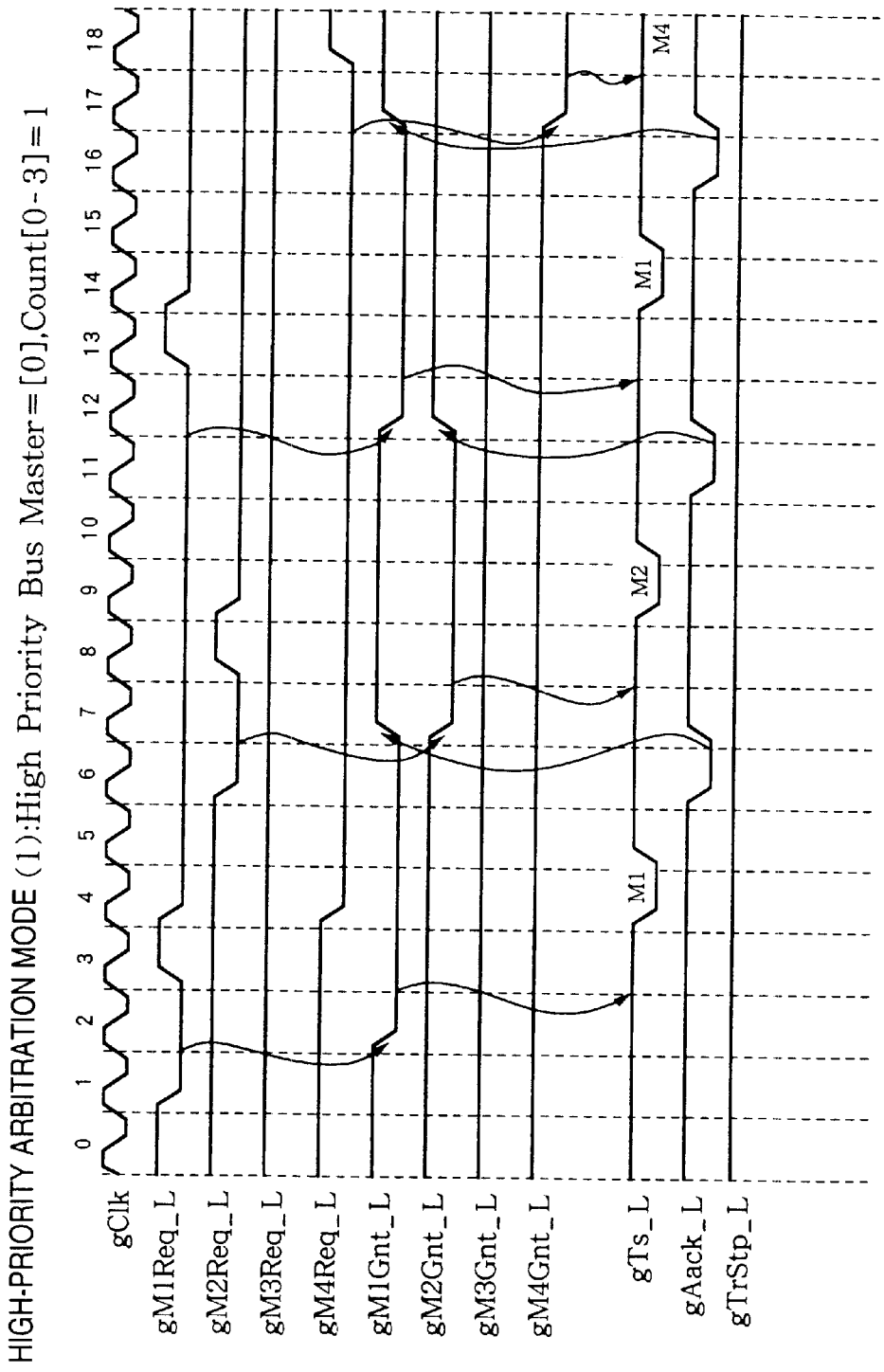
FIG. 38 is a diagram showing an example of a high-priority arbitration mode in a case where the number of times a bus is used in succession is one each, with bus master 1 being set as a high-priority bus.

FIG. 38 shows an example of a high-priority arbitration mode in a case where the number of times a bus is used in succession is one each, with bus master 1 being set as a high-priority bus. In order for the bus use privilege to be allowed alternately for the priority bus master and non-priority bus masters, the second bus request from bus master 1 is allowed after use of the bus by bus master 2 and the bus request from bus master 4 is allowed after second use of the bus by bus master 1. The second bus request from bus master 2 is allowed after the end of bus use by all other bus masters issuing bus requests, namely bus master 1 and bus master 4 in FIG. 38.

Figure 39:
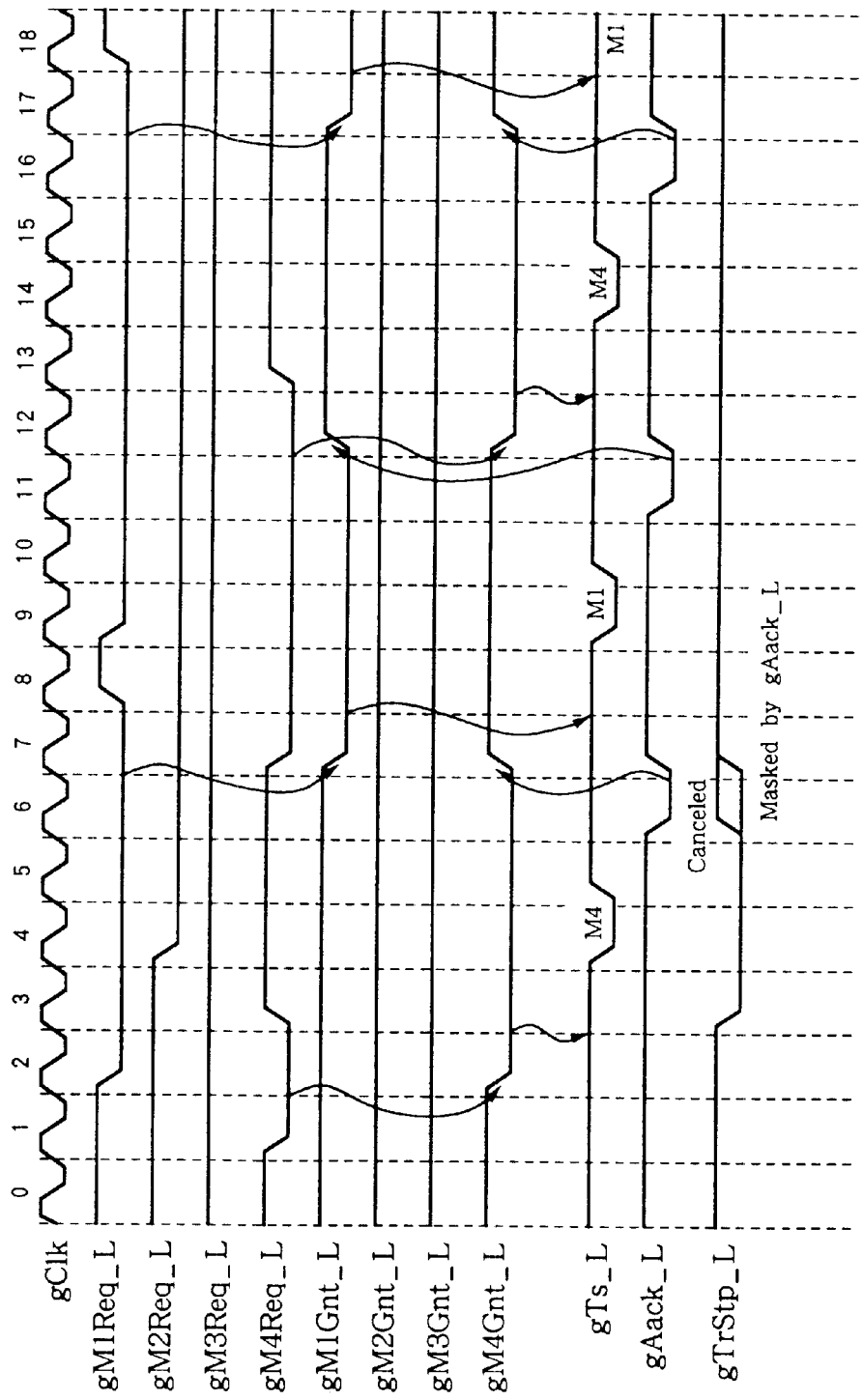
FIG. 39 is a diagram showing an example in which, despite the fact that a bus request from bus master 4 has been allowed, the request is canceled by a bus request from bus master 1.

FIG. 39 shows an example in which, despite the fact that a bus request from bus master 4 has been allowed, the request is canceled by a bus request from bus master 1. When bus use by bus master 1 ends in this case, the bus request from bus master 4 is given preference over the bus request from bus master 2.

2.8. IO bus arbiter

Figure 40:
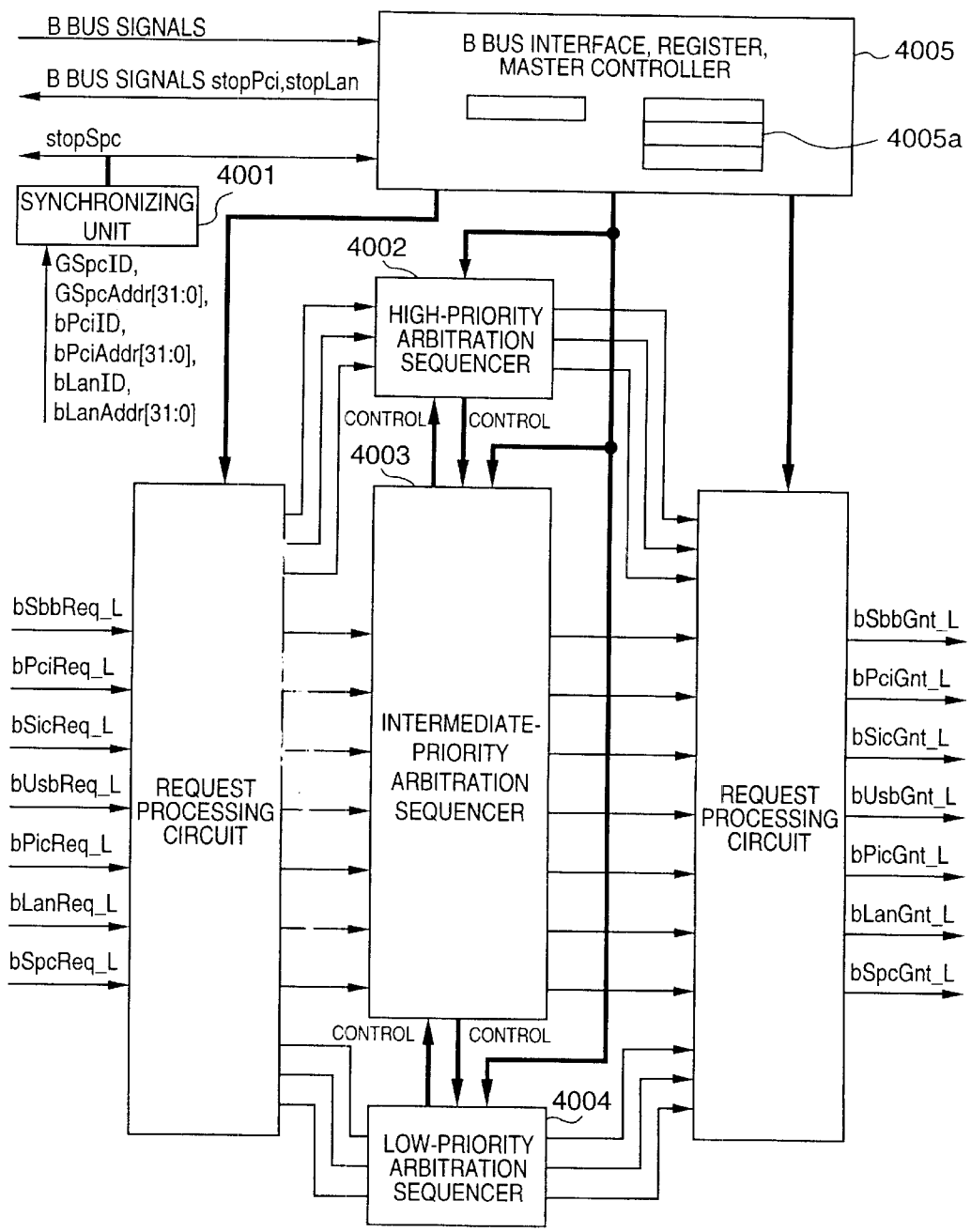
FIG. 40 is a block diagram of an IO bus arbiter.

FIG. 40 is a block diagram of the IO bus arbiter 407.

The IO arbiter 407 accepts a bus use request from the IO bus 405, which is an IO general-purpose bus within the DoEngine, performs arbitration, grants permission to use the bus to one selected master and forbids two or more masters from performing bus access simultaneously.

The arbitration scheme is arranged to have three levels of priority and programmably allocates a plurality of masters to each of these priorities. The allocation is such that a maximum of three masters are allocated to the highest level of priority, seven masters to the intermediate level of priority and three masters to the lowest level of priority.

The arbiter has a mechanism in which, in a case where a G bus master and IO bus master have issued a write successively to the same memory address, puts the granting of bus use permission on hold in regard to a specific master based upon a master ID signal and stop signal from a synchronizing unit, this mechanism being for the purpose of maintaining the access sequence intended by the programmer.

(Arbitration sequencer)

The IO bus arbiter is composed of three arbitration sequencers 4002, 4003 and 4004. The sequencers 4002, 4003, 4004 are internally provided with three, seven and three bus master arbitration sequencers, respectively, having the high, intermediate and low priority levels, respectively. Request signals from all units for which there is a possibility of becoming bus masters on the IO bus as well as grant signals to these units are distributed to the three sequence units by a request selector and grant selector. In regard to the distribution, a unique combination can be selected from a plurality of combinations by a software programmable register 4005a within the BBus interface 4005.

For example, fair arbitration is realized among the seven masters by connecting a maximum of seven master requests to the arbitration sequence 4003 of the intermediate priority level. By allocating several of the bus masters to the arbitration sequence 4002 of the high priority level, these masters can the bus use privilege at a probability higher than of the other masters. Furthermore, by connecting several requests to the sequencer 4004 of the low priority, the ratio of bus use can be kept low. Further, in addition to adjusting the probability of bus acquisition, a master that has been allocated to the high-priority sequencer 4002 can use the bus successively. The number of times the bus can be used successively can be varied by the programmable register 4005a. This means that bus occupancy can be adjusted so that a bus can be used often by a certain specific master.

(Fair bus arbitration scheme)

A method of implementing fair arbitration will be described taking the intermediate-priority sequencer 4003 as an example. All bus masters connected to one sequencer have the same priority and the opportunities to be granted bus privilege are equal. When a bus is free, the bus master that issues a request first can obtain the bus privilege (first-come first-serve). In a case where a plurality of bus masters issue requests simultaneously, bus privilege is granted sequentially in accordance with a predetermined order (this is a round-robin scheme). For example, if all bus masters from M1 to M7 have issued requests at the same clock, bus privilege is granted in the order M1→M2→M3→M4→M5→M6→M7. In a case where all bus masters issue requests again at the end of the transaction of M7, bus privilege is granted through a similar sequence, i.e., M1→M2→M3→M4→M5→M6→M7→M1→M2 . . . . If some bus masters have issued requests, privilege is granted to the master whose number is larger than and closest to the master that used the bus last, with a round wrap being performed from M7 to M1.

(High-priority arbitration)

The IO bus interface is composed of three arbitration sequencers of high, intermediate and low priority levels. Arbitration provided with a degree of priority can be realized by allocating a plurality of bus requests to high-and low-priority arbiters selectively.

For example, by allocating one master to a high priority and the remaining masters to intermediate priority, the one master will become a priority bus master having a right of priority higher than that of the other bus masters and will be granted bus privilege preferentially in comparison with other bus masters. The priorities of bus masters that have been allocated to arbitration sequencers having the same right of priority are the same.

In a case where a plurality of bus masters issue requests and the priority bus master issues requests successively, the priority bus master and the other non-priority bus masters obtain the bus privilege by turns. In a case where M3 is the priority master and M1, M2, M3, M4 keep on issuing requests, bus use privilege is granted in the order M3→M1→M3→M2→M3→M4→M3→M1.

Further, the high-priority bus master is capable of acquiring the bus privilege successively a number of times set beforehand in a programmable register within the arbiter. The bus can be used successively a maximum of four times.

When bus privilege shifts to another bus master from a bus master other than the priority bus master, this bus master cannot obtain the bus privilege again unless it is after the granting of bus privilege to all other bus masters that have issued requests. In a case where one bus master issues a request successively, it is capable of obtaining bus privilege successively if there are no other bus masters issuing requests. If another bus master is issuing a request, then this bus master can obtain the bus privilege successively a number of times set in advance. Once bus privilege has shifted to another bus master, the bus privilege cannot be obtained again unless it is after the granting of bus privilege to all other bus masters that have issued requests.

A maximum of three requests can be allocated to the low-priority arbitration sequencer 4004. The bus use privilege will not be granted to a master that has been allocated to the low-priority sequencer 4004 unless there are no longer requests from all masters allocated to the intermediate- and high-priority sequencers. The allocation of a bus master to this sequencer must be carried out with sufficient care.

(Changeover of priority bus master)

It will suffice to rewrite the register in the arbiter in order to change over the priority bus master. When the register for selecting the priority bus master is rewritten, the priority bus master is rewritten upon waiting for the end of the transaction being executed at this time. The arbiter returns to the idle state and arbitration is performed anew on the grounds that the bus master that was issuing the request at such time issued the request simultaneously.

Sufficient care must be taken in making the changeover. If the priority bus master is changed over to a different bus master before DMA of the bus master to be given priority ends, the degree of priority of the DMA of the initial priority bus master will decline. If it is not desired to lower the degree of priority of the initial priority bus master, then it is necessary to perform the changeover of the priority bus master after it is confirmed that DMA has ended.

With software that requires that the changeover of the priority bus master be performed dynamically not only at system booting but also during system operation, the changeover of the priority bus master should be performed by suspending the setting of all bus masters and DMA control in such a manner that a new DMA request will not be generated on the IO bus, subsequently setting an appropriate value in the register within the IO bus arbiter 407, checking the status register in the IO bus arbiter and activating access and DMA anew on the IO bus upon confirming that the right of priority of the bus master has been changed over.

There is a possibility that the dynamic changeover of the priority bus master will change or violate the real-time assurance of the operating system and the setting of task priority. This means that the changeover must be performed upon giving full consideration to the above.

(Access sequence control mechanism)

The IO bus arbiter 407 includes an access sequence control mechanism. The access sequence control mechanism is implemented by the synchronizing unit 4001 and bus-use privilege issuance suppression mechanisms incorporated in the IO bus arbiter 407 and G bus arbiter 406. The bus-use privilege issuance suppression mechanism incorporated in the IO bus arbiter 407 operates in the same manner as that of the G bus arbiter. That is, if a stopPci signal has entered, a bus request is issued by the Pci bus master. Even if the state is such that it is possible for the bus use privilege to be granted to this bus master as a result of arbitration, the bus use privilege is not issued and is granted to another master. More specifically, if the stopPci signal has entered, the above is carried out by immediately masking bPciReq_L.

Figure 41:
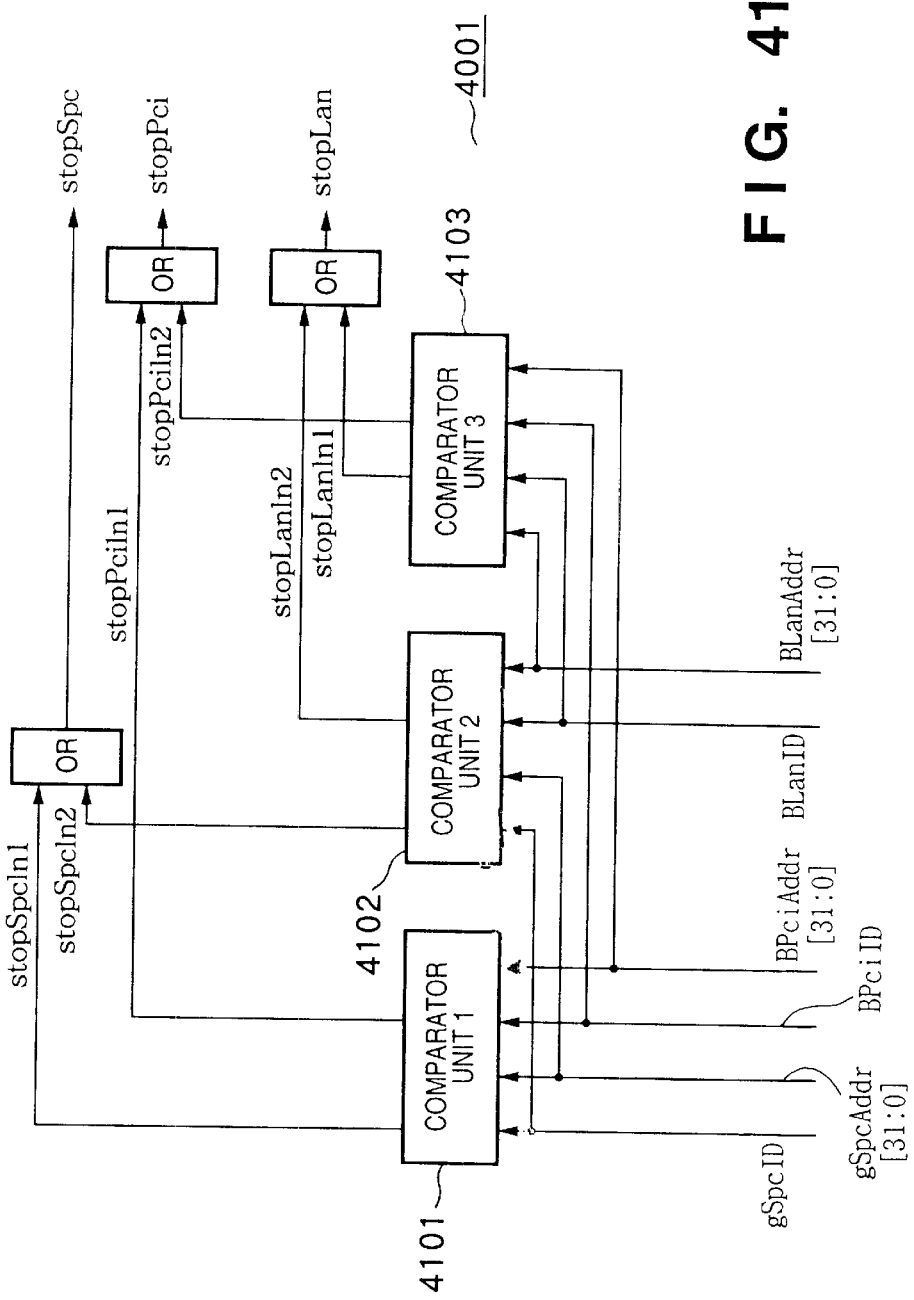
FIG. 41 is a block diagram of a synchronization unit.

Operation is exactly the same also in the case of a bus request from the LAN controller 414 and a stop signal. FIG. 41 is a block diagram of the synchronizing unit 4001. Comparator units 4101–4103 are connected within the synchronizing unit in relation to all combinations among a plurality of DMA masters. In regard to a DMA master on the G bus in a DoEngine, only the scanner/printer controller 408 exists. Two units, namely a DMAPCI unit and LAN unit, exists on the IO bus. The IO bus interface within the SBB is a bus master on the IO bus. However, since it does not directly access the memory, an ID and transfer destination address are not sent to the synchronizing unit 4001.

Figure 42:
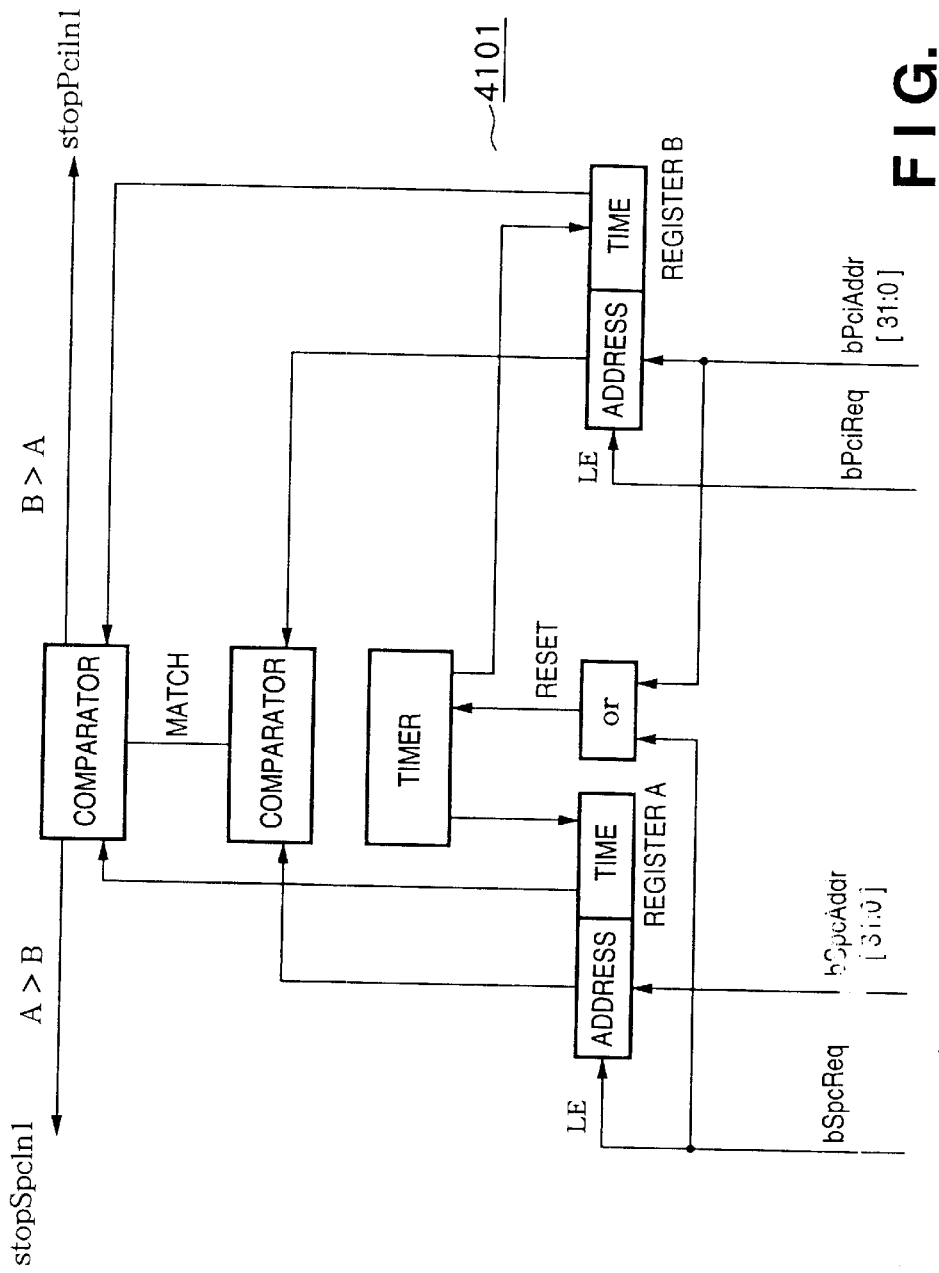
FIG. 42 is a diagram of one comparator in the synchronization unit.

FIG. 42 illustrates one comparator unit (comparator unit 1) in the synchronizing unit. The other comparator units are identically constructed.

A DMA block belonging to the PCI interface 416 or the scanner/printer controller 408 notifies the synchronizing unit 4001 of the address of a transfer destination and a request signal specific to this DMA block at the moment DMA write is programmed.

Each comparator unit stores the address of the destination together with the present time from an internal timer at the moment a request is output by each DMA block. At the moment an address and a request relating to DMA write enter from another DMA block, the comparator unit compares both addresses. If the two addresses match, the times stored in the respective registers are compared. Permission to the master to use the bus is not granted in regard to the bus arbiter of a bus to which has been connected the DMA block that issued the DMA write request later in terms of time. This is communicated to the bus arbiter of each bus by a stop (ID) signal.

No bus arbiter allocates bus use privilege by arbitration to a master notified by the stop (ID) signal.

As time passes and the DMA write to the pertinent memory address is ended by the bus master that issued the access request first, this master abandons the request with respect to the synchronizing unit. With respect to the bus arbiter of the bus connected to the DMA block that issued the DMA write request second, the synchronizing unit sends this DMA block a signal inhibiting bus use. DMA write of the master that is to execute the DMA write is carried out subsequently.

When both DMA writes end and both requests are abandoned, the timer is reset. The counting up of the timer is carried out again at the moment a request is issued again from either of the masters.

2.9. Scanner/printer controller

Figure 43:
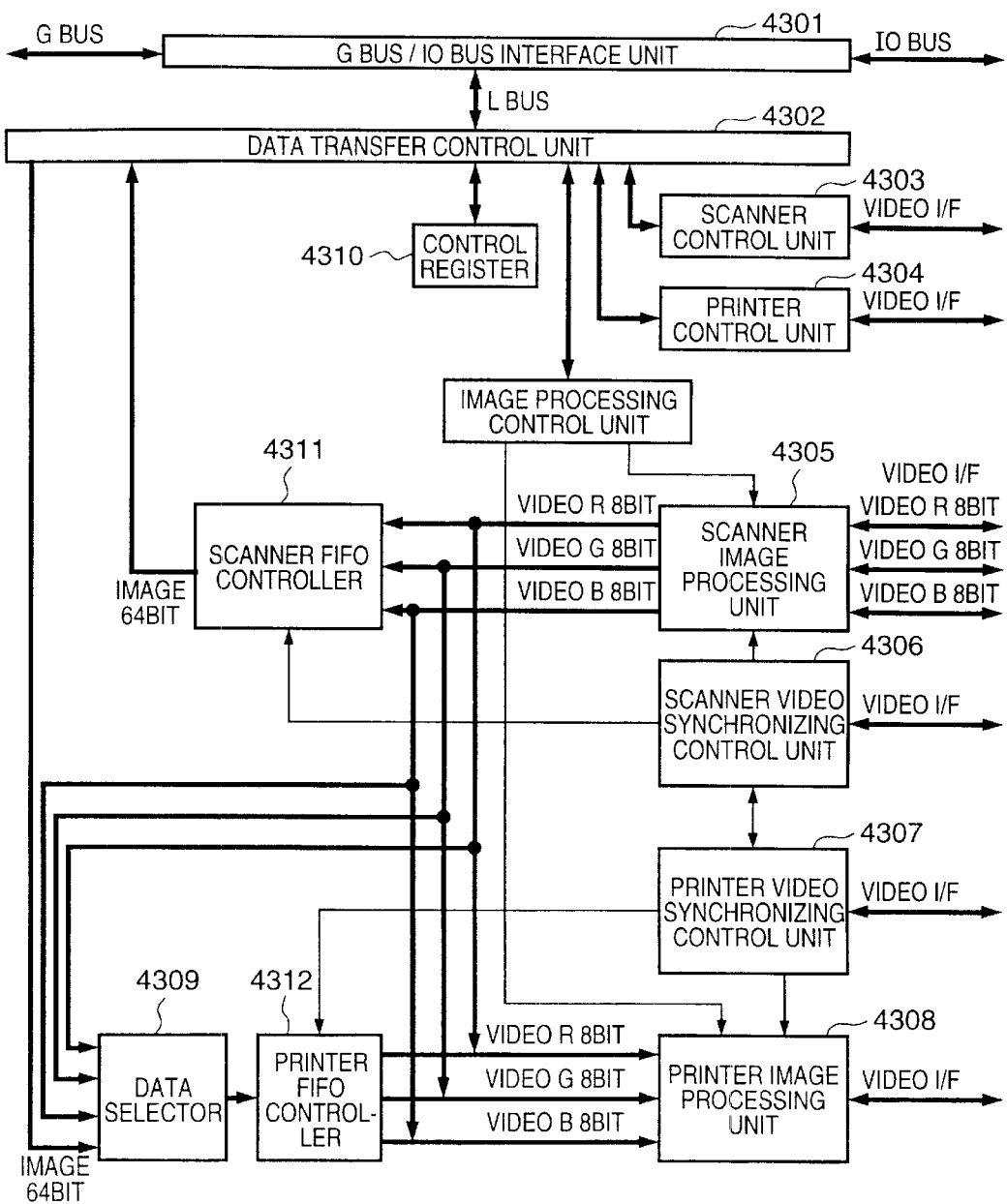
FIG. 43 is a block diagram of a scanner/printer controller.

FIG. 43 is a block diagram of the scanner/printer controller 408.

As shown in FIG. 43, the scanner/printer controller 408 is connected to a scanner and printer by video I/Fs and interfaces an internal G bus and IO bus. The controller 408 may be broken down broadly into the following eight blocks:

1. Scanner control unit 4304 . . . This controls the operation of the scanner via a video I/F.
2. Printer control unit 4304 . . . This controls the operation of the printer via a video I/F.
3. Scanner image processing unit 4305 . . . This applies image processing to image data that enters from the scanner.

4. Printer image processing unit 4308 . . . This applies image processing to image data that is output to the printer.
5. Scanner/video synchronizing unit 4306 . . . This generates input synchronizing timing with regard to image data that enters from the scanner.
6. Printer/video synchronizing unit 4307 . . . This generates output timing with regard to image data that is output to the printer. In a case of a combination in which the printer and scanner are capable of being synchronized, this unit generates video timing for a copying operation together with the scanner/video synchronizing unit 4306.
7. Data transfer control unit 4302 . . . This controls the data transfer operation. In the case of the DMA operation, it supports both master and slave operation.
8. G bus/IO bus interface unit 4301 . . . This is an interface unit for connecting the G bus and IO bus to the scanner/printer controller. The connection to the data transfer control unit 4302 is by an L bus.

<Scanner/video synchronizing control unit 4306>

Figure 44:
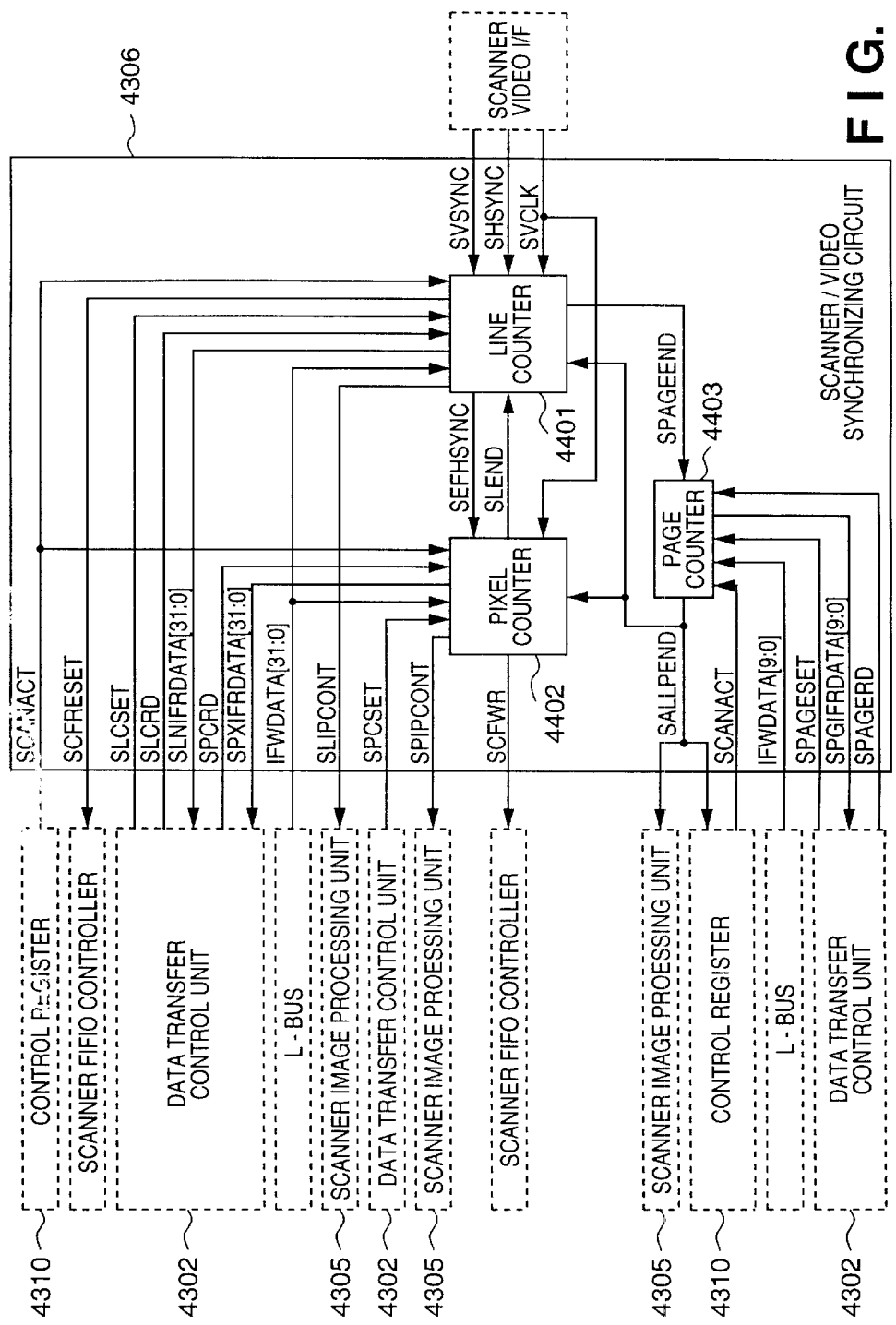
FIG. 44 is a block diagram of a scanner/video synchronization control unit.

FIG. 44 is a block diagram of the scanner/video synchronization control unit 4306.

(Overview of scanner/video synchronizing control unit)

The scanner/video synchronizing control unit 4306 generates an image-data capture timing signal, an image processing timing signal and a timing signal for writing to a FIFO, which is a transfer buffer, based upon a vertical synchronizing signal (SVSYNC), a horizontal synchronizing signal (SHSYNC) and an image data synchronizing clock (SVCLK) of image data entered from the scanner.

The unit manages delay of the image data and number of pixels captured in the main-scan direction, as well as delay and number of lines captured in the sub-scan direction. The unit generates a status signal (SALLEND) at the timing at which capture of a set amount of image data ends. A line counter 4401 manages delay in the sub-scan direction and captured line count and generates a vertical synchronizing signal (SEFHSYNC) regarding an effective area of the read image. A pixel counter 4402 manages image capture delay and captured pixel count in the main-scan direction. The counter 4402 generates a write timing signal (SCFWR) for storing captured image data in the FIFO. A page counter 4403 manages entered image data in the page units. When input of a set number of pages of image data ends, the counter 4403 generates an end signal (SALLPEND).

The values set in the line counter 4401, pixel counter 4402 and page counter 4403 are read and written by a control register 4310. Signals other than those mentioned are above are as follows:

| write data | : IFWDATA [31:0] |
|---|---|
| read data | IFRDATA [31:0] |
| line counter write signal | SLCSET |
| line counter read signal | SLCRD |
| pixel counter write signal | SPCSET |
| pixel counter read signal | SPCRD |
| page counter write signal | SPAGESET |
| page counter read signal | SPAGERD |

<Printer/video synchronizing control unit 4307>

Figure 45:
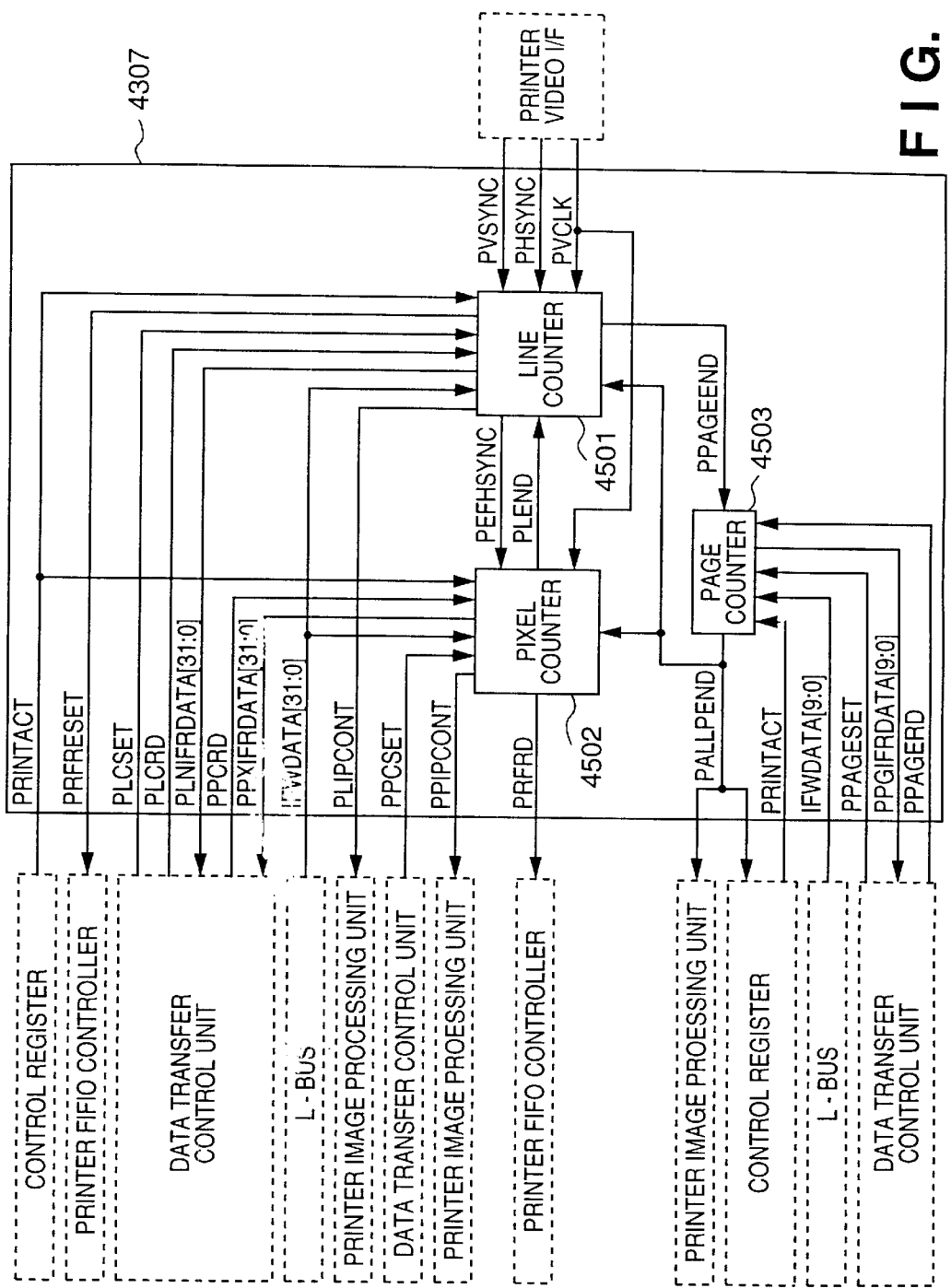
FIG. 45 is a block diagram of a printer/video synchronization control unit.

FIG. 45 is a block diagram of the printer/video synchronization control unit 4307.

(Overview of printer/video synchronizing control unit)

The printer/video synchronizing control unit 4307 generates an image-data capture timing signal, an image processing timing signal and a timing signal (PRFRD) for reading from a FIFO, which is a transfer buffer, based upon a vertical synchronizing signal (PVSYNC), a horizontal synchronizing signal (PHSYNC) and an image data synchronizing clock (PVCLK) of image data entered from the printer.

The unit manages delay of the image data and number of pixels captured in the main-scan direction, as well as delay and number of lines captured in the sub-scan direction. The unit generates a status signal (PLEND) at the timing at which capture of a set amount of image data ends. A line counter 4501 manages delay in the sub-scan direction and output line count and generates a vertical synchronizing signal (PEFHSYNC) regarding an effective area of the image to be output. A pixel counter 4502 manages image output delay and output pixel count in the main-scan direction. The counter 4502 generates a read timing signal (PRFRD) for reading output image data out of the FIFO. A page counter 4503 manages image data to be output in page units. When output of a set number of pages of image data ends, the counter 4503 generates an end signal (PALLPEND).

The values set in the line counter 4501, pixel counter 4502 and page counter 4503 are read and written by the control register 4310. Signals other than those mentioned are above are as follows:

| write data | : IFWDATA[31:0] |
|---|---|
| read data | IFRDATA [31:0] |
| line counter write signal | PLCSET |
| line counter read signal | PLCRD |
| pixel counter write signal | PPCSET |
| pixel counter read signal | PPCRD |
| page counter write signal | PPAGESET |
| page counter read signal | PPAGERD |

<Scanner FIFO controller 4311>

Figure 46:
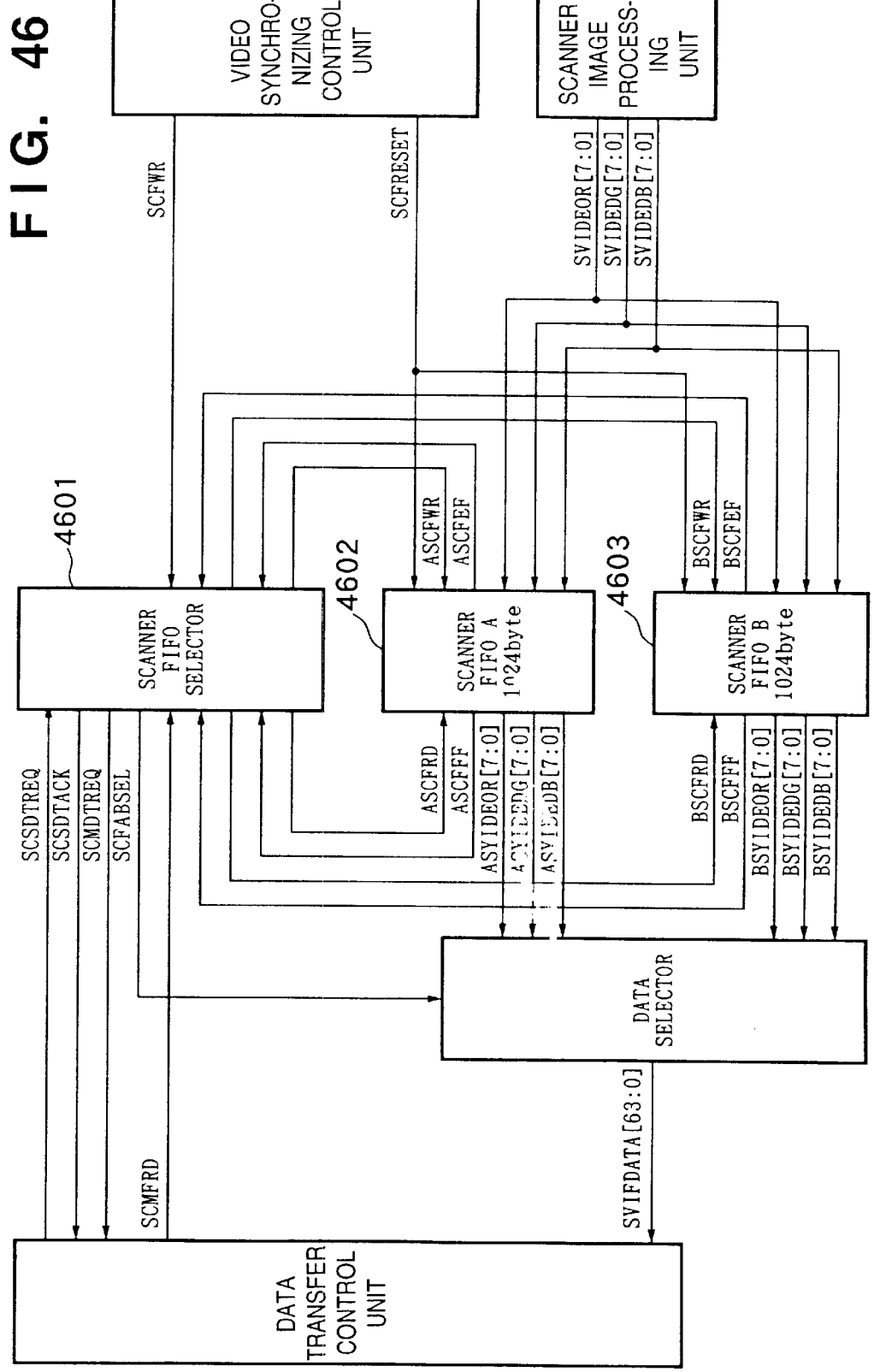
FIG. 46 is a block diagram of a scanner FIFO controller.

FIG. 46 is a block diagram of a scanner FIFO controller. A scanner FIFO controller 4311 (see FIG. 43) includes FIFOs as buffers for transferring, via the G bus or IO bus, image data that has entered from the scanner, and a circuit for controlling these FIFOs. The controller has two FIFOs 4602, 4603 each having a capacity of 1024 bits and a data width of 24 bytes (eight bits for each of R, G and B). These FIFOs operate as a double buffer for alternately performing a G bus/IO bus data transfer operation and an operation for inputting image data from the scanner. FIFO data input/output is controlled by a scanner FIFO selector 4601 using a FIFO full flag (FF) and empty flag (EF).

<Printer FIFO controller 4312>

Figure 47:
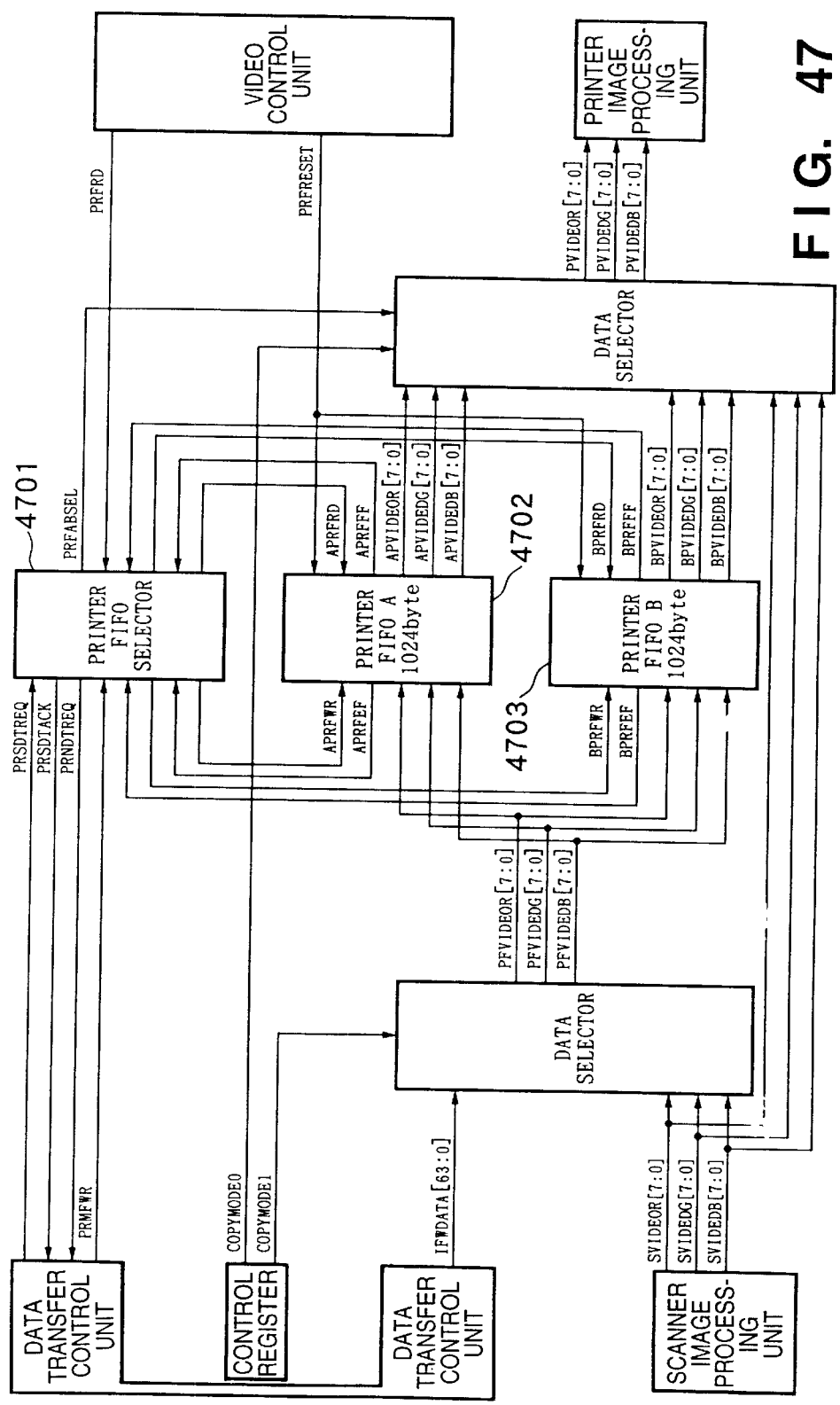
FIG. 47 is a block diagram of a printer FIFO controller.

FIG. 47 is a block diagram of the printer FIFO controller 4312 (see FIG. 43). The printer FIFO controller 4311 includes FIFOs as buffers for transferring, via the G bus or IO bus, image data that is output to the printer, and a circuit for controlling these FIFOs. The controller 4312 has two FIFOs 4702, 4703 each having a capacity of 1024 bytes and a data width of 24 bits (eight bits for each of R, G and B). These FIFOs operate as a double buffer for alternately performing a G bus/IO bus data transfer operation and an operation for outputting image data to the printer. FIFO data input/output is controlled by a printer FIFO selector 4701 using a FIFO full flag (FF) and empty flag (EF).

The scanner printer controller 408 has data paths for outputting scanner data directly to the printer, as shown in FIG. 43, in order that the scanner and printer may be operated synchronously to perform a copying operation. These data paths are selectable depending upon the synchronization of the data inputs and outputs of the scanner and printer.

<Data transfer control unit 4302>

Figure 48:
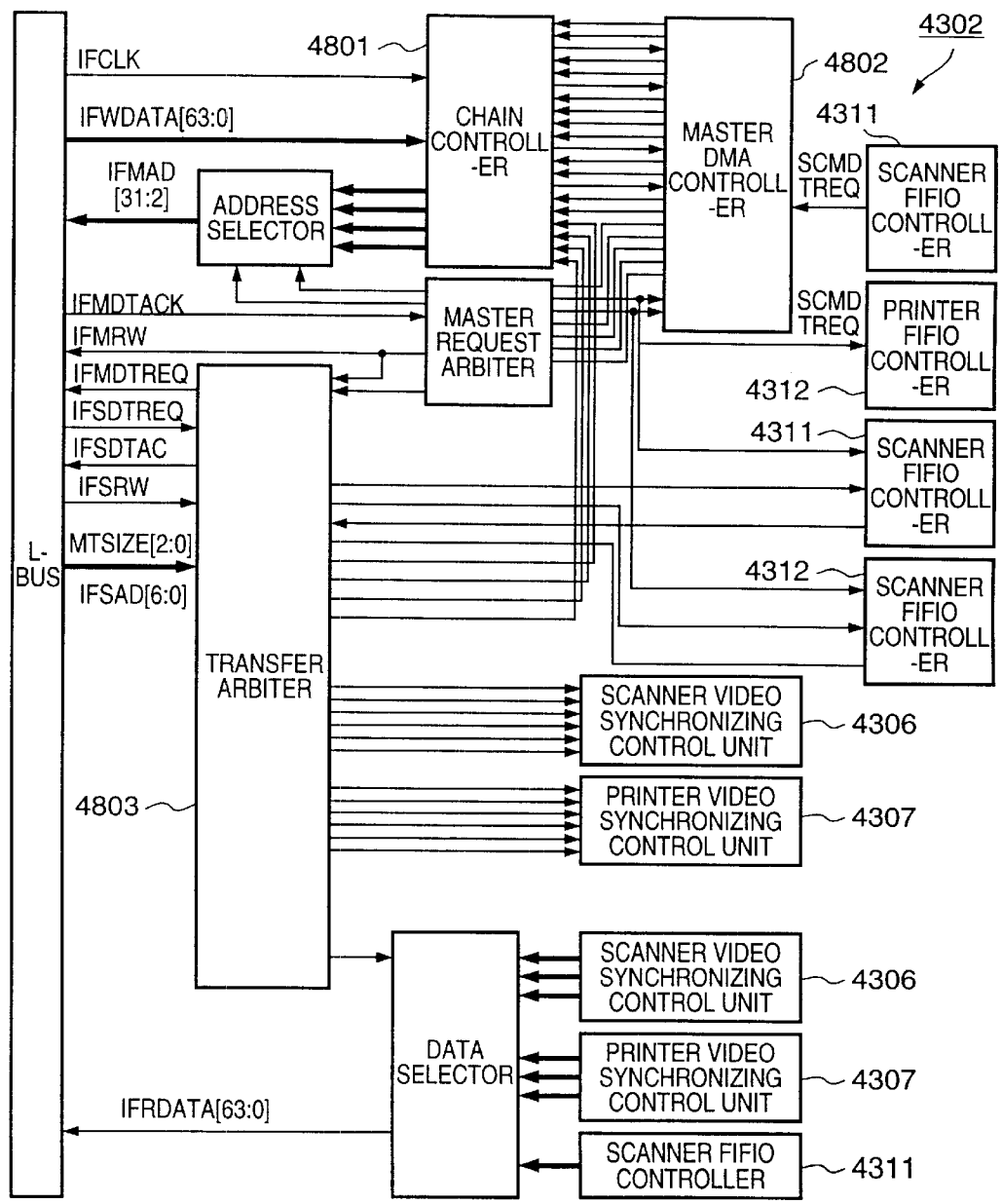
FIG. 48 is a block diagram of a data transfer control unit.

FIG. 48 is a block diagram of the data transfer control unit 4302. The data transfer control unit 4302 is a block for controlling the input and output of data to and from the L bus and includes a chain controller 4801, a master DMA controller 4802 and a transfer arbiter 4803, etc.

The data transfer control unit controls the following operations as a master:

1. image data DMA transfer from the scanner and reference to a chain table; and
2. image data DMA transfer to the printer and reference to a chain table; and controls the following operations as a slave:
   1. write/read of internal registers;
   2. image data transfer from the scanner; and
   3. image data transfer to the printer.

(Chain controller)

Figure 49:
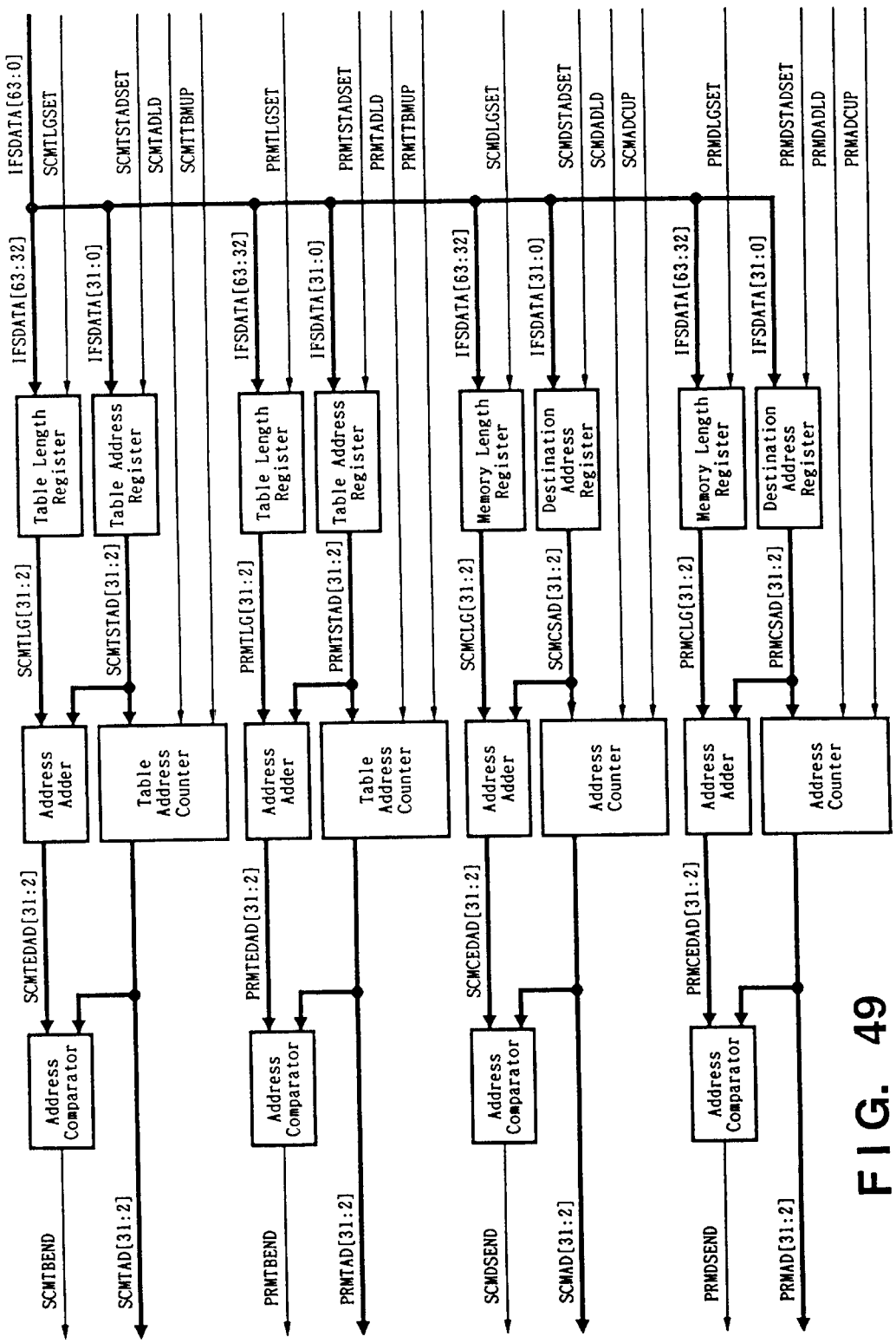
FIG. 49 is a block diagram of a chain controller.

FIG. 49 is a block diagram of the chain controller 4801. The chain controller comprises an address pointer block indicating a chain table and an address pointer block indicating the transfer destination of DMA. This is a transfer destination address generating block for when the scanner/printer controller performs DMA acting as a master and supports chain DMA. Scanner data transfer and printer data transfer are performed independently.

<L bus>

This is a local bus in the scanner/printer controller connecting the Gbus/IO bus interface unit and data transfer unit. It includes the signals indicated below. In regard to signal input and output, a signal output from the data transfer control unit 4302 to the G bus/IO interface unit 4301 is represented by OUT, and a signal input to the data transfer control unit 4302 from the G bus/IO interface unit 4301 is represented by IN.

IFCLK (IN) . . . This is the basic clock of the L bus.

IFRDATA[63:0] (OUT) . . . This is a 64-bit data bus for an output from the data transfer control unit to the G bus/IO bus interface unit. The data transfer control unit is used in both master and slave operations.

IFWDATA[63:0] (IN) . . . This is a 64-bit data bus for an output from the G bus/IO bus interface unit to the data transfer control unit. The data transfer control unit is used in both master and slave operations.

IFMDTREQ (OUT) . . . With the data transfer control unit acting as a master, this indicates the effective status of a data transfer request, data and address. When "high" the signal indicates the effective status of the data transfer request and address bus IFMAD[3:12].

IFMAD[31:2] (OUT) . . . This is an address bus which indicates the target address when the data transfer control unit operates as a master. The effective address is output when the IFMDTREQ signal is in the active state "high".

IFMRW (OUT) . . . This signal indicates data input/output when the data transfer control unit operates as a master. When this signal is "high", the data transfer control unit inputs data from IFWDATA[63:0]. When the signal is "low", the data transfer control unit outputs data to IFRDATA[63:0].

IFMDTACK (IN) . . . This is a response signal to IFMDTREQ which is output from the G bus/ IO bus interface unit when the data transfer control unit operates as a master. When this signal is "high", it indicates that IFRDATA [63:0] or IFWDATA [63:0] is the effective data.

PRIOR[3:0] (OUT) This indicates the degree of priority of the data transfer when the data transfer control unit operates as a master. The degree of priority is as defined in Table 8.

TABLE 8

| PRIOR3 | PRIOR2 | PRIOR1 | PRIOR0 | PRIORITY |
| --- | --- | --- | --- | --- |
| 1 | 1 | 1 | 1 | HIGH |
| 1 | 1 | 1 | 0 | ↑ |
| 0 | 0 | 0 | 1 | ↓ |
| 0 | 0 | 0 | 0 | LOW |

MTSIZE[2:0] (OUT) . . . This indicates the unit size of a transfer when the data transfer control unit operates as a master. During a transfer of this unit size, IFMDTREQ remains active "high". Size is as indicated in Table 8.

TABLE 9

| MSIZE2 | MSIZE1 | MSIZE0 | TRANSFER UNIT SIZE |
| --- | --- | --- | --- |
| 1 | 1 | 1 | 64 bits × 64 |
| 1 | 1 | 0 | 64 bits × 48 |
| 1 | 0 | 1 | 64 bits × 32 |
| 1 | 0 | 0 | 64 bits × 16 |
| 0 | 1 | 1 | 64 bits × 4 |
| 0 | 1 | 0 | 64 bits × 2 |
| 0 | 0 | 1 | 64 bits |
| 0 | 0 | 0 | 32 bits |

This indicates the effective status of a data transfer request, data and address from the G bus/IO bus interface unit when the data transfer control unit operates as a slave. When "high" the signal indicates the effective status of the data transfer request and address bus IFSAD[6:2].

IFSAD[6:2] (IN) . . . This is an address bus which indicates the target address when the data transfer control unit operates as a slave. The effective address is output when the IFSDTREQ signal is in the active state "high".

IFSRW (IN) . . . This signal indicates data input/output when the data transfer control unit operates as a slave. When this signal is "high", the data transfer control unit outputs data to IFRDATA[63:0]. When the signal is "low", the data transfer control unit inputs data from IFWDATA[63:0].

IFMDTACK (OUT) . . . This is a response signal to IFSDTREQ which is output from the G bus/ IO bus interface unit when the data transfer control unit operates as a slave. When this signal is "high", it indicates that IFRDATA [63:0] or IFWDATA [63:0] is the effective data.

STSIZE (IN) . . . This indicates the data width from the G bus/IO bus interface unit when the data transfer control unit operates as a slave. When this signal is "high", IFRDATA[63:0] or IFWDATA[63:0] becomes effective. When this signal is "low", IFRDATA[31:0] or IFWDATA[31:0] becomes effective.

<G bus/IO bus interface unit>

Figure 50:
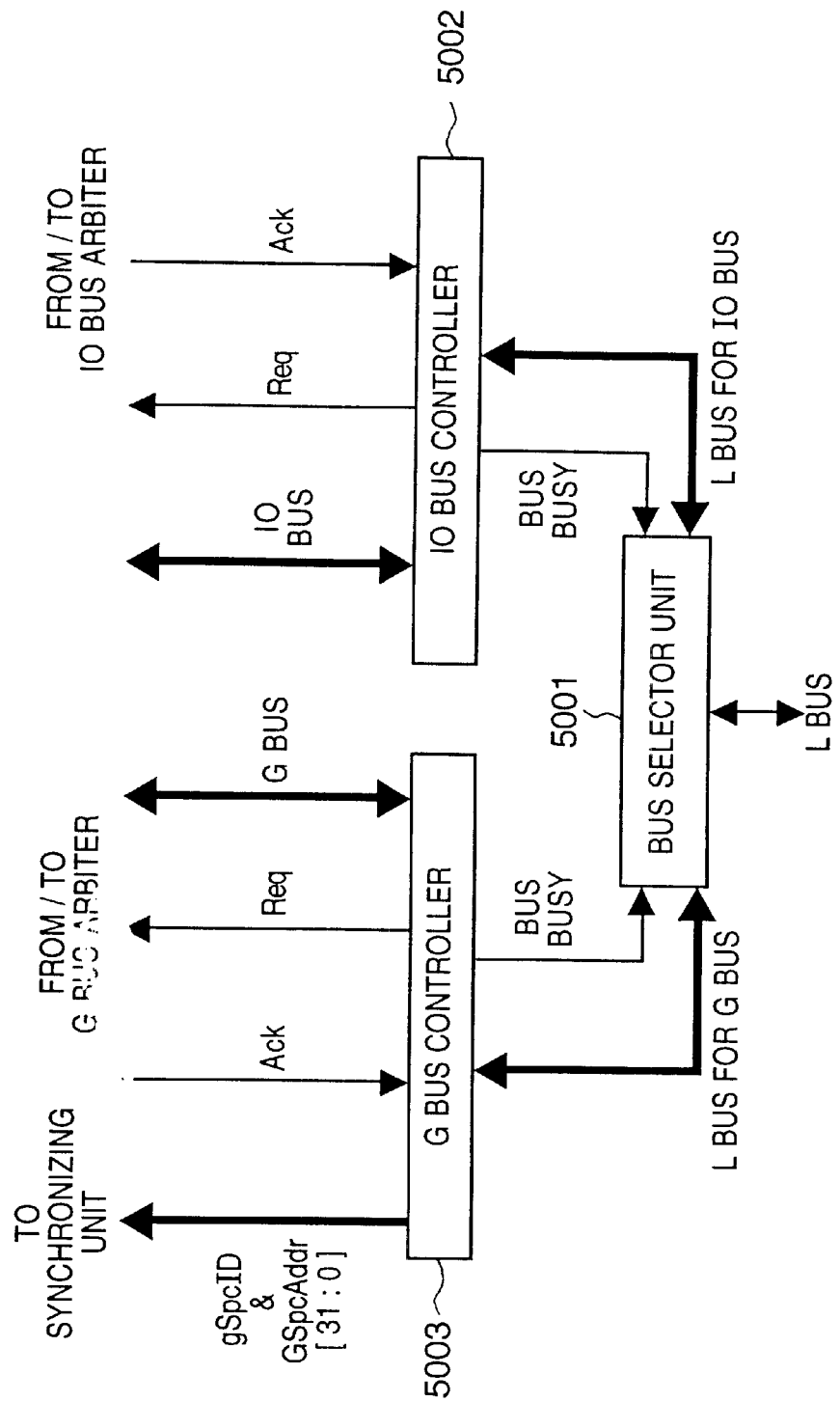
FIG. 50 is a block diagram of a G bus/IO bus interface unit.

FIG. 50 is a block diagram of the G bus/IO bus interface unit 4301. The G bus/IO bus interface unit is the interface between the internal bus (L bus) and external bus (G bus/IO bus) of the copy engine. Though this unit is implemented in such a manner that it can be used by other function blocks, in this embodiment the copy engine makes use of the unit. It should be noted that the copy engine is a generic term which includes the scanner/printer controller 408 and the scanner and printer controlled by it.

The G bus/IO bus interface unit generally comprises three sections, namely a bus selector unit 5001, an IO bus controller 5002 and a G bus controller 5003.

When the copy engine operates as a DMA master, the bus selector unit 5001 performs a bus selection dynamically based upon the amount of burst transfer possible on the L bus, the degree of priority (degree of urgency) of the transfer, the transfer destination address and bus (G bus and IO bus) idle information, and connects the L bus to the corresponding controller (G bus controller 5003 or IO bus controller 5002) upon applying some preprocessing. When the copy engine operates as a DMA slave, the engine arbitrates requests from each of the buses (G bus and IO bus) and connects the L bus to the bus having the highest priority.

The G bus controller 5003 and IO bus controller 5002 connect the bus (the G bus or IO bus) to the L bus. Each of the units will be described below.

The copy engine is a DMA master capable of DMA transfer with respect to both the G bus and IO bus, and the G bus/IO bus interface unit 4301 decides the bus to be used when the DMA transfer is made. With the conventional system, the bus is changed over in dependence upon the transfer destination (address). However, good performance cannot be obtained from the overall system unless the transfer speed and ratio of use of each bus are taken into consideration.

The bus selector unit 5001 performs efficient bus selection dynamically based upon the amount of burst transfer possible on the L bus, the degree of priority (degree of urgency) of the transfer, the transfer destination address and bus (G bus and IO bus) idle information, and connects the L bus to the corresponding controller (G bus controller 5003 or IO bus controller 5002) upon applying some preprocessing.

The G bus controller 5003 and IO bus controller 5002 send the write address and the ID of the function block (here the copy engine) to the bus (G bus or IO bus) synchronizing unit that corresponds to the L bus. Each of these units will be described below.

(Bus selector unit)

Figure 51:
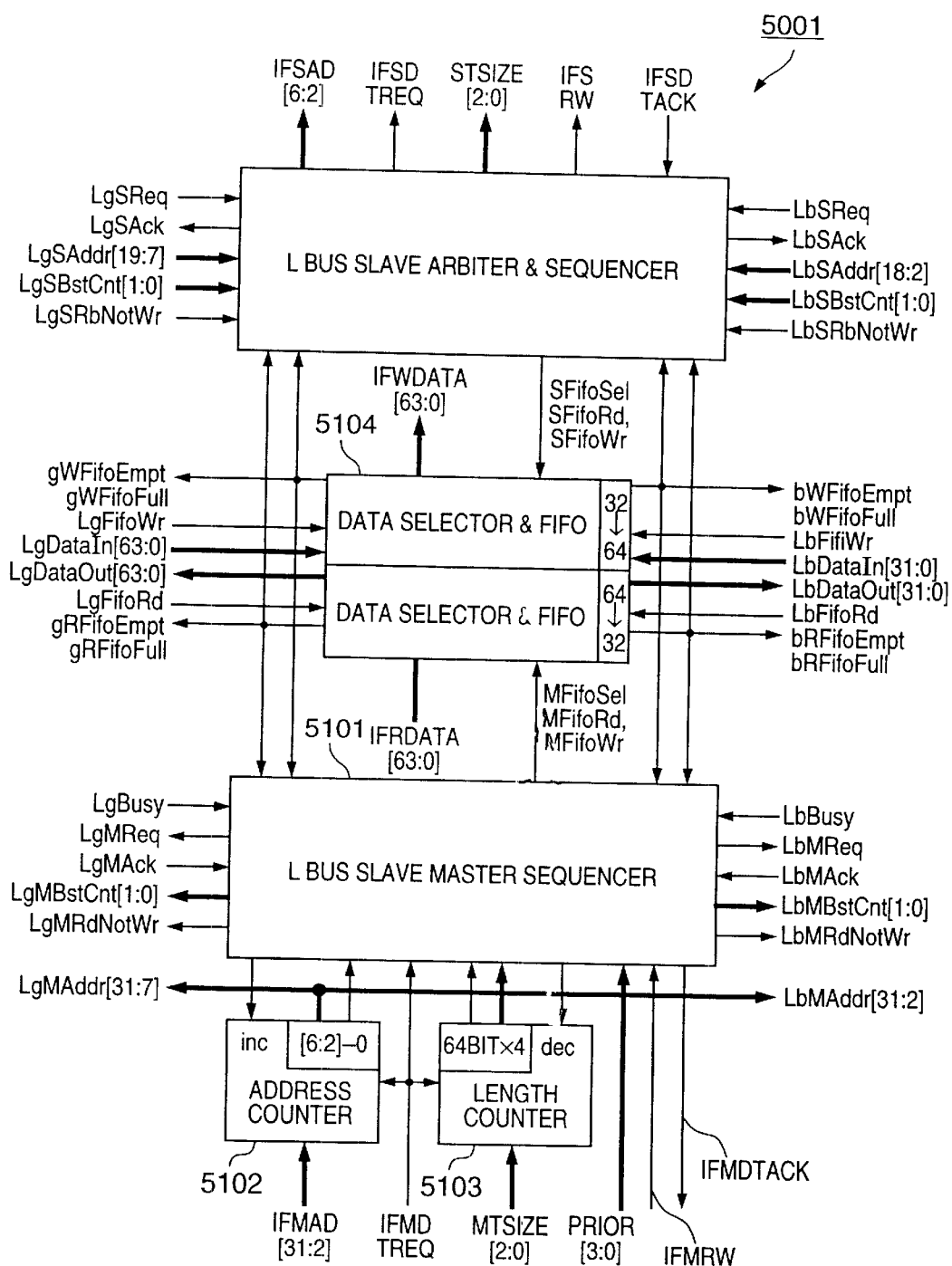
FIG. 51 is a block of a bus selector unit.

FIG. 51 is a block diagram of the bus selector unit 5001. The operation of this unit will now be described.

[Operation when copy engine is master]

In a case where the copy engine is a master, the engine is controlled by an L bus master sequencer 5101 of the bus selector unit. The L bus master sequencer 5101 becomes aware of a request for master operation from the copy engine by receiving IFMDTREQ (a master data request signal) from the copy engine.

The copy engine outputs IFMAD[31:2] (master transfer address signal), MTSIZE[2:0] (master transfer length signal) and IFMRW (master read/write signal) to the bus selector unit 5001 at the same time that IFMDTREQ is asserted. The transfer address is latched in an address counter 5102 and the transfer length is latched in a length counter 5103.

The L bus master sequencer 5101 decides whether to use the G bus or the IO bus based upon the address counter, length counter, priority and busy states of the buses when transfer on the external bus is started. If the five lower order bits of the address counter are all "0"s, or if the length counter is less than 64 bits×4, then transfer on the G bus is impossible. The IO bus, therefore, is selected. Otherwise the G bus is selected except for a case where priority is high, the G bus is currently in use and the IO bus is idle. When transfer cycle for transfer to the external bus ends, the address counter 5102 and length counter 5103 are updated.

If the content of the length counter is not zero, the above-described operation is repeated. The bus selection standard is shown in Table 10.

TABLE 10

| ADDRESS COUNTER [4:0] = 0 & LENGTH COUNTER ≥ 64 BITS × 4 | PRIORITY | BUS STATUS | | BUS SELECTED |
|---|---|---|---|---|
| | | IO BUS | G BUS | |
| NO | — | — | — | IO BUS |
| YES | LOW | — | — | G BUS |
| | HIGH | READY | READY | G BUS |
| | | READY | BUSY | IO BUS |
| | | BUSY | READY | G BUS |
| | | BUSY | BUSY | G BUS |

In a transfer from the copy engine to the external bus, the L bus master sequencer 5101 asserts the IFMDTACK signal, requests the copy engine for data transfer and writes the obtained data to a data FIFO 5104 so long as the data FIFO 5104 is not full. Further, the L bus master sequencer 5101 asserts a master transfer request signal (LbMReq or LgMReq) and requests the external bus controller (the IO bus controller 5002 or G bus controller 5003) for data transfer so long as the data FIFO 5104 is not empty. The external bus controller (the IO bus controller 5002 or G bus controller 5003) transfers the data of the data FIFO 5104 and asserts a master transfer notification signal (LbMAck or LgMAck) at the end of the transfer. The L bus master sequencer 5101, therefore, is capable of recognizing the end of the transfer to the external bus.

In a transfer from the external bus to the copy engine, the L bus master sequencer 5101 asserts the master transfer request signal (LbMReq or LgMReq), requests the external bus controller (the IO bus controller or G bus controller) for data transfer and writes the data to a data FIFO so long as the data FIFO is not full. Further, the L bus master sequencer 5101 asserts the IFMDTACK signal, requests the copy engine for data transfer and writes the obtained data to the data FIFO so long as the data FIFO is not empty.

(IO bus controller)

FIG. 52 is a block diagram of the IO bus controller 5002.

The IO bus controller 5002 is an interface for interfacing the L bus and IO bus.

The IO bus master sequencer 5201 controls operation in case of the IO bus master and the IO bus slave sequencer 5202 controls operation in the case of the IO bus slave.

[Operation when copy engine is master]

Data transfer starts in response to assertion of the LbMReq signal from the bus selector unit 5001. The direction of the transfer is decided by an LbMRdNotWr signal from the bus selector unit 5001 asserted at the same time as the LbMReq signal. The size of the transfer is decided by an LbBstCnt[1:0] signal from the bus selector unit 5001 asserted at the same time as the LbMReq signal. Further, the transfer address is decided by an LbMAddr[31:2] signal from the bus selector unit 5001 asserted at the same time as the LbMReq signal.

If the data FIFO for reading is full (i.e., if bRFifoFull has been asserted), the transfer from the IO bus (namely when the LbMRdNotWr signal is "0") waits until the FIFO is no longer full. The IO bus sequencer starts the transfer on the IO bus decided and the obtained data is written to the data FIFO of the bus selector unit 5001.

If the data FIFO for writing is empty (i.e., if bwFifoEmpt has been asserted), the transfer to the IO bus (namely when the LbMRdNotWr signal is "1") waits until the FIFO is no longer empty. The IO bus sequencer starts the transfer on the IO bus decided and the obtained data is sent out on the IO bus from data FIFO of the bus selector unit 5001.

(G bus controller)

FIG. 53 is a block diagram of the G bus controller 5003.

The G bus controller 5003 is an interface for interfacing the L bus and G bus.

The G bus master sequencer 5301 controls operation in case of the G bus master and the G bus slave sequencer 5302 controls operation in the case of the G bus slave.

[Operation when copy engine is master]

Data transfer starts in response to assertion of the LbM-Req signal from the bus selector unit 5001. The direction of the transfer is decided by the LbMRdNotWr signal from the bus selector unit 5001 asserted at the same time as the LbMReq signal. The size of the transfer is decided by an LbBstCnt[1:0] signal from the bus selector unit 5001 asserted at the same time as the LbMReq signal. Further, the transfer address is decided by the LbMAddr[31:2] signal from the bus selector unit 5001 asserted at the same time as the LbMReq signal.

If the data FIFO for reading is full (i.e., if gRFifoFull has been asserted), the transfer from the G bus (namely when the LgMRdNotWr signal is "0") waits until the FIFO is no longer full. The G bus sequencer starts the transfer on the G bus decided and the obtained data is written to the data FIFO of the bus selector unit 5001.

If the data FIFO for writing is empty (i.e., if bWFifoEmpt has been asserted), the transfer to the G bus (namely when the LgMRdNotWr signal is "1") waits until the FIFO is no longer empty. The G bus sequencer starts the transfer on the G bus decided and the obtained data is sent out on the G bus from data FIFO of the bus selector unit 5001.

2.10. Power management unit (PMU)

Figure 54:
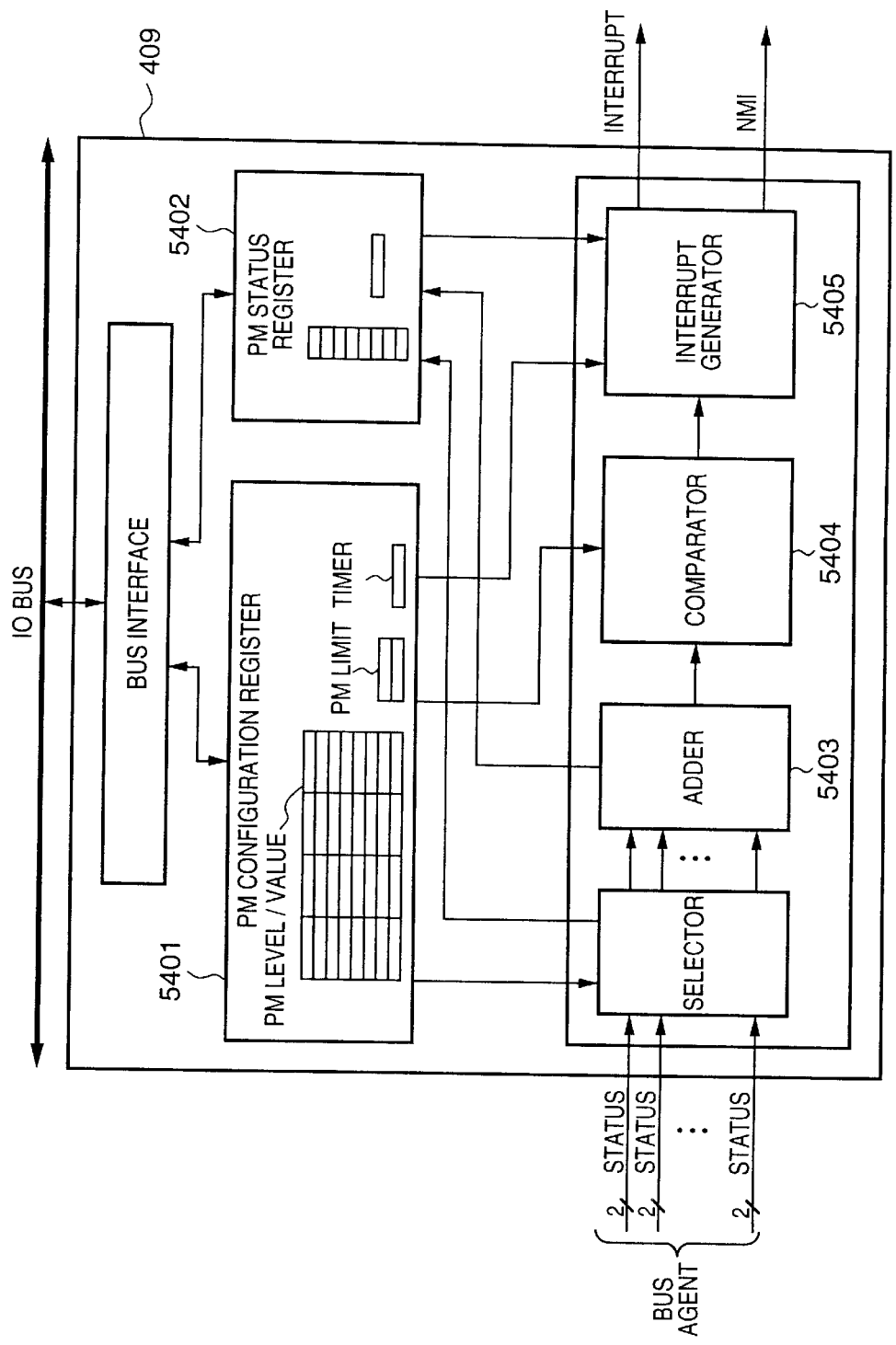
FIG. 54 is a block diagram of a power management unit.

FIG. 54 is a block diagram of the power management unit 409.

The DoEngine is a large-size ASIC having an internal CPU. When all of the internal logic operates at the same time, therefore, a large amount of heat is produced and there is the danger that the chip itself will be destroyed. To prevent this, the DoEngine manages power, i.e., performs power management, block by block, i.e., and monitors the amount of power consumption of the overall chip.

Power management is carried out individually for each block. Information relating to the amount of power consumed by each block is collected in the power management unit (PMU) 409 as power management levels. The PMU 409 totals the amount of power consumed by the blocks and monitors the amount of power consumption of each block of the DoEngine collectively so that the total value of power consumption will not exceed a boundary power consumption.

<Operation>

The operation of the power management blocks will now be described.

Each block has four power management levels.

The PMU holds the value of power consumption at each level in a configuration register. The level configuration and power consumption value are held in a PM configuration register 5401.

The PMU accepts the power management level from each block as a 2-bit status signal (described below) and ascertains the power consumption of each block by making a comparison with the value set in the register 5401.

The PMU sums the power consumption of each block using an adder 5403 and calculates the overall amount of power consumption of the DoEngine in real-time.

The calculated amount of power consumption is compared, by way of a comparator 5404, with a limit value (PM limit) on power consumption set in the register 5401. If the limit value is exceeded, an interrupt generator 5405 issues an interrupt signal.

The limit value can be set to two stages. The first stage sets a value having a small amount of leeway with respect to the true boundary. When this value is exceeded, an ordinary interrupt signal is issued. The software receives this signal and does not start a transfer that will activate a block anew. However, a new block can be activated under the management of the software within a range in which the second-stage limit value is not attained. The second-stage limit value sets a value at which there is the danger of device destruction. In the event that this value is exceeded, an NMI (an interrupt for which an interrupt mask cannot be set) is issued to shut down the system for the sake of safety.

The interrupt signal is canceled by reading a status register 5402 of the PMU. A time counter is activated at the moment the status register 5402 is read. If the amount of power consumption does not return by the time the timer runs out of time, the interrupt signal is issued again. The timer value is set in the register 5401 of the PMU.

<Power management of each block>

Power management control of each block may be set up freely block by block. Examples of arrangements will be illustrated.

(Arrangement 1)

Figure 55:
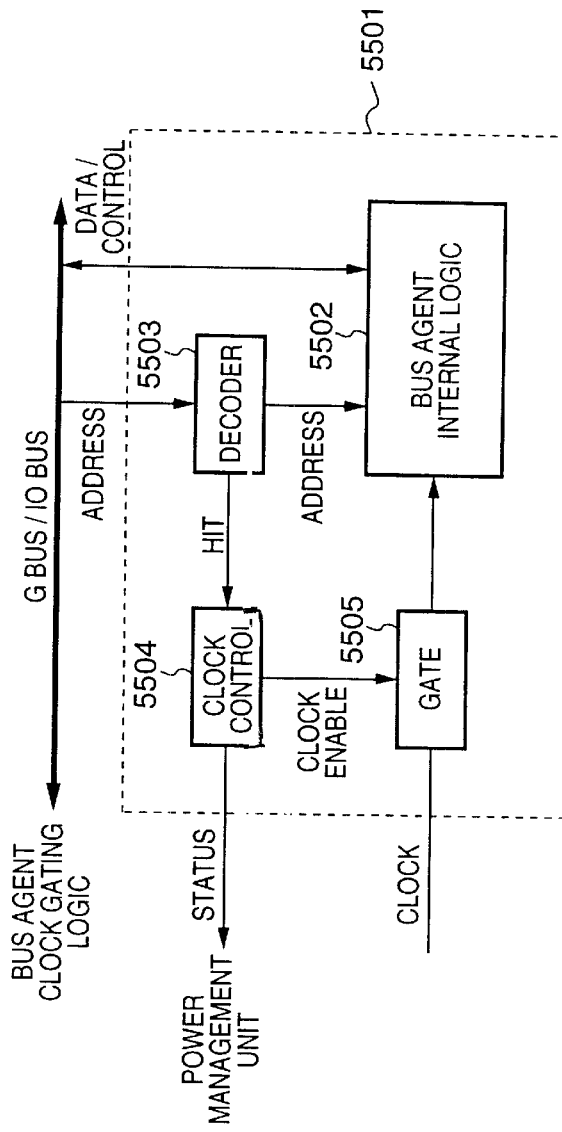
FIG. 55 is a block diagram of a bus agent.

In this example power management is performed by turning a clock to internal logic on and off, and the level of power consumption has only two stages. This level is sent to the power management unit 409 as a status signal. FIG. 55 is a block diagram of a bus agent.

A bus agent 5501 includes internal logic 5502 for each unit, a decoder 5503 for decoding addresses, a clock controller 5504 and a clock gate 5505.

The decoder 5503 and clock controller 5504, which operate at all times, execute power management control, namely monitoring of bus activity and gating of clocks to internal logic.

<Clock control>

The bus agent detects bus activity and turns the clock on and off automatically.

The bus agent has three states, namely sleep, wake-up and wait.

The sleep state is a state in which the bus agent exhibits no activity and the clock gate clock has been stopped.

The decoder 5503 and clock controller 5504 are operating even in the sleep state; they monitor the bus and wait for a request.

When the decoder 5503 detects its own address, the clock gate 5505 is opened, the clock of the internal logic is activated and a bus request is complied with. The state shifts to the wake-up state. In addition, the power management control unit 409 is notifies of this state.

When data transfer ends, a transition is made to the wait state and the next request is awaited. The clock remains active. If there is a request, the wake-up state is restored and a transfer is carried out. Counting is performed by the timer while a request is being awaited. If the timer runs out of time without a request being issued, a transition is made to the sleep state and the clock is stopped. The power management unit 409 is notified of this state as well.

Thus, management is performed in such a manner that power consumption will not exceed a predetermined value.

[Other example of arrangement of DoEngine]

Figure 9:
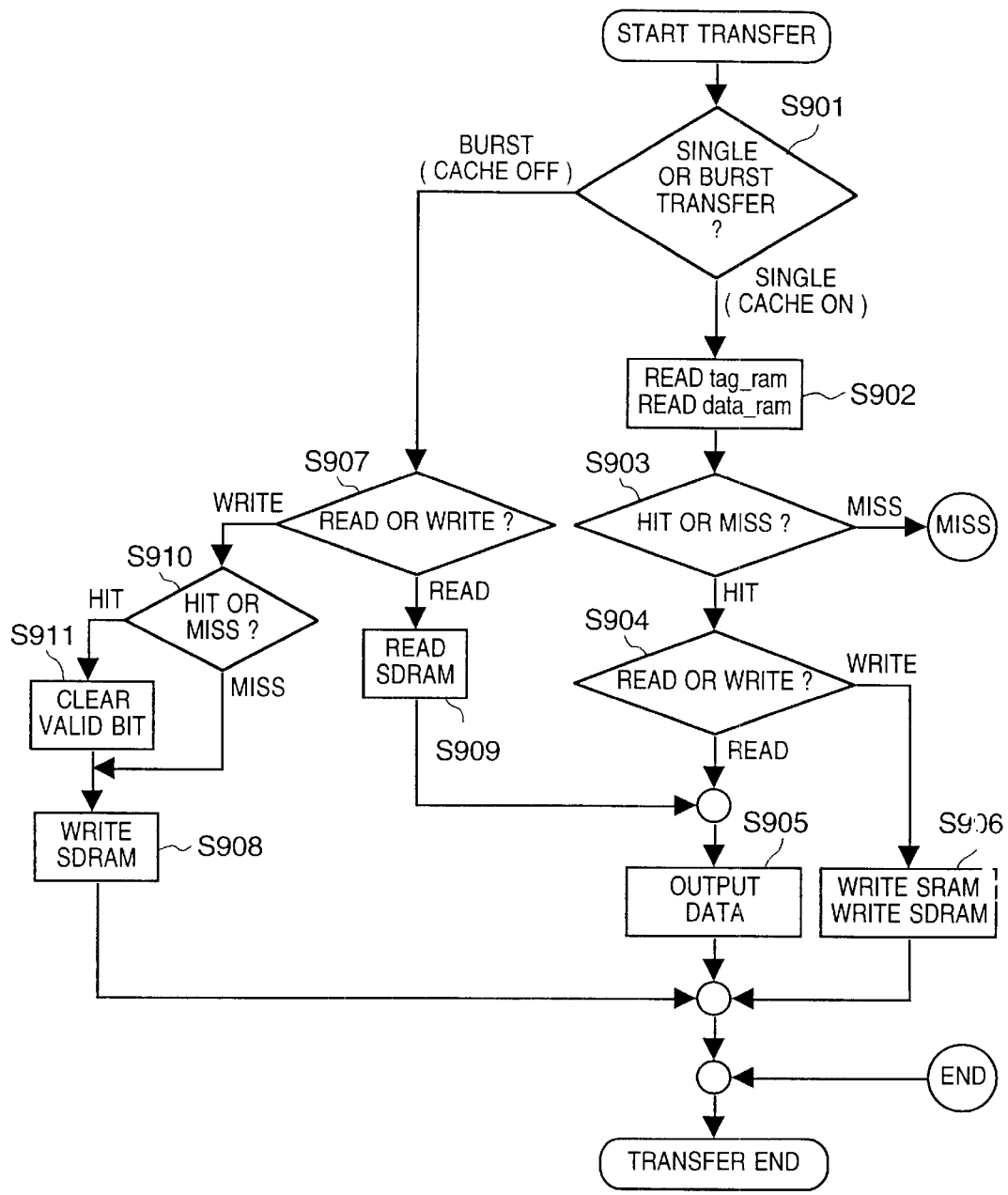
FIG. 9 is a flowchart showing operation of a cache when memory read/write transfer has been requested from an MC bus.
Figure 10:
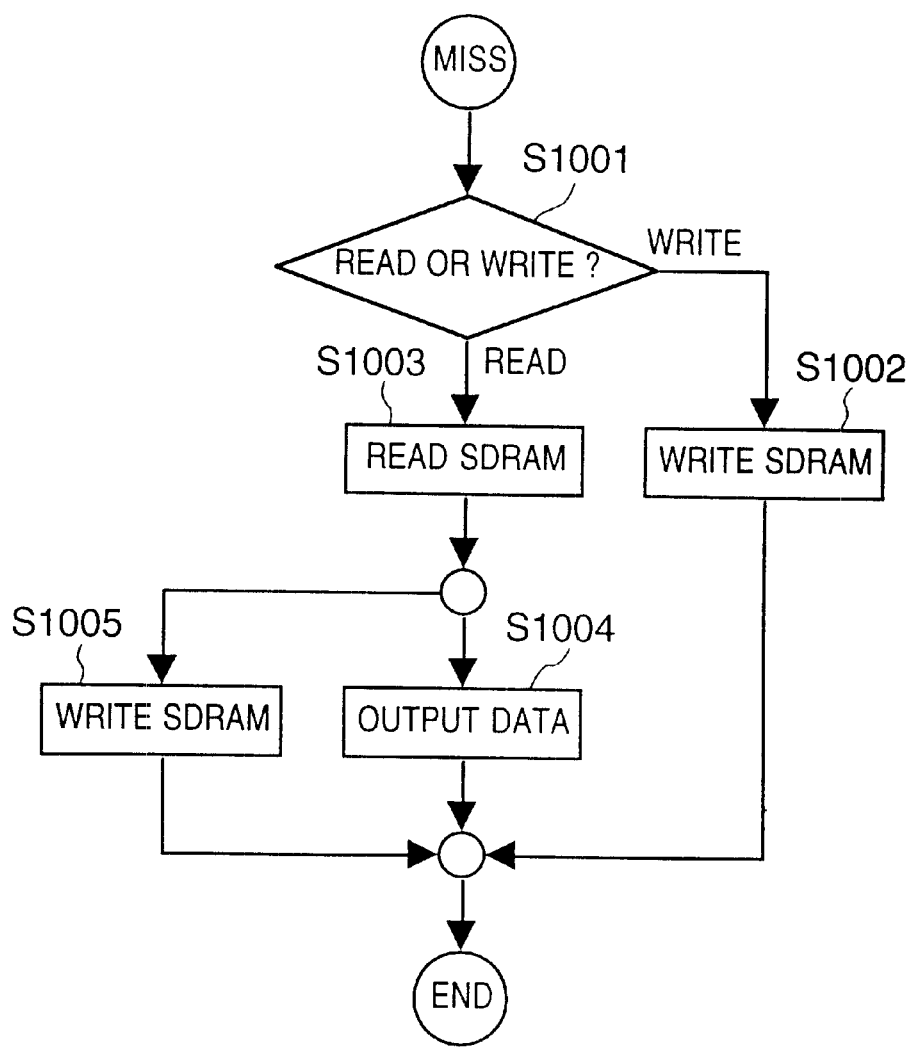
FIG. 10 is a flowchart showing operation of a cache when memory read/write transfer has been requested from an MC bus.
Figure 56:
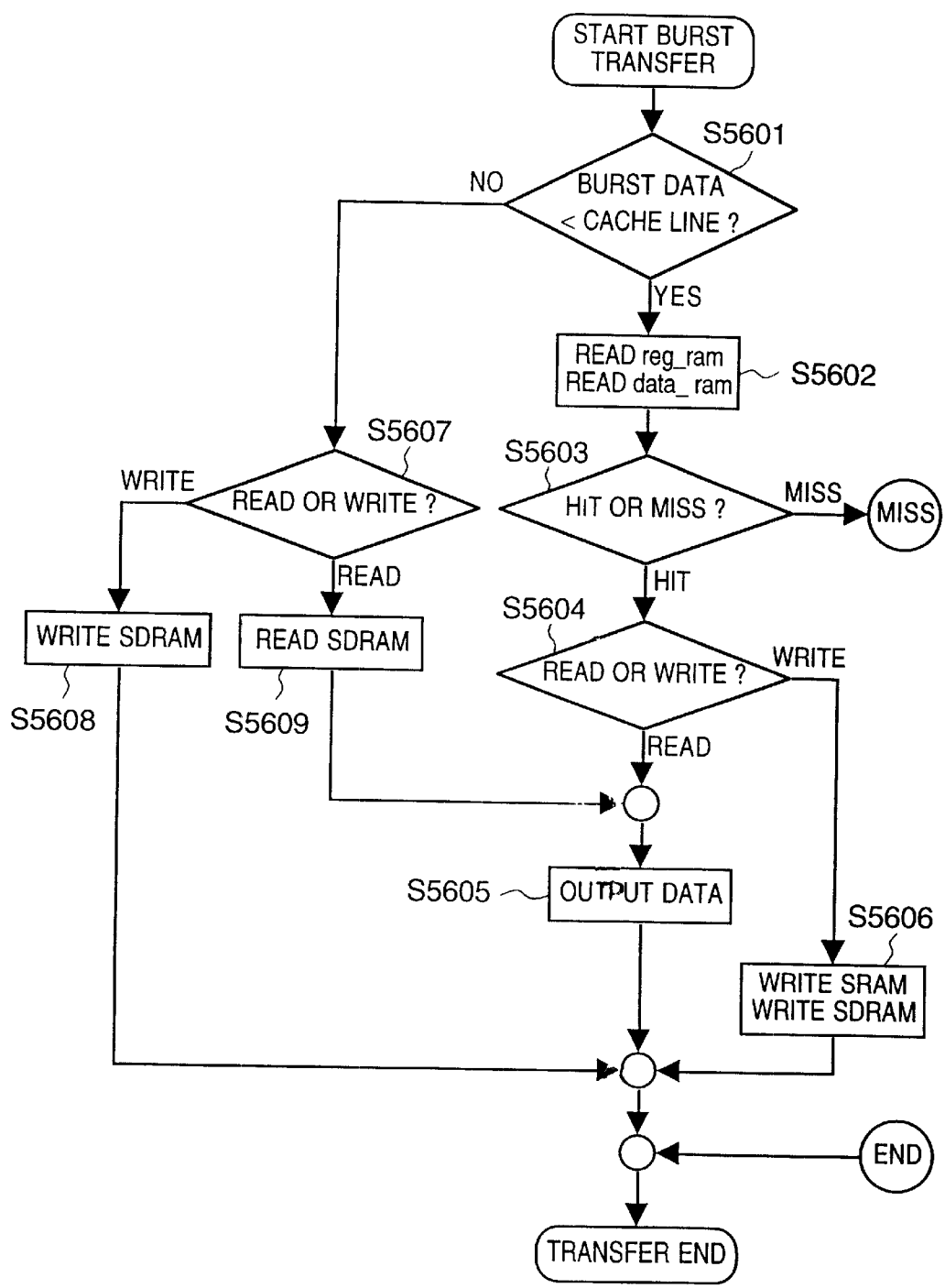
FIG. 56 is a flowchart showing another example of cache operation in a case where memory read/write transfer has been requested from an MC bus.
Figure 57:
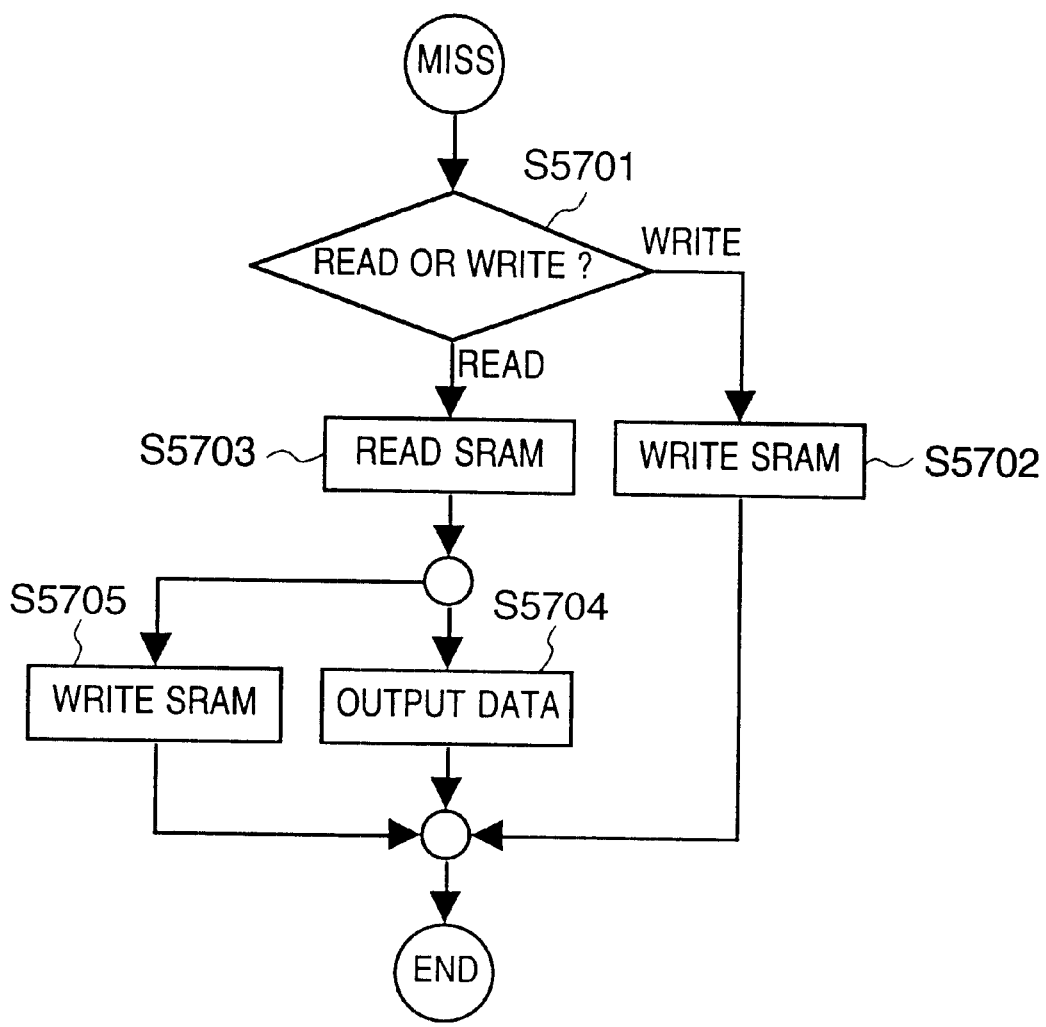
FIG. 57 is a flowchart showing another example of cache operation in a case where memory read/write transfer has been requested from an MC bus.

The cache operating procedure shown in FIGS. 9 and 10 may be replaced by that shown in FIGS. 56 and 57.

If data transfer is started from the MC bus in FIG. 56, it is judged whether the transfer is performed with cache ON or with cache OFF depending upon mTType[60:0] indicated on the MC bus at the start of the transfer. When the transfer is burst transfer, the judgment is made based upon whether the amount of the burst transfer is greater than or less than the amount of data on one line of the cache. It should be noted that one line of the cache is 256 bits, which is equivalent to four bursts.

In FIG. 56, the memory controller checks mTType[3:0] at the start of transfer. If the burst length indicated by mTType is 1/2/4, operation is with cache ON. In case of 6/8/16/2× 16/3×16/4×16, operation is with cache OFF. Operation after the cache is turned on or off is similar to that described in connection with FIGS. 9 and 10.

Figure 58:
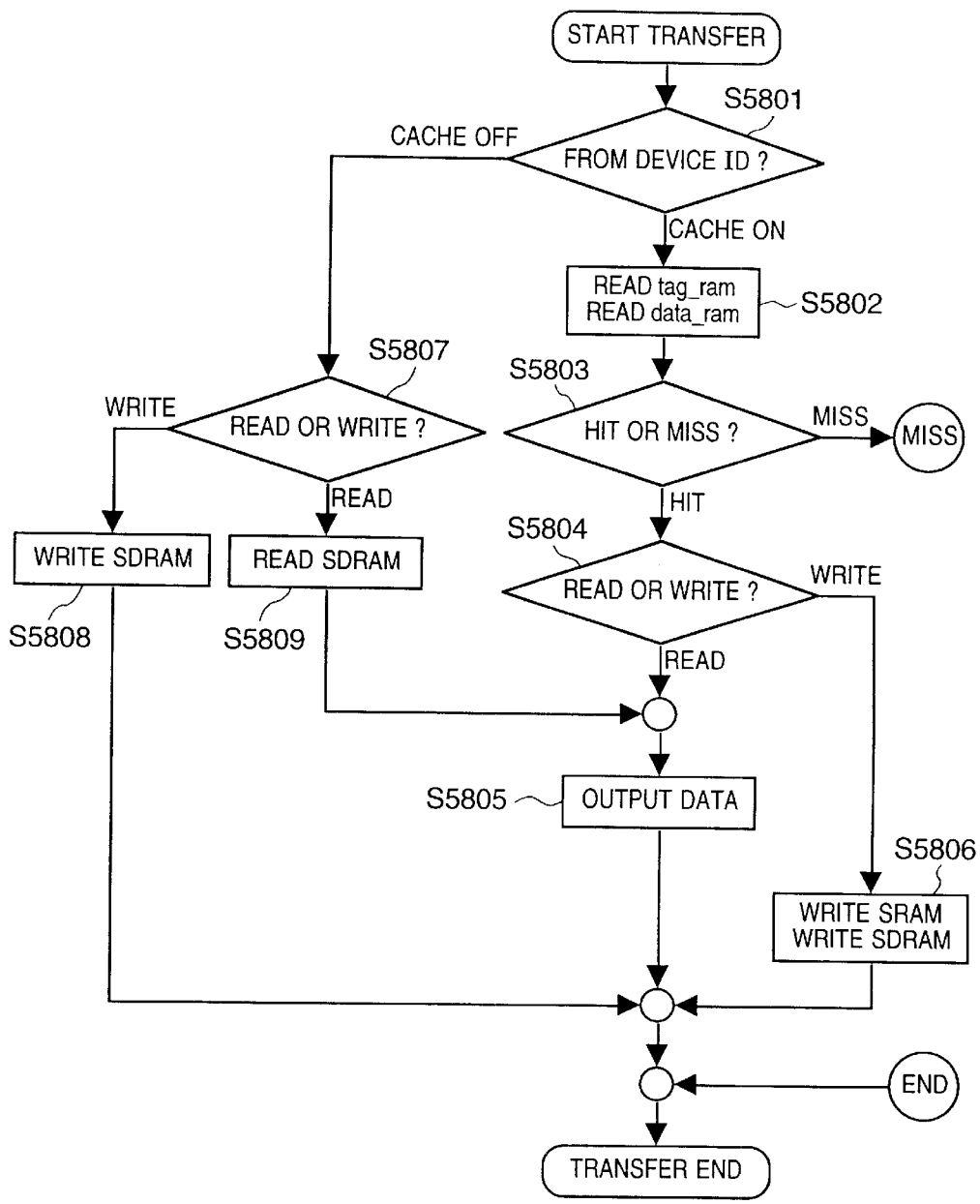
FIG. 58 is a flowchart showing another example of cache operation in a case where memory read/write transfer has been requested from an MC bus.
Figure 59:
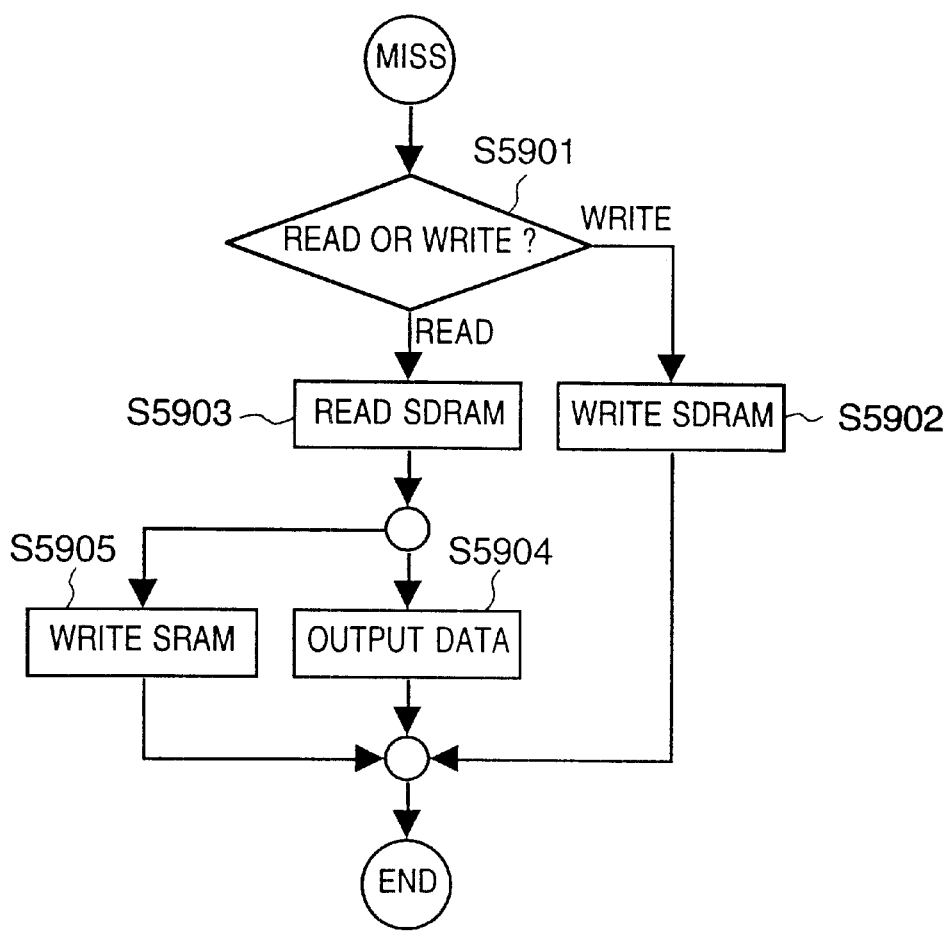
FIG. 59 is a flowchart showing another example of cache operation in a case where memory read/write transfer has been requested from an MC bus.

Cache ON/OFF can also be changed over by a device as illustrated in FIGS. 58 and 59. In FIG. 58, the memory controller identifies the transfer requesting device by checking mTType[6:4] at the start of transfer, refers to the previously set value in the configuration register in order to determine whether the transfer request of this device is actuated with cache ON or cache OFF, and decides whether operation is with cache ON or cache OFF. Operation after the cache is turned on or off is similar to that described in connection with FIGS. 9 and 10. The setting of the configuration register may be decided by hardware (in which case any change is not possible) or rewritably by software.

[Effects of the invention]

As described above, the present invention is such that in a case where DMA is performed successively, the software need not intervene whenever a bus master is changed. Conditions for starting and conditions for ending DMA are first set collectively in a bus arbiter beforehand and DMA setting is made in the bus master as well, whereby the bus master is capable of subsequently executing a series of processing operations while controlling the sequence. As a result, software intervention for every processing operation is no longer necessary. Further, writing data back to memory each and every time is not required. This means that the number of times data uses a bus is reduced, thereby raising overall processing speed.

Further, the bus connected in response to a request is changed over by a crossbar switch so that data can be transferred by selecting the optimum bus. Furthermore, if the bus arrangement is provided with flexibility and the master and slave do not overlap, a plurality of buses can be connected in parallel to improve the efficiency with which buses are used.

In regard to bus masters connected to respective ones of a plurality of buses, the bus masters perform control in such a manner that a memory is accessed in the order in which bus use privilege is obtained. As a result, sequence of processing attendant upon the passage of time can be maintained in proper fashion.

In the burst mode having a high transfer speed, a cache is not used. A cache is employed in the single mode. This prevents a situation in which a large quantity of cached data is wasted, thereby raising cache utilization efficiency as well as the speed at which data is transferred to memory.

The bus used by each bus master is decided and selected dynamically depending upon bus use status, priority of bus request, bus performance and whether data to be transferred is suited to the bus. This makes it possible to improve bus efficiency.

Further, the operating state of each block of the circuitry is monitored to suppress power consumption. Furthermore, notification is given of preliminary warnings and hazardous conditions by separate interrupt signals. As a result, the generation of a large amount of heat is suppressed and destruction of the apparatus due to heat can be prevented.

As many apparently widely different embodiments of the present invention can be made without departing from the spirit and scope thereof, it is to be understood that the invention is not limited to the specific embodiments thereof except as defined in the appended claims.

What is claimed is:

1. A memory manager comprising:

a memory for supporting a burst mode in which a data transfer to successive locations is carried out; and a memory controller having a cache memory for temporarily storing data exchanged with said memory, wherein said memory controller prohibits data transfer to said memory using the cache memory if transfer of the data to said memory is performed in the burst mode, and permits data transfer to said memory through said cache memory if transfer of the data to said memory is performed in a single mode.

2. A memory manager comprising:

a memory for supporting a burst mode in which a data transfer to successive locations is carried out;

a memory controller having a cache memory for temporarily storing data exchanged with said memory; and a plurality of bus masters which access the memory;

wherein said memory controller transfers data to said memory directly without using said cache memory as an intermediary in a first mode, and in a second mode, and wherein the memory controller selects either the first mode or the second mode, transfers data to said memory with said cache memory as an intermediary, in dependence upon the bus master that is to transfer the data to said memory.

3. The memory manager according to claim 2, wherein said memory controller has a rewritable table for storing identifiers of said bus masters in such a manner that it is possible to distinguish, for each identifier, whether data will be transferred to said memory directly without using said cache memory as an intermediary or whether data will be transferred to said memory with said cache memory as an intermediary, wherein said memory controller transfers data to said memory directly without using said cache memory as an intermediary, or transfers data to said memory with said cache memory as an intermediary, in dependence upon the identifier of a bus master that is attempting to transfer data to said memory and the rewritable table.

4. A method for managing a memory supporting a burst mode in which a data transfer to successive locations is carried out, said method comprising the steps of:

prohibiting data transfer to the memory using a cache memory if transfer of the data to the memory is performed in the burst mode; and permitting data transfer to the memory through the cache memory if transfer of the data to the memory is performed in a single mode.

5. A method for managing transfer of data from/to a plurality of bus masters to/from a memory supporting a burst mode in which a data transfer to successive locations is carried out, said method comprising the steps of:

identifying a bus master that is to transfer the data to the memory; and transferring the data to the memory directly without using the cache memory as an intermediary in a first mode, and transferring data to said memory with the cache memory an intermediary in a second mode, and wherein either the first mode or second mode is selected in dependence upon the bus master that is to transfer the data to the memory.

6. A method according to claim 5, wherein, in said transferring step, the data is transferred to the memory without the cache memory as an intermediary, or is transferred with the cache memory as an intermediary, in dependence upon a writable table storing identifiers of the bus master in such a manner that it is possible to distinguish, for each identifier, whether data will be transferred to the memory directly without the cache memory as an intermediary or whether data will be transferred to the memory with the cache memory as an intermediary, in addition to the identifier of a bus master that is to transfer the data to the memory.

7. A memory manager comprising:
   a memory for supporting a burst mode in which a data transfer to successive locations is carried out;
   memory control means having a cache memory for temporarily storing data exchanged with said memory; and
   a plurality of bus masters which access the memory,
   wherein said memory control means transfers data to said memory directly without the intermediary of the cache memory in a first mode, and transfers data to said memory upon first writing the data to the cache memory in a second mode, and wherein the memory control means selects either the first mode or the second mode in dependence upon the bus master that is to transfer the data to said memory, and
   wherein said memory control means has a rewritable table for storing identifiers of said bus masters in such a manner that it is possible to distinguish, for each identifier, whether data will be transferred to said memory directly without the intermediary of the cache memory or whether data will be transferred to said memory upon first being written to the cache memory,
   data being transferred to said memory directly without the intermediary of the cache memory or data being transferred to said memory upon first being written to the cache memory, and the transfer being made upon referring to the identifier of a bus master is attempting to transfer data memory and to said table.

* * * * *

UNITED STATES PATENT AND TRADEMARK OFFICE
CERTIFICATE OF CORRECTION

PATENT NO. : 6,499,076 B2
DATED : December 24, 2002
INVENTOR(S) : Date et al.

It is certified that error appears in the above-identified patent and that said Letters Patent is hereby corrected as shown below:

<u>Drawings,</u>
Sheet 11, FIG. 11, "prgrom__raed__L" should read -- prgrom__read__L --;
Sheet 25, FIG. 24D, "PCI PROFECT" should read -- PCI PROJECT --;
Sheet 45, FIG. 44, "PROESSING" in step 4305, both occurrences, should read -- PROCESSING --;
Sheet 46, FIG. 45, "PROESSING" in step 4305, both occurrences, should read -- PROCESSING --; and
Sheet 56, FIG. 55, second to the last line of text at the bottom, "OUT OR TIME" should read -- OUT OF TIME --.

<u>Column 8,</u>
Line 38, "64 BITS." should read -- 64 BITS, --.

<u>Column 10,</u>
Line 44, "IC bus" should read -- MC bus --; and
Line 47, "mTs_L ... (output) MC" should read -- mTs_L (output) ... MC --.

<u>Column 11,</u>
Line 38, "mBRdy_and" should read -- mBRdy_L and --.

<u>Column 12,</u>
Line 11, "BIT x" should read -- BIT) x --; and
Line 61, "busin" should read -- bus in --.

<u>Column 15,</u>
Line 63, "ON is" should read -- ON --.

<u>Column 18,</u>
Line 10, "CntloeReq" should read -- CntlOeReq --.

<u>Column 21,</u>
Line 29, "TsoeReq" should read -- TsOeReq --; and
Line 35, "TsoeReq," should read -- TsOeReq, --.

<u>Column 23,</u>
Line 60, "If is hit occurs," should read -- If a hit occurs, --.

UNITED STATES PATENT AND TRADEMARK OFFICE
CERTIFICATE OF CORRECTION

PATENT NO. : 6,499,076 B2
DATED : December 24, 2002
INVENTOR(S) : Date et al.

It is certified that error appears in the above-identified patent and that said Letters Patent is hereby corrected as shown below:

Column 26,
Line 32, "and B-1," should read -- , B-1 and --.

Column 35,
Line 49, "are" should be deleted.

Column 36,
Line 23, "are" should be deleted.

Column 37,
Line 49, "IFMAD[3:12]." should read -- IFMAD[31:2]. --.

Column 42,
Line 56, "is notifies" should read -- is notified.

Column 44,
Line 29, "memory;" should read -- memory, --.

Signed and Sealed this

Eighteenth Day of November, 2003

JAMES E. ROGAN
*Director of the United States Patent and Trademark Office*